(12) United States Patent
Smith et al.

(10) Patent No.: US 8,635,130 B1
(45) Date of Patent: Jan. 21, 2014

(54) METHOD AND SYSTEM FOR ANALYZING AND SCREENING INVESTMENT INFORMATION

(75) Inventors: Michael S. Smith, Draper, UT (US); Chad D. Clifford, Lindon, UT (US)

(73) Assignee: TD Ameritrade IP Company, Inc., Omaha, NE (US)

( * ) Notice: Subject to any disclaimer, the term of this patent is extended or adjusted under 35 U.S.C. 154(b) by 1132 days.

(21) Appl. No.: 09/542,513

(22) Filed: Apr. 3, 2000

Related U.S. Application Data

(60) Provisional application No. 60/182,149, filed on Feb. 14, 2000.

(51) Int. Cl.
*G06Q 40/00* (2012.01)

(52) U.S. Cl.
USPC .............................. 705/35; 709/223; 707/999

(58) Field of Classification Search
USPC ............ 705/37, 38, 39, 35; 709/223; 707/999
See application file for complete search history.

(56) References Cited

U.S. PATENT DOCUMENTS

| | | | |
|---|---|---|---|
| 4,346,442 A | 8/1982 | Musmanno | |
| 4,376,978 A | 3/1983 | Musmanno | |
| 4,554,418 A | 11/1985 | Toy | |
| 4,566,066 A | 1/1986 | Towers | |
| 4,597,046 A | 6/1986 | Musmanno et al. | |
| 4,694,397 A | 9/1987 | Grant et al. | |
| 4,742,457 A | 5/1988 | Leon et al. | |
| 4,751,640 A | 6/1988 | Lucas et al. | |
| 4,774,663 A | 9/1988 | Musmanno et al. | |
| 4,933,842 A | 6/1990 | Durbin et al. | |
| 4,953,085 A | 8/1990 | Atkins | |
| 5,126,936 A | 6/1992 | Champion et al. | |
| 5,148,365 A | 9/1992 | Dembo | |
| 5,193,056 A | 3/1993 | Boes | |
| 5,214,579 A | 5/1993 | Wolfberg et al. | |
| 5,220,500 A | 6/1993 | Baird et al. | |
| 5,231,571 A | 7/1993 | D'Agostino | |
| 5,262,942 A | 11/1993 | Earle | |

(Continued)

FOREIGN PATENT DOCUMENTS

| | | |
|---|---|---|
| EP | 0 686 926 A2 | 12/1995 |
| EP | 0 752 135 B1 | 2/1999 |
| WO | WO 99/50773 | 10/1999 |

*Primary Examiner* — Daniel Felten
(74) *Attorney, Agent, or Firm* — Sterne, Kessler, Goldstein & Fox, P.L.L.C.

(57) ABSTRACT

The present invention provides a stock analysis, management and education system and process which, via an Internet based software application, allows a client to receive daily trading information on all the Stocks traded without having to conduct multiple queries and/or extended downloads. The system also provides for the efficient transfer of daily stock information from a server to a client's system by having the server receive and process into binary files stock information from exchanges. The client then establishes a communications link with the server, receives a list file, selects files from the list and receives those files. The system provide custom stock screening and display options, while significantly reducing download times by separating charting data from screening data and providing "quick update" files. Day Trading features enable an investor to day trade with relative low risk. The present invention also includes an En Fueg-o-meter which enables a client to view the recent performance of any stock at a glance via color and other indicators. Candlestick algorithms are also provided for monitoring a stock's performance while back testing allows a client to test trading ideas back in time using historical stock information.

21 Claims, 68 Drawing Sheets

(56) References Cited

U.S. PATENT DOCUMENTS

| | | |
|---|---|---|
| 5,267,148 A | 11/1993 | Kosaka et al. |
| 5,270,922 A | 12/1993 | Higgins |
| 5,297,032 A | 3/1994 | Trojan et al. |
| 5,502,637 A | 3/1996 | Beaulieu et al. |
| 5,563,783 A | 10/1996 | Stolfo et al. |
| 5,689,650 A | 11/1997 | McClelland et al. |
| 5,692,233 A | 11/1997 | Garman |
| 5,706,502 A | 1/1998 | Foley et al. |
| 5,729,700 A | 3/1998 | Melnikoff |
| 5,732,397 A | 3/1998 | DeTore et al. |
| 5,745,383 A | 4/1998 | Barber |
| 5,761,442 A | 6/1998 | Barr et al. |
| 5,784,696 A | 7/1998 | Melnikoff |
| 5,799,287 A | 8/1998 | Dembo |
| 5,806,047 A | 9/1998 | Hackel et al. |
| 5,812,987 A | 9/1998 | Luskin et al. |
| 5,812,988 A | 9/1998 | Sandretto |
| 5,819,237 A | 10/1998 | Garman |
| 5,819,238 A | 10/1998 | Fernholz |
| 5,852,811 A | 12/1998 | Atkins |
| 5,852,812 A | 12/1998 | Reeder |
| 5,857,176 A | 1/1999 | Ginsberg |
| 5,864,828 A | 1/1999 | Atkins |
| 5,884,287 A | 3/1999 | Edesess |
| 5,884,312 A * | 3/1999 | Dustan et al. .................. 707/10 |
| 5,893,079 A | 4/1999 | Cwenar |
| 5,893,091 A * | 4/1999 | Hunt et al. ........................ 707/3 |
| 5,911,135 A | 6/1999 | Atkins |
| 5,911,136 A | 6/1999 | Atkins |
| 5,913,202 A | 6/1999 | Motoyama |
| 5,918,217 A | 6/1999 | Maggioncalda et al. |
| 5,918,218 A | 6/1999 | Harris et al. |
| 5,930,478 A * | 7/1999 | Mebane .................. 395/200.68 |
| 5,930,774 A | 7/1999 | Chennault |
| 5,940,809 A | 8/1999 | Musmanno et al. |
| 5,946,666 A | 8/1999 | Nevo et al. |
| 5,946,667 A | 8/1999 | Tull, Jr. et al. |
| 5,963,910 A | 10/1999 | Ulwick |
| 5,978,778 A | 11/1999 | O'Shaughnessy |
| 5,991,743 A | 11/1999 | Irving et al. |
| 6,003,018 A | 12/1999 | Michaud et al. |
| 6,012,042 A * | 1/2000 | Black et al. ..................... 705/36 |
| 6,012,044 A | 1/2000 | Maggioncalda et al. |
| 6,014,642 A | 1/2000 | El-Kadi et al. |
| 6,014,643 A | 1/2000 | Minton |
| 6,018,722 A | 1/2000 | Ray et al. |
| 6,021,397 A | 2/2000 | Jones et al. |
| 6,029,148 A | 2/2000 | Zurstrassen |
| 6,035,281 A | 3/2000 | Crosskey et al. |
| 6,035,286 A | 3/2000 | Fried |
| 6,510,419 B1 * | 1/2003 | Gatto .............................. 705/36 |

* cited by examiner

| En Fueg-o... | Bull | Bear | Symbol | Close | Volume | Vol Ave 6 Mont... | Price Chg | % Price Chg | Prev | RSI | EPS |
|---|---|---|---|---|---|---|---|---|---|---|---|
| Green ⇧ | 11 | 2 | BWC ⇧ | 28.19 | 352,800 | 104,000 | +1.94 | +7.38% | 26.25 | 75.57 | $1.68 |
| Yellow ⇩ | 8 | 3 | CPP ⇩ | 17.19 | 750,800 | 190,500 | -0.06 | -0.36% | 17.25 | 55.62 | $1.84 |
| Yellow ⇩ | 8 | 4 | EGHT ⇩ | 31.00 | 1,336,800 | 574,800 | -3.50 | -10.14% | 34.50 | 47.20 | $-1.47 |
| Green ⇧ | 12 | 0 | FSON ⇩ | 22.63 | 340,100 | 106,300 | -2.12 | -8.59% | 24.75 | 72.65 | $-0.95 |
| Green ⇧ | 11 | 1 | GE ⇧ | 164.00 | 13,015,300 | 6,467,600 | +8.00 | +5.13% | 156.00 | 81.99 | $3.23 |
| Green ⇧ | 11 | 1 | IIR ⇧ | 9.44 | 606,900 | 132,900 | +0.56 | +6.34% | 8.87 | 84.15 | $-0.27 |
| Yellow ⇩ | 11 | 2 | JNPR ⇩ | 288.00 | 3,798,800 | 1,689,200 | -19.00 | -6.19% | 307.00 | 53.21 | $-0.22 |
| Green ⇧ | 11 | 0 | LLTC ⇧ | 58.06 | 6,941,500 | 1,854,600 | +0.00 | +0.00% | 58.06 | 62.04 | $1.41 |
| Green ⇧ | 14 | 2 | MANH ⇧ | 31.88 | 785,300 | 180,600 | +1.75 | +5.81% | 30.12 | 65.00 | $0.16 |
| Green ⇧ | 7 | 6 | MCRE ⇩ | 26.38 | 6,841,500 | 667,500 | -4.50 | -14.57% | 30.87 | 45.71 | $-0.17 |
| Green ⇧ | 12 | 1 | MTP ⇧ | 62.18 | 2,712,700 | 546,400 | +2.94 | +4.91% | 59.88 | 75.12 | $1.34 |

FIG. 9

Screen Criteria                                                          ☒

Screen Name  | Pullback Buying Opportunities |

Screening for:
- Relative Strength is greater than or equal to 60
- Moving Average 10 Day Cross Down is equal to Yes
- Average Volume 6 Months is greater than or equal to 150000
- ADX is greater than 35
- Closing Price is greater than or equal to 2
- Volume of Today is less than or eaual to 75000

336

Buttons: Save, Cancel, Add, Delete, Modify, Help

FIG. 24

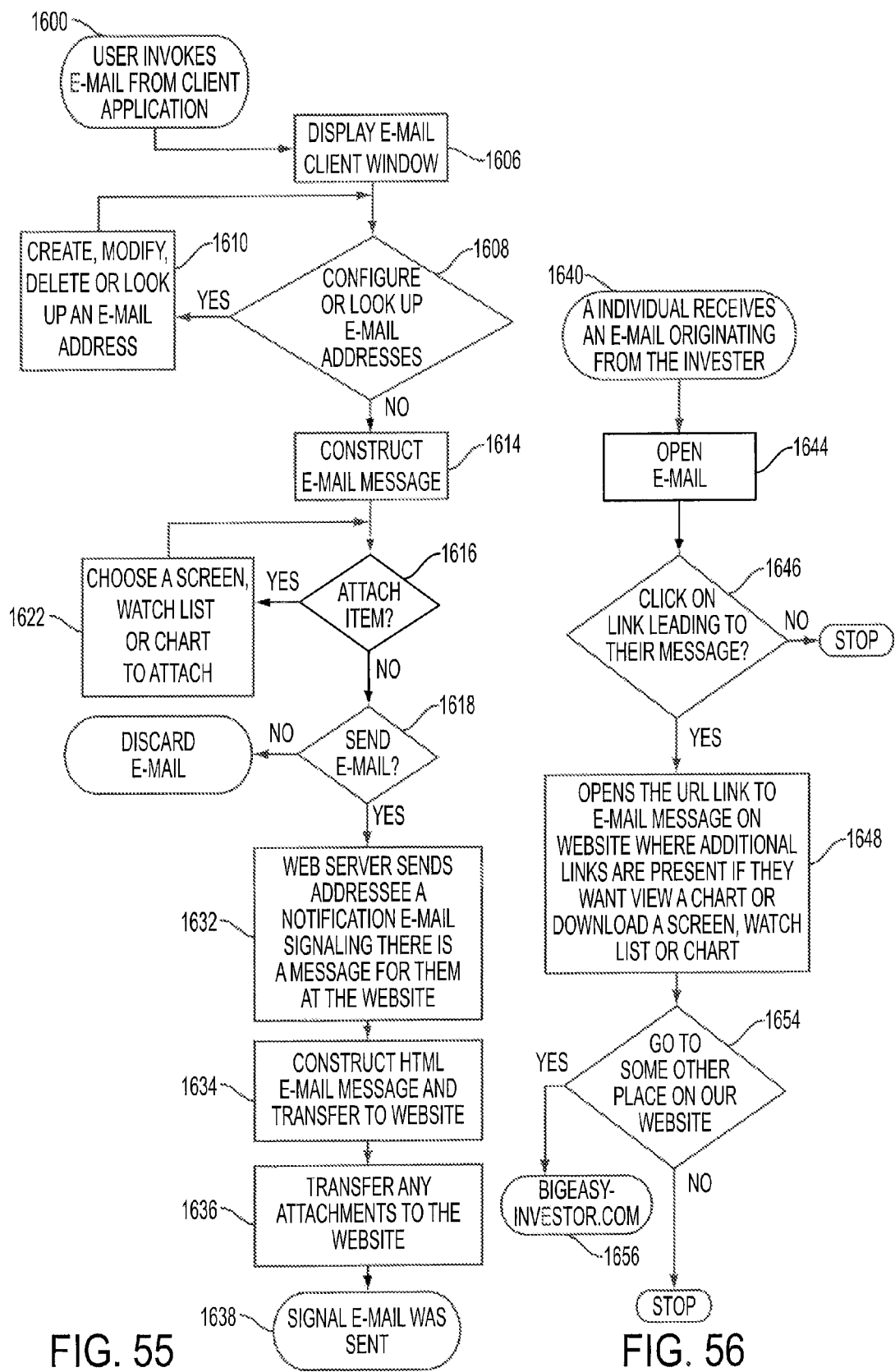

| Advertiser Summary | | | |
|---|---|---|---|
| Total advertisers: 15 | | | |
| Company ID | Company Name | Click Count | Impression Count |
| 2 | CyBerCorp | 8106 | 5228003 |
| 1 | MB Trading | 3412 | 3407762 |
| 3 | PC Discounters | 1152 | 2215590 |
| 100003 | Ten Bagger, Inc. | 813 | 862740 |
| 150004 | SalesLogix | 598 | 2008922 |
| 5 | The UndergroundTrader | 551 | 1752050 |
| 7 | Beyond.com | 367 | 1583816 |
| 4 | Amazon.com | 277 | 3248183 |
| 50005 | Starlight Children's Foundation | 215 | 1508959 |
| 50004 | Make a Wish Foundation | 202 | 1549126 |
| 6 | NextCard | 190 | 1633582 |
| 50002 | Adidas | 150 | 1365186 |
| 50003 | Electronic Data Systems | 116 | 790473 |
| 8 | Earth Share | 0 | 4108 |
| 9 | Save the Children | 0 | 4115 |
| | Totals: | 16149 | 27162615 |
| | | Total advertisers: 15 | |

Current time: 3/30/2000 11:25

[Refresh] [Back]

| Total: 1 | | | | | | | | | | | |
|---|---|---|---|---|---|---|---|---|---|---|---|
| User ID | User Name | XRes1 | YRes1 | Unsubscribe Date | AveUsage | Success | Fail | Total | Version | Support | UpdateID | Actions |
| 622 | Paul Pearson | 1600 | 1200 | Feb 23 2000 2:41PM (tips)<br>Feb 4 2000 2:06PM (info)<br>Feb 4 2000 1:40PM (edInfo) | 142 | 9 | 0 | 10 | 2.1.1.8.2000 | 0 | 0 | (not available) |
| Total: 1 | | | | | | | | | | | |

1404 → (XRes1, YRes1)
1400 → Success
1402 → Fail

[Top] [Back]

FIG. 72

| User: | Paul Pearson | |
|---|---|---|
| User ID | 250057 | |
| User Name | Paul Pearson | |
| Login | ppearson2 | |
| Password | cowman | |
| Activated | Yes | On \| Off |
| Activated: | , UT, US | |
| Phone | | |
| Fax | | |
| Email | ppearson@yahoo.com | |
| Heard From | Day Trading Expo NY, 2000 | |
| Education | College Graduate | |
| Gender | M | |
| Age | 31 | |
| Portfolio Value | $50,000 - $75,000 | |
| Income | Over $100,000 | |
| Connection | 28.8K Modem | |
| Dist Source | Downloaded from BigEasyInvestor.com | |
| Reg Date | Oct 27 1999 5:07PM | |
| Last Update | Jan 1 1999 12:00AM | |
| Usage | 0 (minutes) | |
| Update Count | 0 | |
| Question | what | |
| Answer | where | |
| sec_id1 | 0 | Reset |
| sec_id2 | 0  —1452 | Reset |
| sec_id3 | 0 | |
| flag_tips | no | On \| Off |
| flag_info | no | On \| Off |
| flag_edinfo | no | On \| Off |
| flag_bademail | no | On \| Off |
| flag_nag | no | On \| Off |
| flag_beta | no | On \| Off |
| User: | Paul Pearson | |

1450 — sec_id1/sec_id2/sec_id3
1454 — flag_bademail

FIG. 73

Current time: 3/30/2000 14:23:30

[Refresh] [Back]

Ad User Summary - Ad ID=100006

Total users: 90

| Login | Date/Time | Main View | Screen View | Data View |
|---|---|---|---|---|
| MAWatcher | Oct 16 1999 10:48AM | 2 | 0 | 0 |
| bigman | Oct 16 1999 5:24PM | 2 | 0 | 0 |
| needham | Oct 27 1999 7:10PM | 0 | 0 | 0 |
| mpolly | Oct 28 1999 7:02AM | 2 | 1 | 0 |
| aperse | Oct 28 1999 5:38PM | 0 | 0 | 0 |
| aperse | Oct 28 1999 5:38PM | 2 | 0 | 0 |
| bigman | Oct 30 1999 1:08AM | 0 | 0 | 0 |
| pekerob | Oct 30 1999 4:47PM | 2 | 0 | 0 |
| deamone | Oct 30 1999 10:19PM | 2 | 0 | 0 |
| bduke | Oct 30 1999 10:16PM | 2 | 0 | 0 |
| bluepuma | Nov 2 1999 3:38AM | 0 | 0 | 0 |
| kirki | Nov 3 1999 11:23AM | 0 | 0 | 0 |
| teesal | Nov 4 1999 5:41PM | 2 | 0 | 0 |
| pcsystem | Nov 4 1999 7:12PM | 2 | 0 | 0 |
| brucepat | Nov 4 1999 8:33PM | 2 | 0 | 0 |
| elaineca | Nov 4 1999 9:12PM | 2 | 0 | 0 |
| sideboom | Nov 5 1999 1:27PM | 2 | 0 | 0 |
| cjwood | Nov 8 1999 5:25PM | 0 | 2 | 0 |
| pabbyrao | Nov 9 1999 1:15PM | 2 | 0 | 0 |
| jasoncobb | Nov 9 1999 5:08PM | 2 | 0 | 1 |
| ED | Nov 10 1999 10:00AM | 0 | 0 | 0 |
| swampfox | Nov 11 1999 12:04PM | 2 | 0 | 0 |
| laweed | Nov 11 1999 1:14AM | 0 | 1 | 0 |

FIG. 74

Ad Summary - All Ads

Total Click Count: 16149

| Ad ID sort | Company ID sort | Click-Count sort | Description sort | Start Date sort | End Date sort | Active | URL |
|---|---|---|---|---|---|---|---|
| 1 | 3 | 1 | pcd_1 | Jan 1 1900 6:24PM | Never | no | www.pcdiscounters.com?bigeasy |
| 2 | 5 | 490 | UGT_half_1 | Sep 23 1999 4:55PM | Never | Yes | www.undergroundtrader.com |
| 3 | 6 | 190 | r22_howtow_234x60 | Sep 23 1999 4:56PM | Never | Yes | www.nextcard.com/index6.html?ref=aff0010031 |
| 4 | 7 | 367 | Beyond_still_1 | Sep 23 1999 4:56PM | Never | Yes | www.beyond.com |
| 5 | 9 | 0 | save_children | Sep 23 1999 4:57PM | Never | no | www.savethechildren.greatergood.com/cgi-bin/WebObjects/GreaterGood |
| 6 | 8 | 0 | earth_share | Sep 23 1999 4:58PM | Never | no | www.earthshare.org |
| 7 | 4 | 166 | amazon_auctions | Sep 23 1999 4:58PM | Never | Yes | www.amazon.com |
| 8 | 4 | 111 | Amazon_half_1 | Sep 23 1999 4:59PM | Never | Yes | www.amazon.com |
| 9 | 1 | 280 | mb_1 | Sep 23 1999 4:59PM | Never | Yes | www.mbtrading.com |
| 10 | 1 | 249 | mb234b | Sep 23 1999 5:00PM | Never | Yes | www.mbtrading.com |
| 11 | 2 | 1943 | CyberCorp_half_1 | Sep 23 1999 5:00PM | Never | Yes | www.cybercorp.com/offer/bigeasy.asp |
| 12 | 2 | 1048 | CyberCorp_tired | Sep 23 1999 5:01PM | Never | Yes | www.cybercorp.com/offer/bigeasy.asp |
| 50002 | 5 | 61 | UGT | Sep 30 1999 9:26PM | Never | no | www.undergroundtrader.com |
| 50003 | 1 | 2883 | mb_full_1 | Sep 30 1999 9:30PM | Never | Yes | www.mbtrading.com |
| 50004 | 2 | 3765 | cyber_full_1 | Sep 30 1999 9:33PM | Never | Yes | www.cybercorp.com/offer/bigeasy.asp |
| 100003 | | 116 | nph-graphic | Oct 15 1999 8:25PM | Never | no | www.eds.com |
| 100004 | 50004 | 202 | make_a_wish_ad | Oct 15 1999 8:27PM | Never | Yes | www.makeawish.org |
| 100005 | 50002 | 95 | Adidas_ad | Oct 15 1999 8:28PM | Never | no | www.adidas.com |
| 100006 | 50002 | 55 | Adidas_ad_2 | Oct 15 1999 8:28PM | Never | no | www.adidas.com |
| 100007 | 50005 | 215 | Starlight_kids | Oct 15 1999 8:29PM | Never | Yes | www.starlight.org |
| 150004 | 100003 | 510 | SeminarAd1 | Nov 1 1999 3:20PM | Never | Yes | www.bigeasyinvestor.com/Education/Training/training.htm |
| 200005 | 3 | 603 | pcd_2 | Nov 8 1999 3:06PM | Never | Yes | www.pcdiscounters.com?bigeasy |
| 250006 | 100003 | 303 | SeminarAd2 | Nov 12 1999 12:14PM | Never | Yes | www.bigeasyinvestor.com/Education/Training/training.htm |
| 250007 | 3 | 548 | pcd_3 | Nov 12 1999 12:28PM | Never | Yes | www.daveecg.iserver.net/miva/store/merchant.mv?Screen=PROD&Return_Screen |
| 300007 | 2 | 1350 | CyberCorp_half_3 | Nov 15 1999 9:58AM | Never | Yes | www.cybercorp.com/offer/bigeasy.asp |
| 350008 | 150004 | 415 | SalesLogix | Feb 9 2000 10:24AM | Never | Yes | www.saleslogix.com |
| 350009 | 150004 | 183 | Interact | Feb 9 2000 10:25AM | Never | Yes | www.interact.com |

Total Click Count: 16149

FIG. 75

METHOD AND SYSTEM FOR ANALYZING AND SCREENING INVESTMENT INFORMATION

CROSS-REFERENCE TO RELATED APPLICATION

This application claims priority to U.S. Provisional Application Ser. No. 60/182,149, filed 14 Feb. 2000 (the '149 application). The '149 application is hereby incorporated by reference as though fully set forth herein.

BACKGROUND OF THE INVENTION a. Field of the Invention

The instant invention is directed toward a method and apparatus for screening securities. More specifically, it relates to apparatus and processes to facilitate screening of equities by investors while tracking various information about the equities.

b. Background Art

In the practice of evaluating securities, specifically stock equities, there are two common approaches: technical analysis and fundamental analysis. Technical analysis is the study of price and volume patterns displayed on charts, and fundamental analysis is the study of the performance of a company's business results. Applications that allow users to screen for investment prospects using technical and/or fundamental data points are called decision support tools. Competing decision support tools allow users to screen for many data points and present a flexible environment for users to test investment ideas.

However, existing applications require users to execute screens on a local computer in an ad hoc fashion. Such applications commonly require a user, for each screen query, to retrieve historical pricing and fundamental data from a local hard drive, one stock at a time in a serial fashion. Existing software must examine the data to see if it matches each argument of the query and then include or eliminate it from the hit list. Existing software must execute this process one time for each stock's historical pricing and once for each stock's fundamental data set. On a fast computer (Pentium III 500 MHz class) this process requires ten to fifteen minutes. This laborious pattern severely limits the average users desire to adjust their screens and perform what-if analysis, thus presenting the great need for a quicker stock screening process.

A further deficit in existing decision support tools in the lack of a rich results display. Currently available systems, see for example FIG. 8, generally provide a client with limited capabilities for sorting and viewing screen results. As shown in FIG. 8, one such prior art system 178 is displayed. This system 178 merely allows a client to sort a listing of stocks 180 based upon a single parameter 182 in either ascending or descending order 184. Additionally, this system 178 merely displays in the field 186 one parameter at a time. Therefore, a system is needed which allows a client to select and view multiple parameters pertaining to Stocks at a single instance on a single screen, based upon pre-determined and pre-selected screening requirements.

The idea that two heads, or more, are better than one is a concept that has been heavily adopted within the investment community. The term "community" in investment community denotes a sharing of information among investors. This sharing can take the form of organized investment clubs with a common goal or friends with an interest in sharing investment information. When an individual has found some useful information that has helped him or her, there is often a tendency to share this information with others. The advent of message boards, chat rooms, and other related Web sites have expanded this community and facilitated instant sharing of information with many individuals.

Existing products provide a limited attempt to help facilitate this sharing of information in the form of allowing investors to e-mail a stock chart to another individual. Investors can send other information by cutting or copying it from the application and putting it into another application that can then be attached into an e-mail. However, this is of greatly diminished value in that the process and data are not integrated and seamless. Thus, there remains an unfilled need to better facilitate the sharing of information (e.g., charts, screens, and watch lists) among investors.

While a few existing products offer users some help in understanding or interpreting the overall condition of the market, most offer limited or simplistic and isolated perspective on the market, while some provide single point data such as the percentage increase or decrease of some of the popular indexes. A problem with widely-quoted indexes (the Nasdaq Composite Index, Dow Jones Industrial Average, or the Standard and Poors 500 Index) is that they are weighted, meaning more consideration is given to larger companies. If one large stock on an index moves up and ten small stocks on the same index move down, the index could very likely show an overall move up, thus masking the true overall status of how all stocks have performed on a given day. Some fundamental news sources calculate and publish the Advance-Decline line. The Advance-Decline measurement indicates the number of stocks on the New York Stock Exchange (NYSE) that have advanced and the number of stocks that have declined over a given period of time. No tool exists, however, for gaining insight into how the broader market (all stocks trading on the NYSE, the American Stock Exchange (AMEX), and Nasdaq Stock Exchange (NASDAQ) performs on an end-of-day basis. Therefore, there remains a need for a decision support tool offering overall performance information as to how all stocks have performed on a given day.

Additionally, professional investors realize, day trading is generally ill advised for the personal investor. Commonly, the personal investor will accept small gains in one position while letting losses grow too large in other positions—often to the detriment of the personal investors financial wealth. However, day traders often realize tremendous personal satisfaction when they choose that one correct position and reap, often temporarily, significant financial gains. Thus, a system is need which allows a personal investor to experience the highs of investing without suffering too many of the losses.

SUMMARY OF THE INVENTION

The present invention provides a stock analysis, management and education system and process. More specifically, the present invention provides an Internet based software application which allows a client to receive daily trading information from a central web server on all the Stocks traded without having to conduct multiple queries and/or extended downloads. The present invention also allows a client to manipulate the various data variables associated with a stock in determining in which stocks to invest.

The present invention utilizes an Internet based server which is in communication with the various stock exchanges, clearing houses, brokerages, news wires, and other entities which provide financial, stock, and/or market information on a real-time basis. The server extracts the needed information from these various sources via the Internet, dial-up connections, or similar communications links. The server is also connected via the Internet with at least one client system. The client system provides those functions and features necessary to interact with the server and provide the stock analysis and management features described herein.

The present invention also provides for the efficient transfer of daily stock information from the server to the client system. Under the process of the present invention, the server receives all the stock information from the various exchanges and processes the information into a plurality of distinct files. These files are preferably stored in a binary format. When a client desires to receive updated stock information, the client system establishes a communications link with the server, receives a list file from the server, and requests and receives from the server those files indicated on the list file which the client system has not received. In this manner, the present invention rapidly decreases the amount of information and time for transmitting such information to a client system. Upon receiving the download from the server, the client system suitably merges the received information with existing files, thereby creating a complete data file of relevant stock information.

Another feature of the present invention, is the process by which clients may create screening criteria. The present invention allows a client to create screening criteria for Stocks by choosing from phrases and pre-defined lists of terms to describe the types of Stocks for which they are searching. The present invention preferably provides this feature within a point and click environment such that upon selection of a criteria a listing of available and relevant operands are provided along with an entry field and/or a listing of relevant parameters. In this manner, the present invention enables a client to quickly develop screening criteria. Additionally, the present invention allows a client to conduct multiple query/criteria screenings of stocks.

In addition to providing the features and functions mentioned previously with regards to screening, the present invention enables a client to specify how, which, and what variables will appear on a screen display. This functionality is provided by a completely configurable, customizable results pane which allows a client to display up to 80+ indicators, in any combination The present invention also provides a more efficient system and process for receiving charting information for Stocks. The present invention separates charting data from screening data. By so separating these data types, the present invention reduces the download time necessary for screening data by not attempting to also send historical charting data at the same time. Also, the present invention reduces the transmission times associated with retrieving historical charting data for stocks by providing "quick update" files which preferably contain two weeks of charting data for Stocks. By connecting a client system with a server implementing the present invention, the client may retrieve update files on a periodic basis and is not required to retrieve an entire historical chart for a Stock every time current historical information is needed.

Additionally, the present invention allows a personal investor to experience the excitement of day trading by providing the relative low risk practice of exiting positions before closing. The present invention provides these capabilities through its Stock screening features. More specifically, the present invention, through it Day Trader's Average (DTA) screening criteria allows a personal investor to pick those Stocks which habitually move in a certain direction based upon an opening price without having to risk trying to pick a stock's intra-day tops and bottoms. Similarly, by utilizing the present invention's Overnight Average (ONA) screening criteria, the personal investor can identify those stocks which they can buy wholesale—during the last few minutes of trading, and sell retail—during the first few minutes of trading the following morning, based upon established trading data.

An En Fueg-o-meter is also provided by the present invention. This meter enables a client to view the recent performance of any stock at a glance. By providing color and other indicators, the meter indicates whether a stock is trending down, trending up, or within a preset range. Additionally, the present invention provides alert indicators which signal to a client when a stock is performing in a non-desired characteristic. The alert indicators may be custom designed by the client and/or default alerts may be used.

Another feature of the present invention is the ability to monitor the performance of a stock using known candlestick algorithms. This feature provides pattern matching capabilities by which the client may use a decision tool in determining whether to invest in a stock. This feature also provides for the simultaneous display of model and ideal patterns.

The present invention also allows an investor to test trading ideas back in time using historical stock information. By utilizing this back testing feature, the client may view at-a-glance the price performance and the raw gain or loss in dollars and percentage points since a designated back testing data date.

The present invention also combines the before mentioned features with e-mail, and watch list features. A client using the present invention may receive and generate e-mails, receive watch lists, conduct trades, perform research, and various other functions from a single Internet browser. The present invention also provides on-screen demonstrations and various other educational features which allow a client to learn and manage the various features of the present invention at any time, from any place, with or without an Internet connection.

Lastly, the present invention allows system administrators to track various user data including update frequency, whether such updates are successful, how many times an application is used between updates, whether they respond to advertisements or other communications, and various other information.

The before mentioned features and functions of the system and process of the present invention are more fully described herein with reference to the following drawing figures, the detailed description, and the claims.

BRIEF DESCRIPTION OF THE DRAWINGS

FIG. 9 is a representation of a customized column control display created by the process of the present invention;

FIG. 24 is a representation of a data entry field for the screening criteria function of the present invention in which multiple criteria have been entered;

FIG. 71 is a sample advertiser summary report that is stored on the Web server;

FIG. 72 illustrates the user statistics, like update success/failure and screen resolution, that are stored on the server;

FIG. 73 illustrates the general statistical and user demographic information that is stored in the server-side user database;

FIG. 74 depicts sample data about advertisement users that is stored on the Web server in connection with a particular advertisement; and FIG. 75 is a sample advertisement summary report that is stored on the Web server.

DESCRIPTION OF THE PREFERRED EMBODIMENTS

Data Conditioning and Optimization

One aspect of the present invention provides a system and methodology for processing and analyzing information pertaining to stock, bonds, mutual funds, and other investment vehicles (hereafter, "Stock") from a personal computer in an optimized time period. More specifically, the present invention provides a novel data conditioning and optimization process and system which allows a user to screen thousands of stock and other investments based upon pre-determined parameters from a personal computer in an optimized time period.

Figure 1:
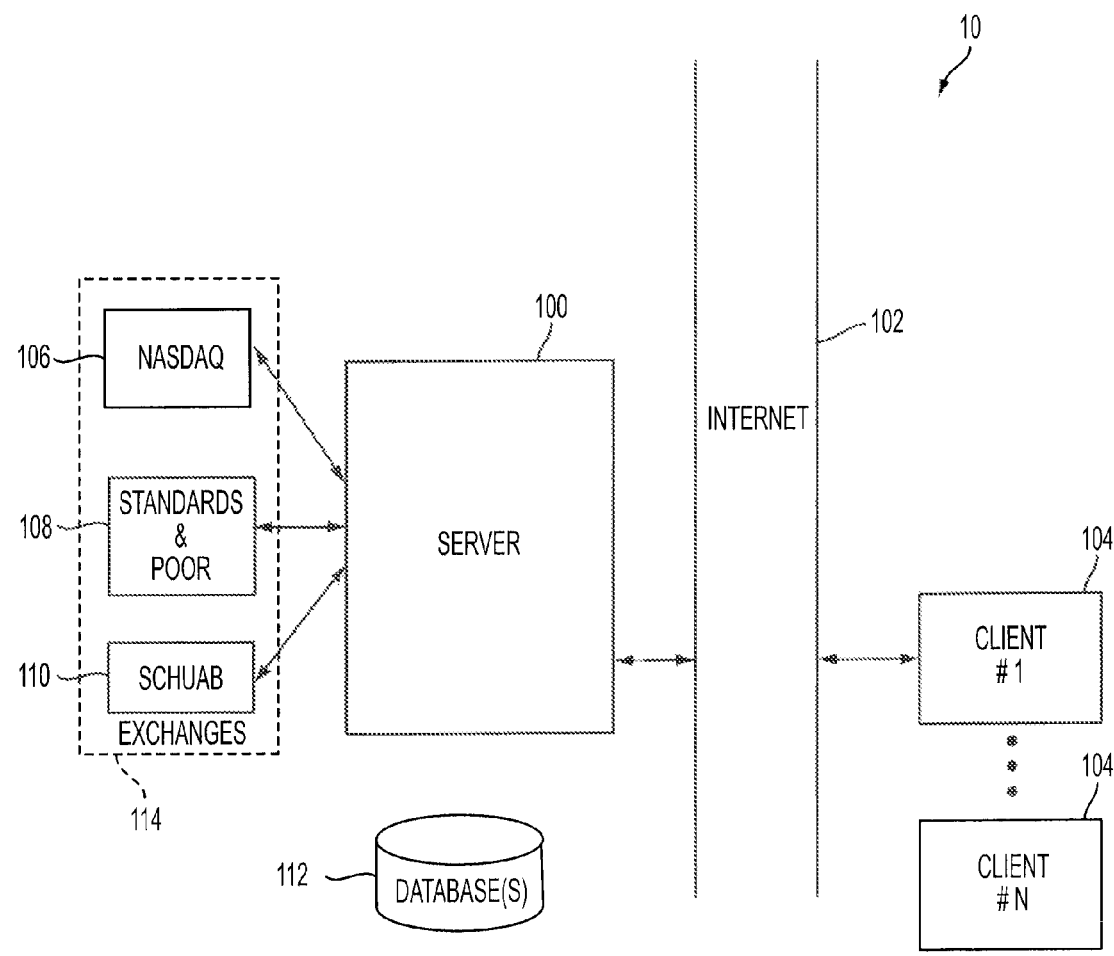
FIG. 1 is a schematic representation of a preferred embodiment system of the present invention.

As shown in the FIG. 1, the present invention provides a system which utilizes the data processing capabilities of many commonly available servers (100), the data sharing and retrieval capabilities of the Internet (102), with flexibility and dependability of personal computers commonly utilized in a home and/or business setting (104). By utilizing each of these components, the present invention provides the before mentioned features and functions of interpreting, messaging, and filtering stock data such that clients may identify those stocks which possess specific characteristics and/or fall within pre-determined parameters via an Internet connection in a timely manner. Additionally, while the present invention is described herein with reference to stocks, those skilled in the art appreciate that with minor variations the present invention may be configured to provide the features and functions provided herein, with reference to stocks, for various other investment vehicles.

The system 10 utilizes the Internet 102 to provide the communications links necessary to allow a client system 104 to communicate with the server 100. The server 100 may also utilize the Inter net 102 and/or dial-up or similar communications links (all of which are commonly known in the art) to communicate with systems provided by the various exchanges 106 (for example, NASDAQ, AMEX, and NYSE), rating houses 108 (for example, Standards & Poor and Bloomberg), or brokerages 110 (for example, Schwab, JP Morgan, Ameritrade), all of which are hereafter collectively referred to as "exchanges" 114. The server 100 also is in communication with various databases 112. These databases 112 may be collocated with the server or remotely located. Those skilled in the art readily appreciate that the server 100 may access various databases via the Internet, direct dial-up links, local networks, and in similar manners. While the present invention is described in the context of a server 100 in communication with various other systems, it is to be appreciated that the present invention is not limited to any single system configuration. A distributed network of servers, stand-alone servers, mainframe computers, and various other system configurations may be utilized by the present invention. Similarly, the client systems 104, while preferably utilizing computer workstations (for example, a Compaq® personal computer with a Pentium III® processor), may be any device capable of establishing an Internet connection, communicating with the server 100, and downloading files from the server 100, as necessary. Those skilled in the art appreciate that such devices include (or soon will include) computer workstations, lap top computers, personal data assistants, and digital wireless telephones. As such: the present invention is not limited to specific system components or communications links.

Utilizing the system 10 as described above, one aspect of the present invention provides for the optimized data conditioning of stock information. The present invention provides such optimization by utilizing the before mentioned system components (the server 100, client systems 104 and exchange 114) in an optimal manner. More specifically, instead of requiring client system 104 to process thousands of pages of Stock information in order to process, filter and categorize Stock data, these functions are accomplished by the server 100.

FIG. DC02 provides one example of a prior art methodology (implemented by an appropriately equipped system) for processing Stock information. This process is commonly accomplished in prior art systems by a user's system. Since a user's system often does not have the data storage and manipulation capabilities of today's servers, such functions commonly require greater than 15 minutes to process a single query. In contrast, the present invention allocates these process functions to the server 100 and thereby allows a client to retrieve the same information at a rate which is 1800 times faster.

As shown in FIG. DC02, one such process for managing Stock information begins when a query is parsed (Block 146). The query may comprise any indicator for a Stock, including, for example, a query seeking all stocks that moved above their 10-day moving average line, which also traded by more than twice their normal trading volume. The server 100, parses such a query into its sub-elements, and then screens the NASDAQ, NYSE, and AMEX databases for stocks which fit each criteria. When screening, the server 100 first selects a stock to screen (Block 150). The server may begin its screening by selecting stocks in alphabetical order, by most frequently traded (for example, ignoring stocks which show very little volatility—such as an utility stock), or based upon any other parameter.

After determining a stock to screen, the server accesses a database 112 (FIG. 1) which contains stock data. Alternatively, the server might also access a database or data file provided by an Exchange 114, as desired. As shown in Block 154, this step (in Block 152) may be very time consuming since the server 100 has to access a database (for example, one contained on a hard drive) repetitively for each sub-element of the parsed query. Additionally, the server 100 must determine which algorithms are necessary for the screening process (Block 156). Those skilled in the art appreciate that a data search query is fundamentally a search via an algorithm for data meeting specific parameters. When numerous parameters are desired, a search might be performed for each parameter, or the parameters might be combined via an appropriate algorithm. The present invention preferably combines parameters using commonly known algorithms. As mentioned in Block 158, processing algorithms repetitively is often a very time consuming process which requires significant processing capabilities in order to accomplish in an efficient time period.

After opening the data from the hard drive and processing the necessary algorithms (all of which are commonly known in the art), the server 100 processes all of the query's parameters (Block 162). When the processing is completed, the server closes the Stock data files (Block 164), and checks whether a particular Stock met the conditions in the query (Block 166). If so, the stock is added to a hit list (Block 168). If the stock did not meet the conditions, the server advances to Block 170.

At Block 170, the server 100 queries whether there is another stock to screen. For the thousands of stocks on the various exchanges (NASDAQ, NYSE, and AMEX) the server 100 will repeat the above process until each has been analyzed (Block 160). On a personal computer, performing the above process steps would generally be extremely time consuming.

After every stock has been examined (Block 170), the server then determines whether any stock made the hit list (which was generated in Block 168) (Block 172). If so, the server 100 ends the screen and records as a result the raw data which made the hit list (Block 176). If not, the server 100 ends the screen and records zero hits as a result (Block 174).

As mentioned previously, the before mentioned Stock data processing methodology is well known in the art. However, currently available systems require a client's system 104 to perform the before mentioned processing steps, which is quite time consuming. One of the novel aspects of the present invention is its ability to screen millions of data points (over 400 MB) for each Stock for each day which are sent to a client each day in a data file of less than 2.0 MB, and preferably of only 1.6 MB.

The present invention accomplishes these performance gains by breaking out information for each Stock into separate data files. As shown in FIG. DC01, information for each Stock is broken into two file categories: Highly Dynamic and Infrequently Updated. Additionally, the information is broken into five file types: Historical Price/Volume Information (hereafter, the "H file") (Block 116); Split Information (hereafter, the "E file") (Block 134); Raw Fundamental Information (hereafter, the "I file") (Block 128); Company Name (hereafter, the "K file")(Block 126); Industry Information (hereafter, the "F file")(Block 118); and Option Information (hereafter, the "G file")(Block 120). The H file and the E file are classified in the Highly Dynamic category, while the remaining files are classified in the Infrequently Updated category.

The server 100 obtains information from the H file (Block 116), the F file (Block 118) and the G file (Block 120) and, via various commonly available algorithms (Block 122), processes this information into an End of Day (EOD) data file (hereafter, the "B file") (Block 124). The B file is preferably stored in a binary file format. Those skilled in the art appreciate that a binary file format, versus a byte file format, provides for greater data compression and therefore a smaller data file size. Using the binary file format, the B file is preferably provided as an output file of around 900 Kb in size. In the preferred embodiment, the B file is named "out1.txt". The B file contains one PRICE_T structure for each stock. The PRICE_T structure for one stock (in "C" code) is found below:

```
typedef struct
{
characteristics sym[7];
characteristics ind;
long prop,macd,trigs;
float op,cl,h,l,h52,l52,vol,pr_ch,vol_ch,pr_ch30,pr_ch5;
float vol_ave1,vol_ave2,vol_ave3,rsi,h_l,Di;
characteristics dtaBull, dtaBear, dtaDollarBull, dtaDollarBear, GapUp, GapDown, Adx;
characteristics dta50Bull,dta50Bear;
characteristics on a50Bull,on a1Bull,on a25Bull, on a50Bear, ona1Bear, ona25Bear;
characteristics cPerUpMacd, cwPerUpMacd;
char bull, bear;
characteristics cStoch,cQPDay;
float f3pbLimit;
} PRICE_T;
```

Referring again to FIG. 4, the server 100 also processes the fundamental information for each stock (i.e., the I file)(Block 128). The fundamental information includes variables such as the number of shares outstanding, the market capitalization, the Beta for the Stock, the dividend, and various other parameters. For the preferred embodiment, the fundamental information (I file) is provided in the "fund_t" structure for a professional investor version of the present invention and in the "r_finfo" structure for a non-professional investor version of the present invention. The "I" file is also converted from an ASCII format into a binary format (Block 130). Various algorithms are performed upon the information such that an Optimized Fundamental Information File (hereafter, the "C file") is generated (Block 132). The C file is provided as an output file by the server 100 and is called "resex_main.txt." The fundamental information structure for one stock for a professional investor is:

```
typedef struct
{
characteristics date[3];
characteristics sym[7];
// things that don't change
    float fSharesOutStanding; //366,10
// float fMarketCap; //386,10
float fBeta; //246,10
float fFloat; //376-10
float fGrossMarginTTM; //942,10
float fOperationMarginTTM; //972,10
float fProfitMarginTTM; //1032,10
float fRevEmployee; //1271,10
float fCashPerShare;
float fCurrentRatio;
float fDebtEquity; //1886 1826,10 to Equity
float fLTDebtEquity; //3183,10 1766,10 to Equity
float fBookValue; //1906,10
float fPrice2Sales; //2115,10
float fPrice2CashFlow; //2115,10
float fRetEquity; //862,10
float fRetAssets; //902,10
float fRetInvest; //2883,10
float fLastQtrEpsInc; //1536,10
float fLastQtrEpsExc; //1566,10
float fEps12TTM; //1576, 10
float fEps[5]; // calculated
float fEps12Chg; //3083,10
float fEpsPriorQtrChg; //3063,10
float fDiv; //396,10
float fInst; //276,10
float fInsiderBuy; //585,10
float fInsiderSells; //595,10
float fInstBuy; //644,10
float fInstSells; //654,10
float fShortIntPerFloat; //702,10
/* at 123 bytes already*///earnings stuff
```

```
// date, symbol,multex,company,current fiscal, current
    quarter,end month
//prevyear1, prevyear2,last 4 quarters, mean opinion, num
    opinion,
// curryearest,nextyr1est,nextyr2est,next 4qtrest, ltgaver-
    est
// int nAnalysts;
float fCurYrEst;
float fNextYr1Est;
float fNextYr2Est;
float fCurQtrEst;
float fNextQtr1Est;
float fNextQtr2Est;
float fNextQtr3Est;
//159 bytes—1.43 M file
}fund_t;
```

Similarly, the fundamental information structure for a non-professional investor for one stock is:

```
typedef struct R_FINFO
{
char sym[7];
float eps[5],inst,eps12,div;
long shares;
}r_finfo;
```

In addition to providing the B file and the C file data to a client, the server also provides the K file and E file information. Whenever a client desires to utilize the present invention for Stock analysis, the client preferably establishes a communications link, via the Internet 102, with the server 100 (Block 136). The server 100 then sends to the client system 104 a list identifying the most current version of the Stock information. The client system compares its stored version against the list and determines which segments of stock information identified on the list need to be downloaded from the server. The client then downloads those B file, K file, C file, and E file segments previously identified (hereafter, collectively the "Download files"). These Download files are then compared with existing files on the client's system 104 (except, when a client accesses the server for the first time, no comparison is performed). The client's system 104 then performs updates of the data files stored on the client system 104. In particular, when fundamental information (i.e., the C file) is requested, the client system (which is utilizing a suitable application software such as software provided by Big Easy at the bigeasyinvestor.com web site) sends the date it last tried to update its fundamental information. The server 100 reads the date and returns only the stocks that have been updated since that date. Similar comparisons and data retrievals from the server 100 are also performed for the K file and E file information.

Figure 4:
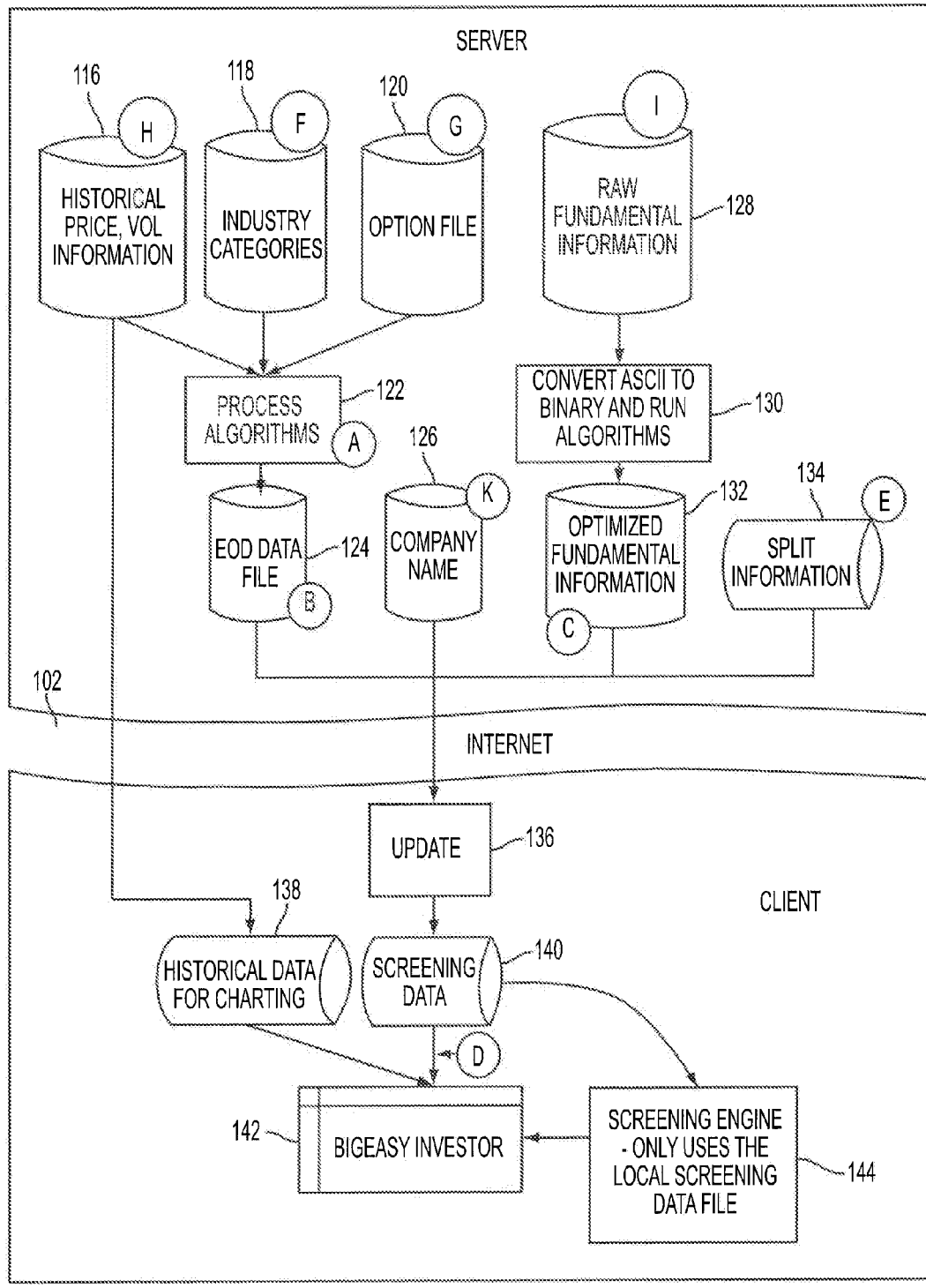
FIG. 4 is a flow diagram of the process of the present invention by which stock information is processed by the server and utilized by the client system.
Figure 5:
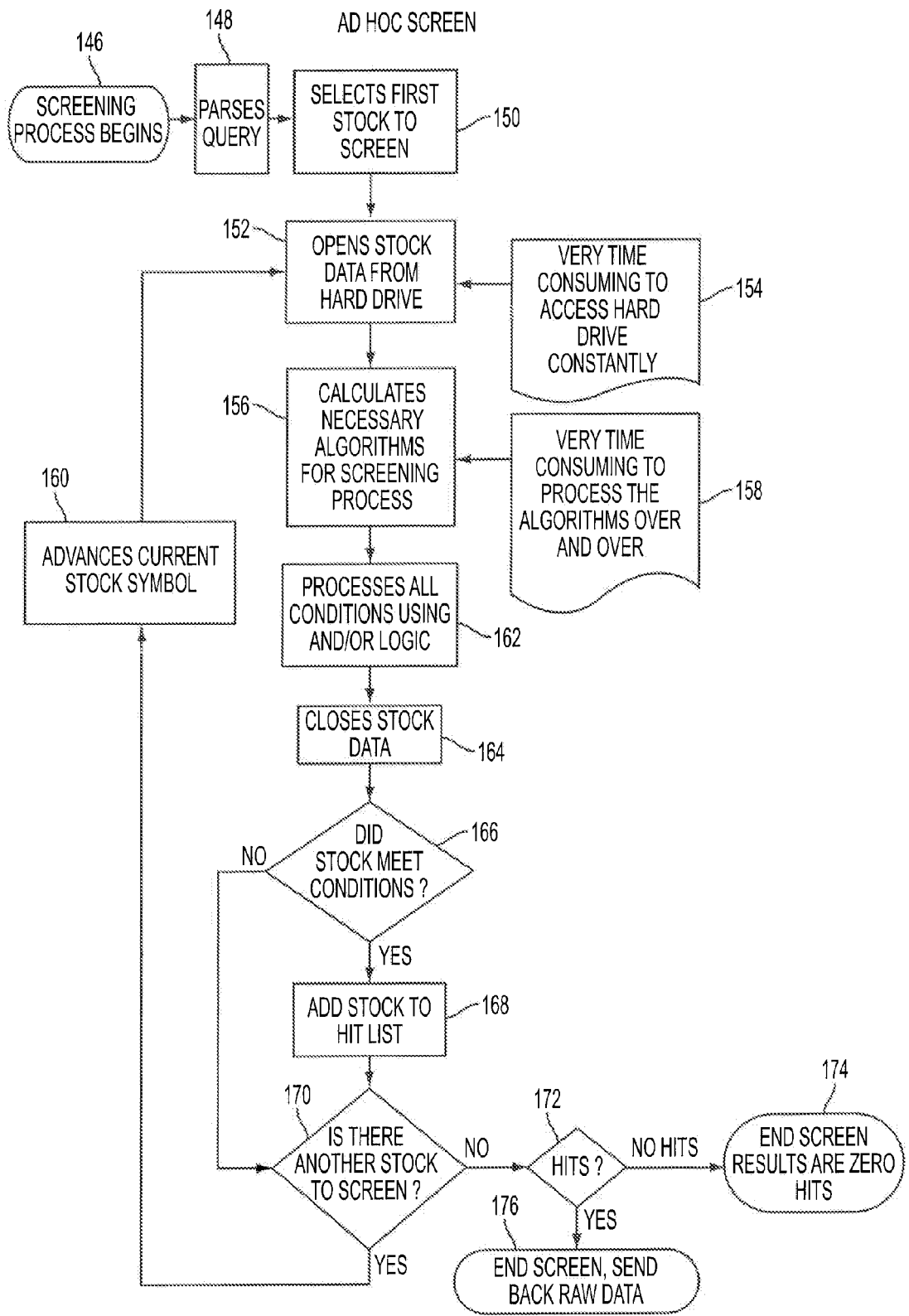
FIG. 5 is a flow diagram of a prior art process for processing information for a single stock at a time.

Once the necessary files are downloaded from the server 100, the client system 104 merges these files into one EOD Screening file (as represented in FIG. 4 by the letter "D", hereafter the "D file")(Block 140). Using the D file and preferably the Big Easy Investor application software (which at this point does not require an Internet connection), the client may then select stocks to screen using a myriad of criteria combinations (Block 142). More specifically, the client system performs these screening functions by utilizing a look-up table approach based upon a local data file (Block 144). By utilizing a local data file, the present invention eliminates the need for a client system to remain connected to the Internet and more importantly the server 100. These reductions conserve Internet bandwidth and download times. Additionally, since all the data processing for Stock information is accomplished on the server 100, the method and system of the present invention increases the processing time for various screenings by 1800:1. Instead of requiring 15+ minutes to process a single query, the present invention may process a single query in less than half (½) a second. Additionally, the present invention reduces memory requirements on the client system 104 from approximately 400 MB (using currently available methodologies and systems) to around 1.6 MB.

Additionally, in the preferred embodiment, the client system 104 processes the screening of parameters by utilizing AND logic. Those skilled in the art appreciate that by utilizing AND logic instead of the more common OR logic, the data set identified by this process is significantly reduced and the processing time correspondingly minimized. The preferred embodiment preferably utilizes the following "C" code to provide the AND logic processing:

```
int nLEN;
while ((nLen—xmlQry.Parse Query(pScreen))>0)
{
xmlQry.GetCond(&c);
m_bMatch=QueryDatabaseEx(&m_eod,&c);
pScreen+=nLen;
}
```

By utilizing the AND logic, an order difference in processing operations is achieved over OR logic. For OR logic, which must hold all results in anticipation if one condition is true, the order is N(C), where N*C is the number of operations performed.

In contrast, for AND logic, items not meeting the current condition are discarded. As such, the order is Nx(x+1), where N(1)+N1(2)+Nx-1(x) ... where x=Cth condition is the number of operations performed.

The present invention also allows the client system 104 to receive and utilize historical data for charting (Block 138). The historical data is preferably updated automatically whenever a client system 104 contacts the server 100 and requests a complete data download. Also, the present invention may be configured such that the client may merely request updates of historical data, split information, company name information, fundamental information and/or any other information processed by the server.

In addition to providing the various information and data files mentioned above pertaining to Stocks, the present invention also provides a client system 104 with the capability of utilizing various commonly known in the art indicators to screen Stocks. For example, the following indicators are provided with and accessible by a client using a system implementing the present invention:

| Japanese Candlestick Bullish Patterns |
| --- |
| Upside Tasuki Gap Bullish |
| Upside Gap Three Methods Bullish |
| Unique Three River Bottom Bullish |
| TriStar Bullish |
| Three White Soldiers Bullish |
| Three Stars In The South Bullish |
| Three Outside Up Bullish |
| Three Line Strike Bullish |
| Three Inside Up Bullish |
| Stick Sandwich Bullish |
| Side By Side White Lines Bullish |
| Separating Lines Bullish |
| Rising Three Methods Bullish |
| Piercing Line Bullish |
| Morning Star Bullish |
| Morning Doji Star Bullish |
| Meeting Lines Bullish |
| Matching Low Bullish |
| Mat Hold Bullish |

| Japanese Candlestick Bullish Patterns |
| --- |
| Long Legged Doji Bullish |
| Kicking Bullish |
| Inverted Hammer Bullish |
| Homing Pigeon Bullish |
| High Price Gapping Play Bullish |
| Harami Bullish |
| Harami Cross Bullish |
| Hammer Bullish |
| Engulfing Bullish |
| Concealing Baby Swallow Bullish |
| Breakaway Bullish |
| Belt Hold Bullish |
| Abandoned Baby Bullish |

| Japanese Candlestick Bearish Patterns |
| --- |
| Upside Gap Two Crows Bearish |
| Two Crows Bearish |
| TriStar Bearish |
| Thrusting Bearish |
| Three Outside Down Bearish |
| Three Line Strike Bearish |
| Three Inside Down Bearish. |
| Three Black Crows Bearish |
| Side-By-Side White Lines Bearish |
| Shooting Star Bearish |
| Separating Lines Bearish |
| On Neck Bearish |
| Meeting Lines Bearish |
| Low Price Gapping Play Bearish |
| Long Legged Doji Bearish |
| In Neck Bearish |
| Identical Three Crows Bearish |
| Harami Bearish |
| Harami Cross Bearish |
| Hanging Man Bearish |
| Falling Three Methods Bearish |
| Evening Star Bearish |
| Evening Doji Star Bearish |
| Engulfing Bearish |
| Downside Tasuki Gap Bearish |
| Downside Gap Three Methods Bearish |
| Deliberation Bearish |
| Dark Cloud Cover Bearish |
| Breakaway Bearish |
| Belt Hold Bearish |
| Advance Block Bearish |
| Abandoned Baby Bearish |

| Price and Fundamental Indicators | | |
| --- | --- | --- |
| 52 Week High | Symbol | EPS Chg Last Qtr |
| 52 week Low | Volume of Today | DTA 2.5% Bear |
| Accumulation Distribution | Volume Change % | DTA $1 Bull another |
| Average Volume 2 Days | Volume Price Trend Moving Average | All Candles DTA $1 Bear |
| Average Volume 1 Month | 10 Days En Fueg-o-meter - Red | Gap Up Gap Down |
| Average Volume 6 Months | En Fueg-o-meter - Green | Breakout Bull ADX |
| Closing Price | En Fueg-o-meter - Yellow | DI Ratio MACD Bull |
| Daily High Daily Low | P/E | MACD Bear |
| Moving Average 50 Days | EPS Current Qtr EPS 1 Qtr Ago | MACD Cross Up Center |
| On Balanced Volume | EPS 2 Qtr Ago | MACD Cross Up |
| Optionable | EPS 3 Qtr Ago | Trending |
| Opening Price | EPS 4 Qtr Ago | Up |

| Price and Fundamental Indicators | | |
| --- | --- | --- |
| 1 day Price Change % | 30 day Price Change % | MACD Cross Up Trending |
| Price Rate of Change Relative Strength | Outstanding Shares | Down |
| DTA 2.5% Bull | Market Value | MACD Cross Down |
| Daily Range Average | % held by Inst | Center |
| MACD Cross Down Trending Down | Dividend Dividend Yield | MACD Cross Down Trending Up |
| Weekly MACD Bull | EPS TTM | Cross Up |
| Weekly MACD Bear | EPS Chg TTM | Stochastic |
| Weekly MACD Cross Up | Breakout Bear 3 Lower Days | Stochastic Cross Up 80 Stochastic Cross Up 20 |
| Center | 3 Higher Days | Stochastic Cross Up 75 |
| Weekly MACD Cross Down Center | 3 Consolidation Days DTA $.50 Bull | Stochastic Cross Up 25 3PB |
| Moving Average 10 Day | DTA $.50 Bear 5 day Price Change % | 3PB Reversal 3PB Limit |
| Bull Moving Average | Moving Average 10 Cross | Quiet Period Quiet Period Day |
| 10 Day Bear | Up 50 Day Moving Average | Stochastic % K Cross Up |
| Moving Average 10 Day | 10 Cross Down 50 Day | % D Moving Average |
| Cross Up Moving Average | Moving Average 10 Cross | 13 Day Bear |
| 10 Day Cross Down | Up 2 Days Moving Average | Moving Average 13 Day |
| Moving Average 50 Day | 10 Cross Down 2 Days | Cross Down Stochastic Cross |
| Bull Moving Average | Bull Ratio Bear Ratio | Down 80 Stochastic Cross |
| 50 Day Bear | Day's Range Close from Low | Down 20 Stochastic Cross |
| Moving Average 50 Day | Exchange ONA $.50 Bull | Down 75 Stochastic Cross |
| Cross Up Moving Average | ONA $.50 Bear ONA $1 Bull | Down 25 Stochastic % K Cross |
| 50 Day Cross Down | ONA $1 Bear ONA 2.5% Bull | Down % D 30 day Price Change $ |
| MACD Days Trending Up | ONA 2.5% Bear Industry | 5 day Price Change $ 30 Day Close |
| MACD Days Trending | Moving Average 13 Day | 5 Day Close 1 day Price Change $ |
| Down | Bull | Prev Day Close |
| MACD Fast Over Slow Moving Average | Moving Average 13 Day | Number of Days Trading |
| 10 Day | Profit Margin | Short Interest |
| Over 50 Day | Last Qtr | Current Year's |
| Company Name | Revenue per | Estimates |
| Weekly MACD Cross Up | Employee Debt/Equity | Next Year's Estimates 2 Year out Estimates |
| Trending Up | LT Debt/Equity | Current Qtr's |
| Weekly MACD Cross Up | Book Value Price to Sales | Estimates 1 Qtr out Estimates |
| Trending Down | Price to Cash Flow | 2 Qtrs out Estimates |
| Weekly MACD Cross Down Trending Up | Price to Equity Price to Assets | 3 Qtrs out Estimates Cash/Share |
| Weekly MACD Cross Down Trending Down | Return on Investment Last Qtr Eps (Inc) | Current Ratio Money Flow Index |
| Weekly MACD Fast Over | Last Qtr Eps (Exc) Insider Buying | (IBD)Relative Strength Williams % R |
| Slow | Insider Selling | |
| Beta | Institutional Buying | |
| Float | Institutional Selling | |
| Gross Margin Last Qtr Operation Margin Last Qtr | | |

Figure 2A:
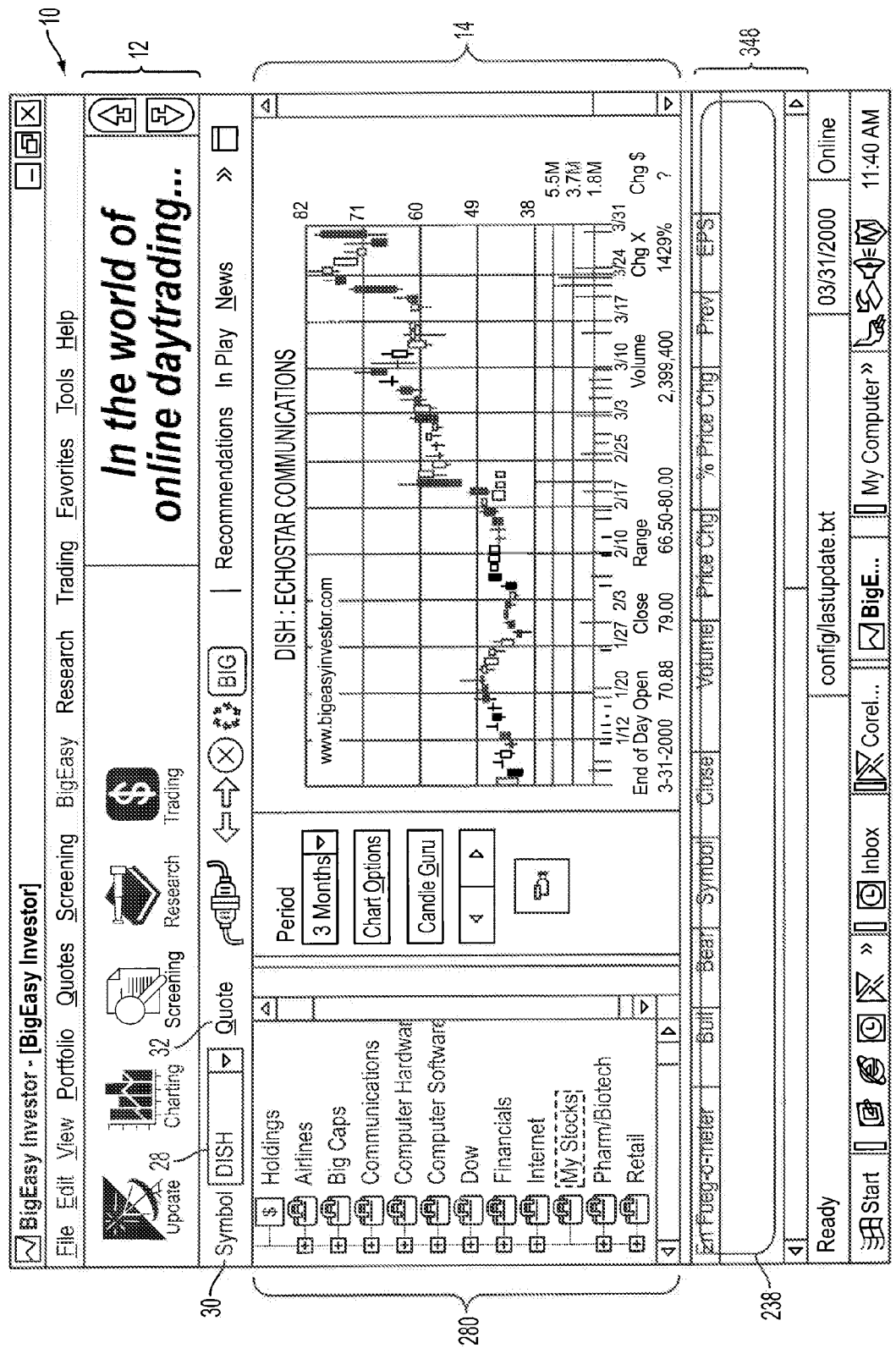
FIG. 2A is an exemplary screen shot showing the various fields and menu bar options provided by a first configuration of a display for the present invention.
Figure 2B:
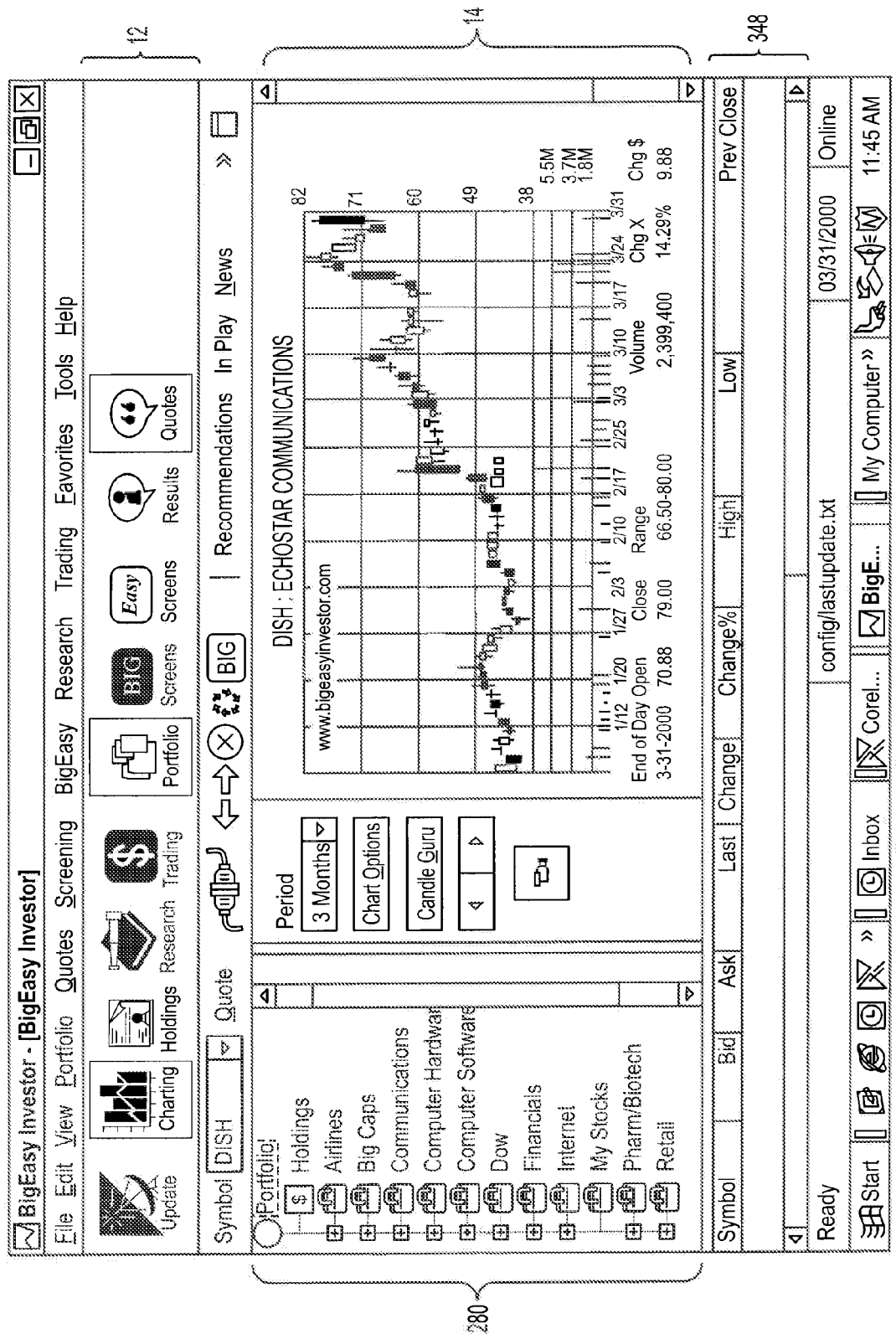
FIG. 2B is an exemplary screen shot showing the various fields and menu bar options provided by a second configuration of a display for the present invention.
Figure 7:
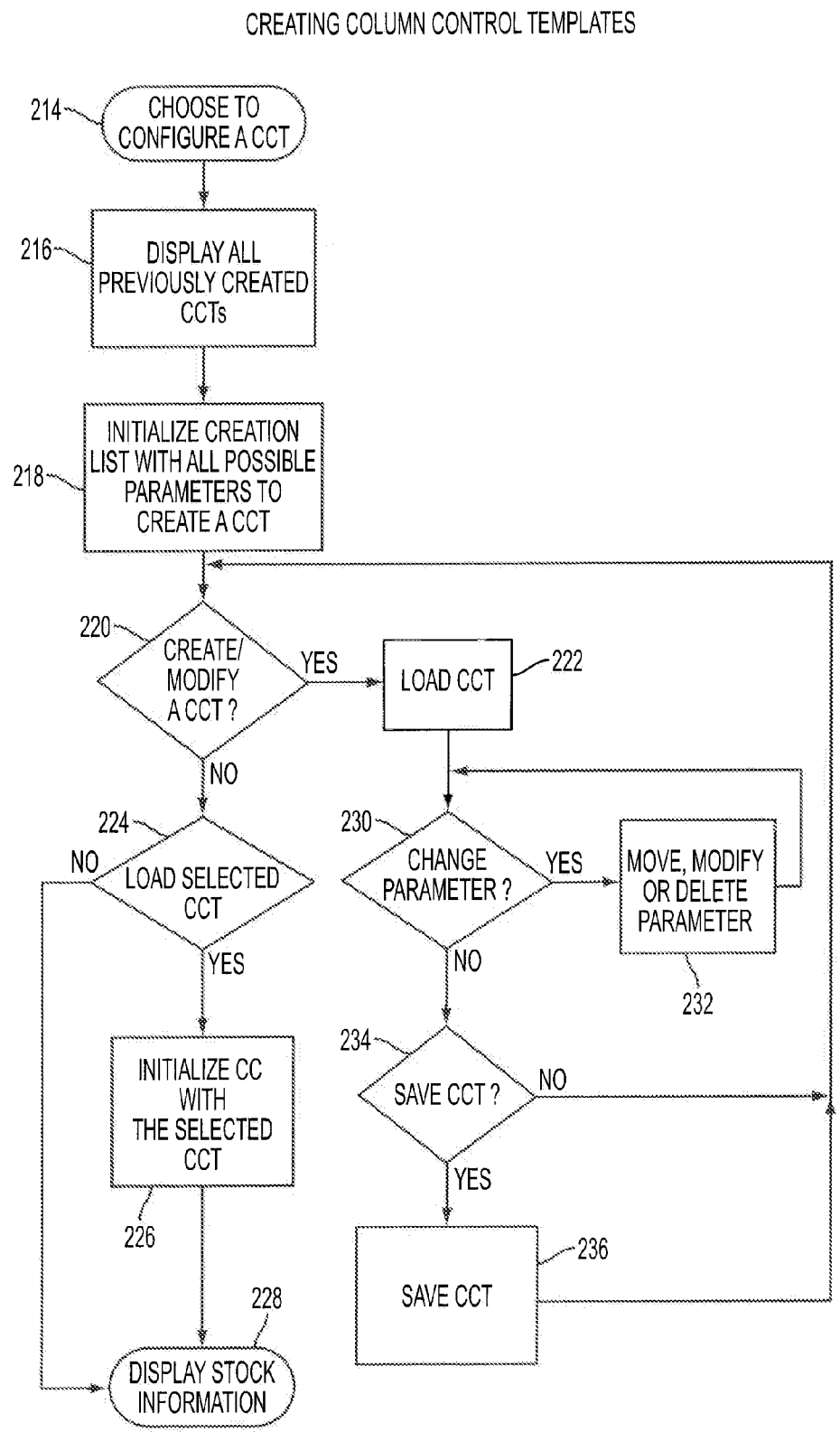
FIG. 7 is an flow diagram of the method for the present invention by which column control templates are developed.
Figure 8:
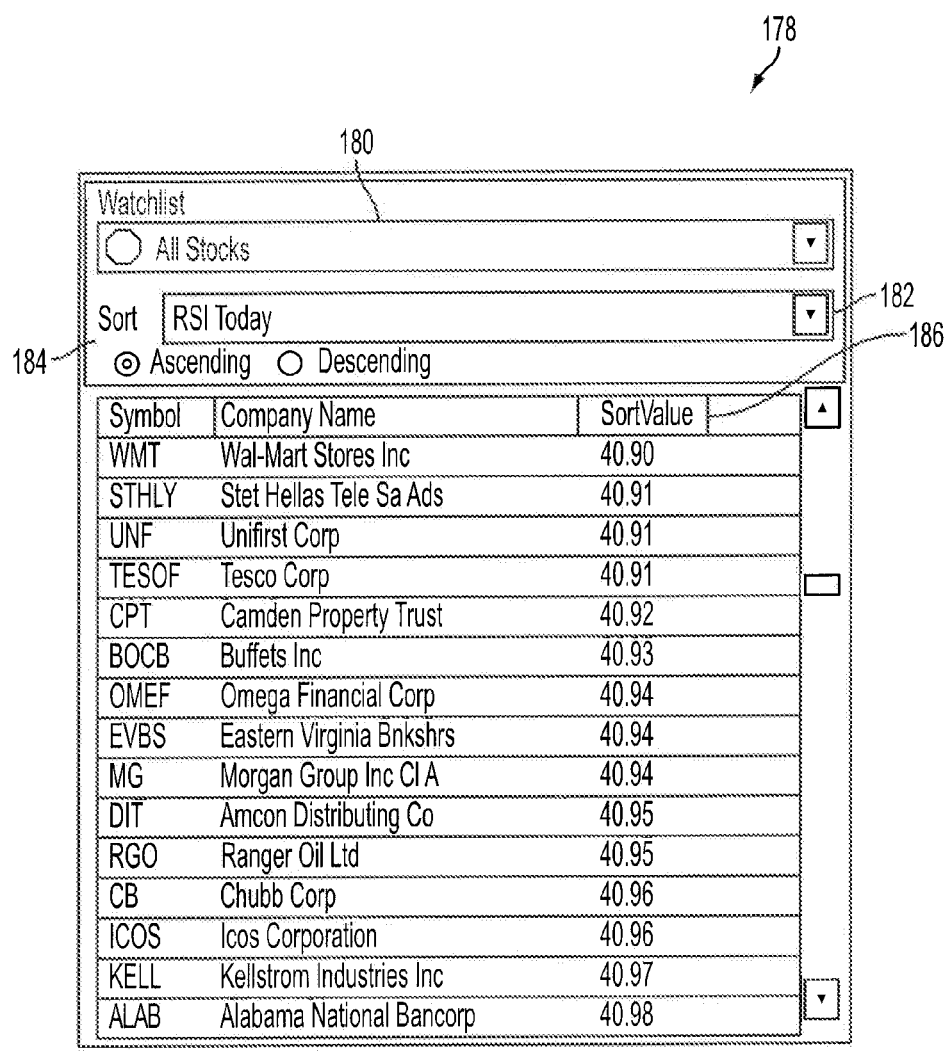
FIG. 8 is an exemplary screen shot of a prior art system used in selecting the order and arrangement of information.

As mentioned previously, the present invention allows a client to customize column headings via the process shown in FIG. 7. As shown in FIG. 2A, one embodiment of the Home screen 10 for the present invention is displayed. The home screen 10 provides a client with three window panes 14, 280, and 348, and a menu bar 12 which varies as the various processing functions of the present invention are selected (FIG. 2B provides one example of the variations in the menu bar 12 which are possible for the present invention). The three window panes display various data and other variables which are available via the present invention. The first field 14, generally provides charting data, holdings data, trading data, and research data. The second field 280, generally provides a tree menu structure of the client's portfolio, the Big screening options and the Easy screening options, which are discussed in greater detail below. The third field 348 provides two displays, an indicator pane 238 (as shown in FIG. 9) and a quotes pane (which provides twenty minute delayed quote information for selected stocks throughout a trading day).

Figure 3:
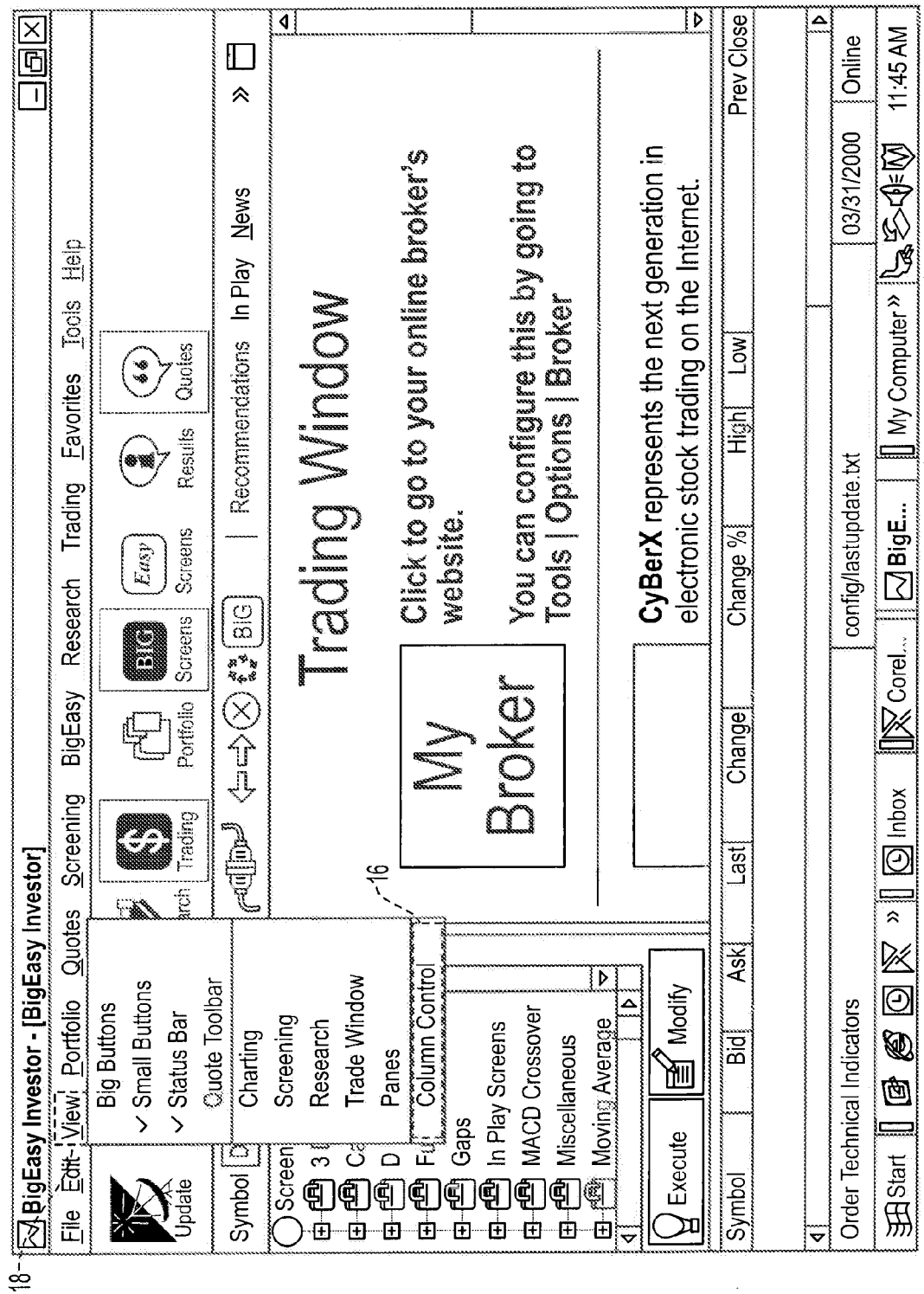
FIG. 3 is a representation of a drop down list by which a client selects the column control feature of the present invention.
Figure 10:
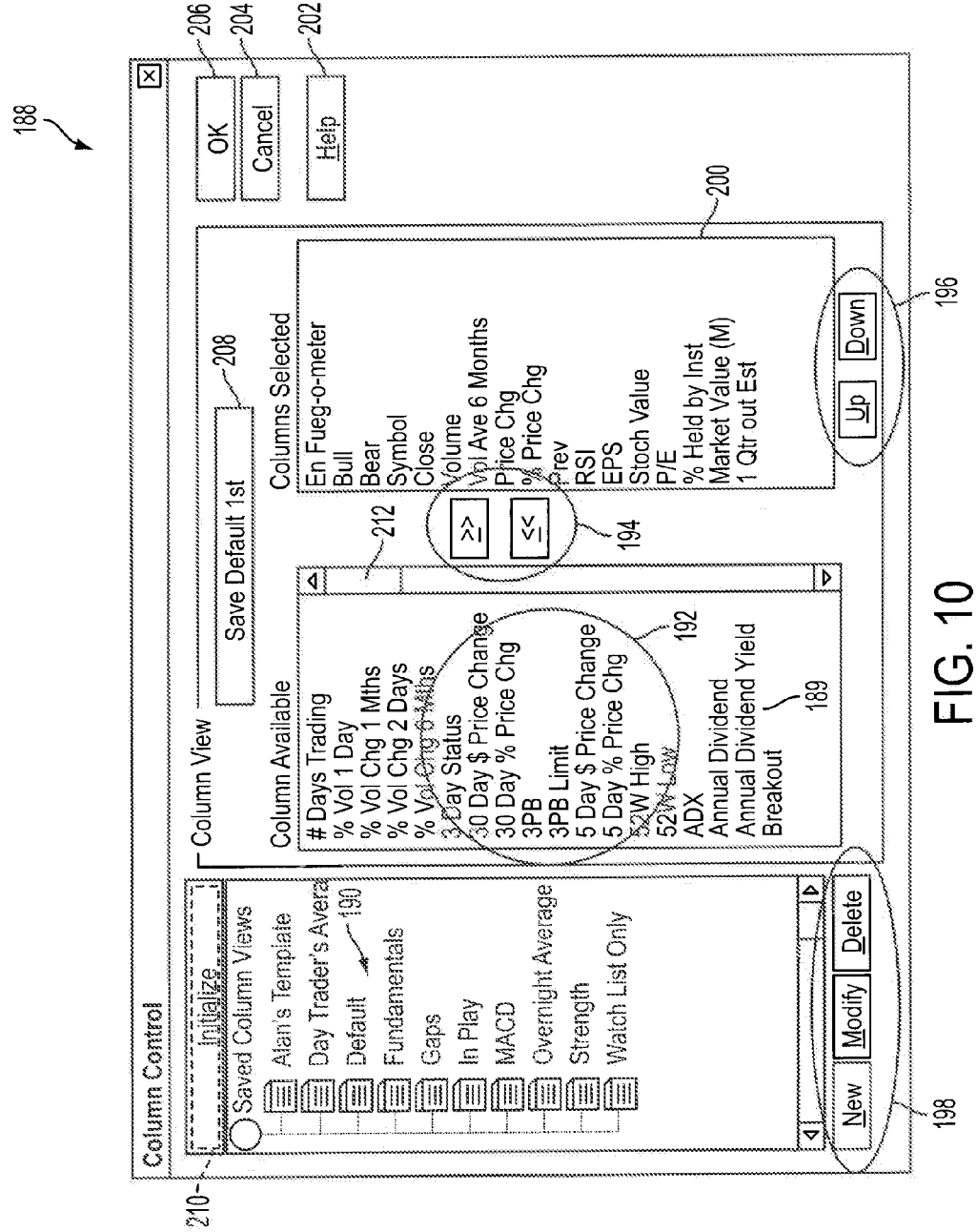
FIG. 10 is an exemplary screen shot of a column control template used in providing the customized screen display capabilities for the present invention.

When the indicator pane 238 is presented in the third field 348, the client may modify the presentation of data within this field by selecting the Column Control option 16 on the View button 18, as shown in FIG. 3. When the Column Control option 16 is selected, the client system 104 preferably displays the Column Control screen 188, as shown in FIG. 10. Additionally, as shown in FIG. 7, the process of configuring the lay-out of the indicator pane 238 begins when a client chooses to configure a Column Control Template (CCT) (Block 214).

The column control screen 188 provides in data field 190 a listing of saved CCTs (for example, "Alan's Template . . . Watch List Only"). The CCTs saved in field 190 can be selected by the client highlighting a CCT and then selecting the Initialize button 210 (Block 216) and the OK button 206. Preferably, as shown, the present invention utilizes known in the art tree structures (for example, the tree structures utilized in Microsoft Outlook®) to present the various CCTs.

Once a CCT has been selected (by clicking on it), the system initializes a creation list which provides all of the possible parameters used to create a CCT (Block 218). Additionally, by highlighting a CCT and selecting the New, Modify or Delete button 198, the client may add a new CCT (by selecting the New button), rename a CCT (by selecting the Modify button), or delete a CCT (Block 220).

When the "New" or "Modify" buttons 198 are selected, the present invention loads the CCTs (Block 222) and presents the Columns Available field 192 and the Columns Selected field 200. By selecting a parameter, for example, the "Annual Dividend Yield" 189, and using the left and right arrow buttons 194 the client may add or delete parameters from the "Columns selected" field 200 (Blocks 230 and 232). "Up" and "Down" buttons 196 are also provided along with scroll bars 212 to allow a client to reposition a parameter within the Columns Selected field 200. For example, by highlighting a parameter and utilizing the "Up" button, a selected parameter will appear more closely to the left margin in the indicator pane 238.

A "Save" button 208 is also provided which allows the client to save the view at any time (Block 234). Upon selecting the "OK" button 206, the present system returns the client to other processing screens. Also, as is standard, a "Help" button 202 is provided and a "Cancel" button 204.

Once the CCT is created/modified and saved, the process returns to Block 220 and allows a client to create/modify another CCT. When the client is finished modifying CCTs, processing resumes with querying the client whether a selected CCT is to be loaded (Block 224). If the client selects to load the selected CCT, the client merely highlights the desired CCT in field 190 and selects the "OK" button 206. The client system 104 then initializes the column control features of the present invention with the selected CCT (Block 226) and displays the stock information based upon the CCT selected (Block 228). If the client selects to not load a selected CCT, the system proceeds to displaying stock information with whichever CCT was previously being used (Block 228).

Figure 6:
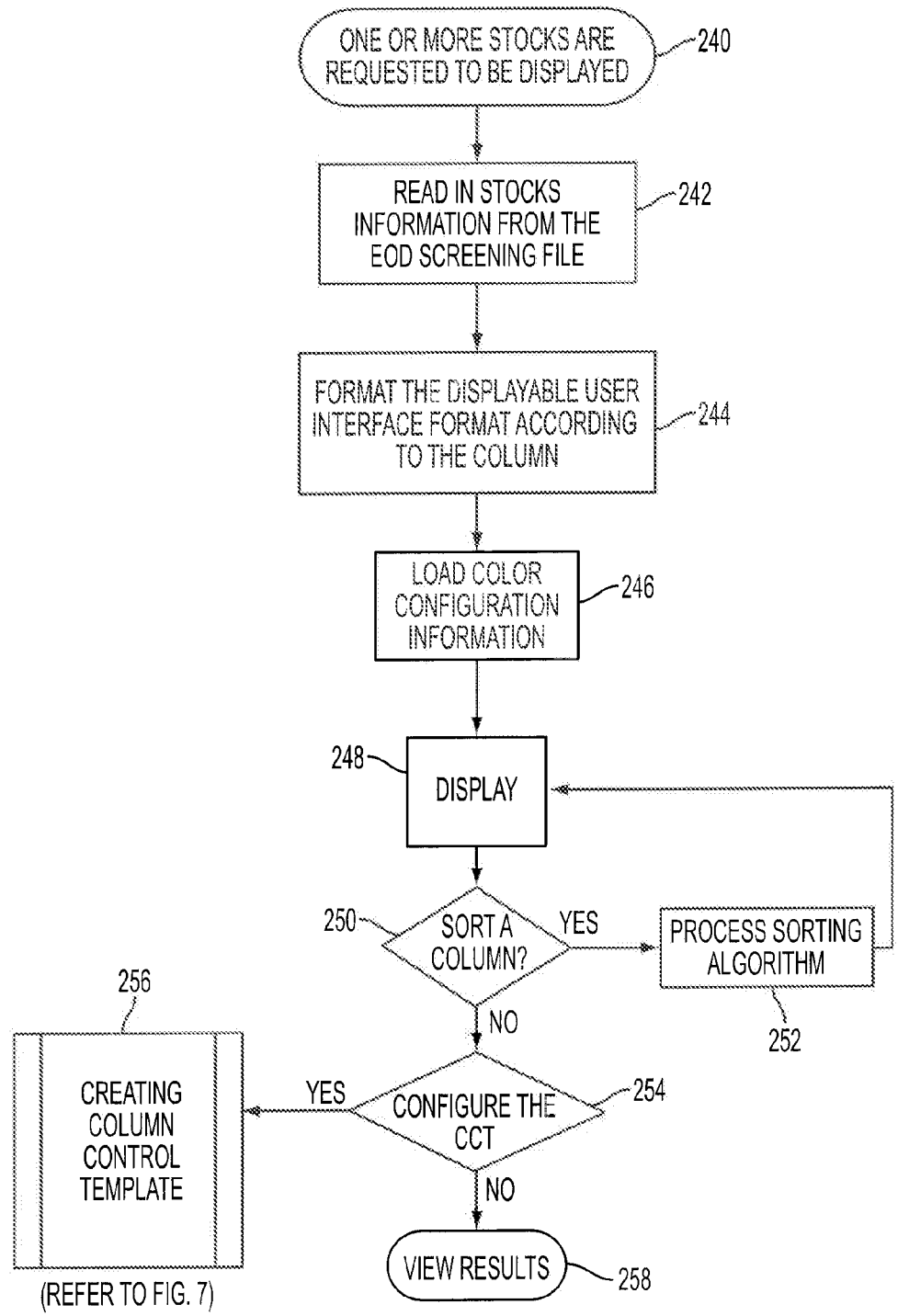
FIG. 6 is a flow diagram of the process by which the present invention selects and displays stocks which are to be presented on a customized column control screen display.
Figure 11:
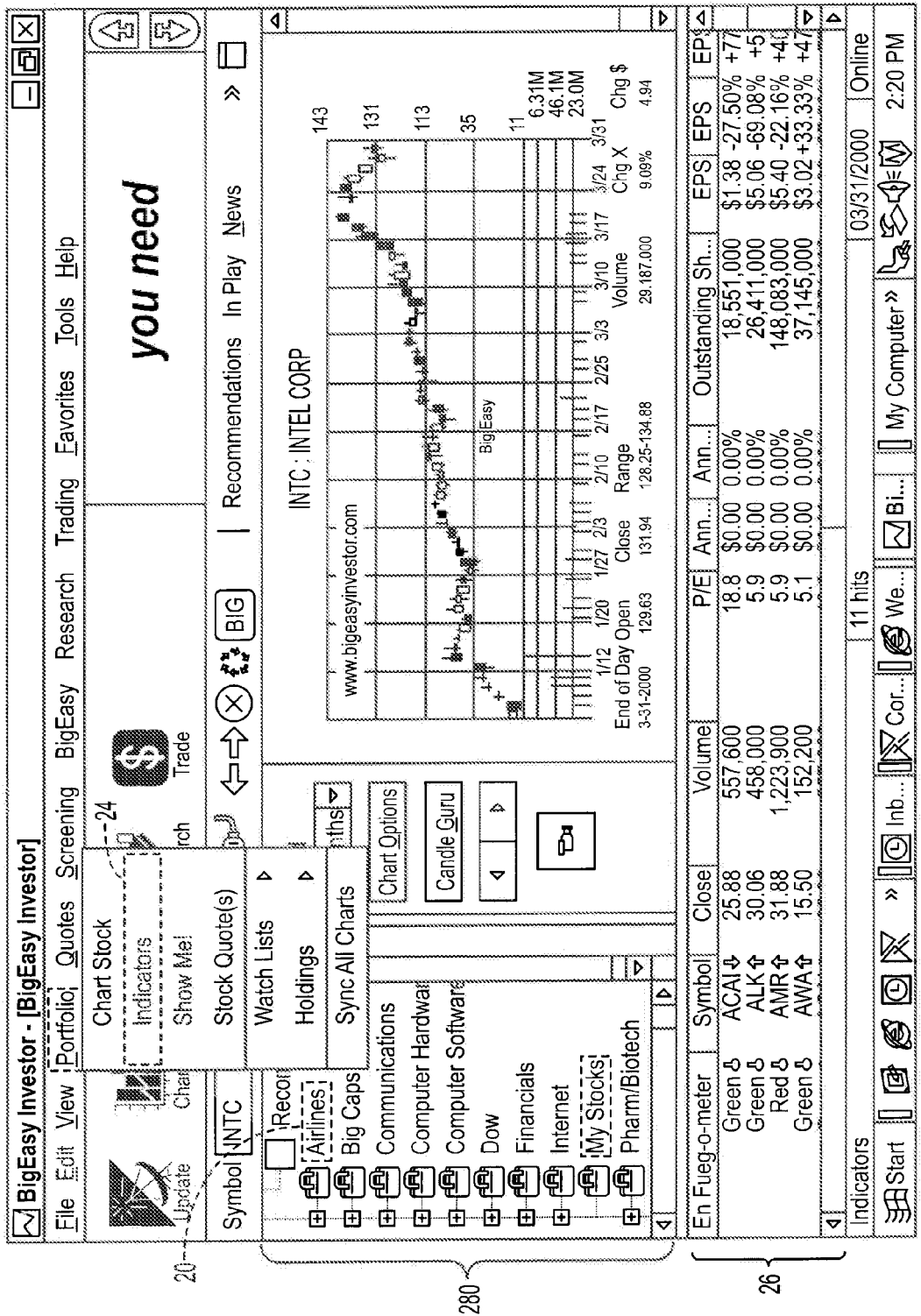
FIG. 11 is a representation of a drop down list by which a client directs the present invention to calculate various indicators for a Stock(s)

FIG. 9 provides a representative screen shot of one such screen display which has been customized by the before mentioned process. Additionally, the process by which the information provided in the indicator pane 238 is presented is shown in FIG. 6. More specifically, the process of presenting data for the desired stocks begins with a request for one or more Stocks to be displayed (Block 240). As shown in FIG. 11, this process is preferably accomplished by selecting from pane 280 a Stock classification or screen, such as "Airlines" 20, and then selecting the Indicators selection 24 from the Portfolio button 22. The system then reads in the Stock information from the EOD screening file (i.e., the "D" file in FIG. 4)(Block 242). The system then formats the displayable user interface according to the format specified in the Columns Selected field (i.e., 200 in FIG. 10)(Block 244).

At this point, the system loads color configuration information (Block 246). In a preferred embodiment, the system is configured to use colors to visually display a direction and a particular result for a Stock. For example, the color "red" might be used to show a Stock which is decreasing, whereas the color "green" might show a stock that is increasing. In an alternative embodiment, arrows are provided to provide such indications. The arrows may be desired by persons who are color blind, or in cases where non-color, hard copy reports are desired. The system, however, is not limited to any particular indicating scheme. Any scheme for indicating a Stock's performance may be utilized including, but not limited to, color coding, arrows, type face, font, size, or similar indicators. Additionally, indicators may be used to display other factors pertaining to a Stock, for example, whether the stock is optionable.

Once the system has processed the color/indicator information, the system displays the result 26 (see FIG. 11) (Block 248). Upon being presented with a display, the client may then decide to sort a column (Block 250). When a column is sorted, the process utilizes known in the art sort algorithms (Block 252). Such sorting processes may include ascending, descending, alphabetic (for example, by the Stocks name or symbol), by date, or by any other indicator (for example, showing first all the Stocks with an En Fueg-o indicator symbol in green). After a column has been sorted (if chosen in Block 250), the client may then proceed with configuring another CCT (Blocks 254 and 256), or view the results (Block 258).

The present invention also allows a client to view historical information for a Stock. Preferably, this information is presented as a chart, however, any presentation method may be utilized by the present invention. The present invention utilizes intelligent algorithms, all of which are commonly known in the art, to determine which information for a Stock a client system 104 has previously downloaded and thereby reduce the transmission time and storage needs for such information. The system also provides the capability of automatically updating charting information for those Stocks in a client's watch list. These updates occur whenever the client connects to the server and requests an update. This feature allows a client to view charts (for stocks in their watch list) while working in an offline mode.

Another feature of the present invention enables the server 100 to generate a "quick update" file for Stock charts. When the "quick update" feature is being utilized, the server provides to the client system an update chart for a given period (for example, 15 days). By using the quick update file and the previously received chart, the client system can generate a complete historical chart for any Stock. Thus, instead of having to download an entire chart every time the system is accessed, the client system merely downloads the "quick update" file for the appropriate time period. In the preferred embodiment, the "quick update" file contains the most recent 15 trading days' price/volume data for all Stocks. However, the "quick update" file may be configured to provide longer or shorter time periods as need be. Additionally, the updating features of the present invention are not utilized for clients who update their system daily. For such clients, the client system is automatically updated via the information contained in the EOD screening file.

Figure 28:
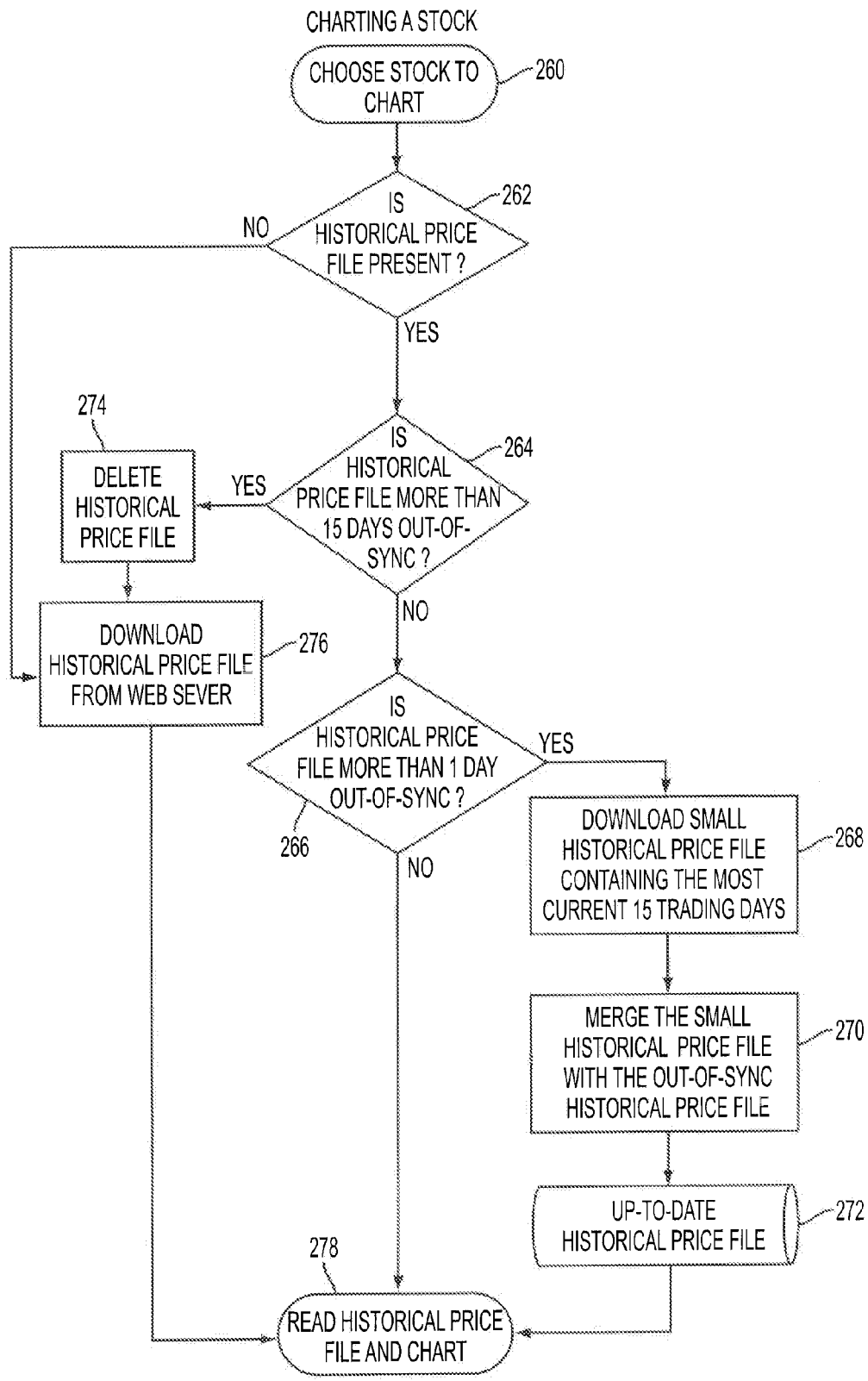
FIG. 28 is a flow diagram of the process by which charting data for Stocks is retrieved and/or updated by a client system from the server.
Figure 29:
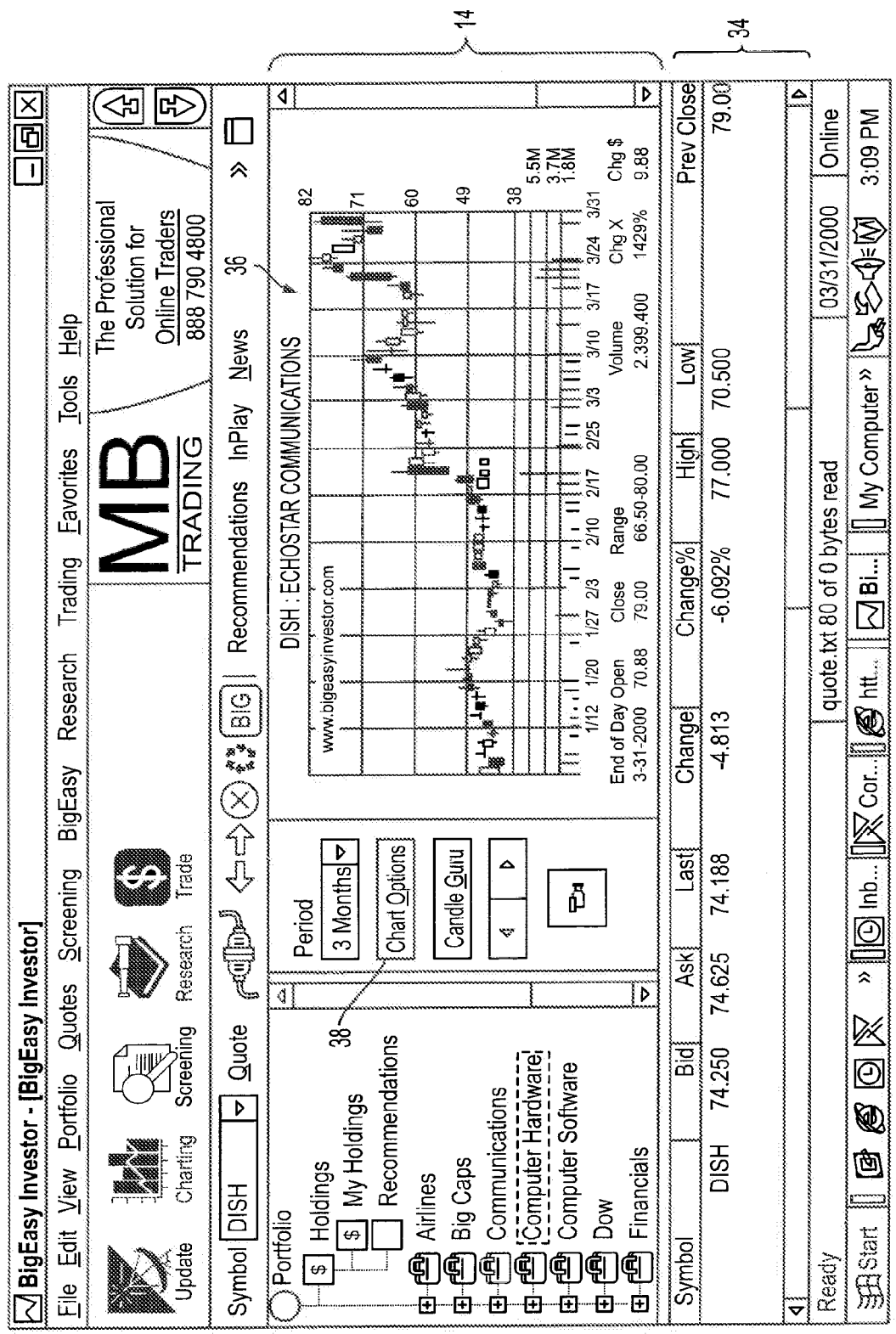
FIG. 29 is an exemplary screen shot of the present invention showing a current stock quote information for a stock selected by a client.

The process by which the present invention determines when and how much historical information needs to be communicated from the server to the client system is depicted in FIG. 28. As shown, this process begins when a client chooses a Stock to chart (Block 260). A client may choose a stock to chart by entering the stock's symbol in the Symbol field 28, as shown in FIG. 2A (wherein, the four letter designator "DISH" for EchoStar Communications has been entered). Also, the Symbol button 30 allows a client to look up a stock designator for a company while the Quote button 32 provides a delayed price quote 34 in field 348 (as shown in FIG. 29).

Upon choosing a stock, the client's system searches its file directories and/or databases to determine whether a historical price file is present for the chosen Stock (Block 262). If the historical price file is not present for the Stock, the client system connects with the server and downloads the entire historical price file (Block 276). Returning back to Block 262, if a historical price file is present, the client system then determines whether the file is more than 15 days out of sync (Block 264). In the preferred embodiment, "quick update" files for each Stock are provided for 15 days only. However, the system may be configured, as desired, to provide update files of greater and or shorter lengths.

If the historical price file on the client system has not been updated within a given 15 day period, the client system deletes the historical price file (Block 274) and downloads the entire historical price file from the server (Block 276). If the historical price file on the client system was previously updated within the given 15 day period, the client system then determines whether the historical price file is more than one day out of sync (Block 266). If the file is not more than one day out of sync, the client system reads the EOD screening file, and approves the price information to the chart (Block 278).

If the historical price file on the client system is more than one day out of sync, the client system downloads the "quick update" file, which contains price information for the most current 15 trading days, from the server 100 (Block 268). Upon completing the download, the client system merges the information contained in the "quick update" file with the out of sync historical price file (Block 270). At this point, the client system contains within its data files, an up to date historical price file for the selected Stock (Block 272) which may then be read and charted (Block 278).

Figure 30:
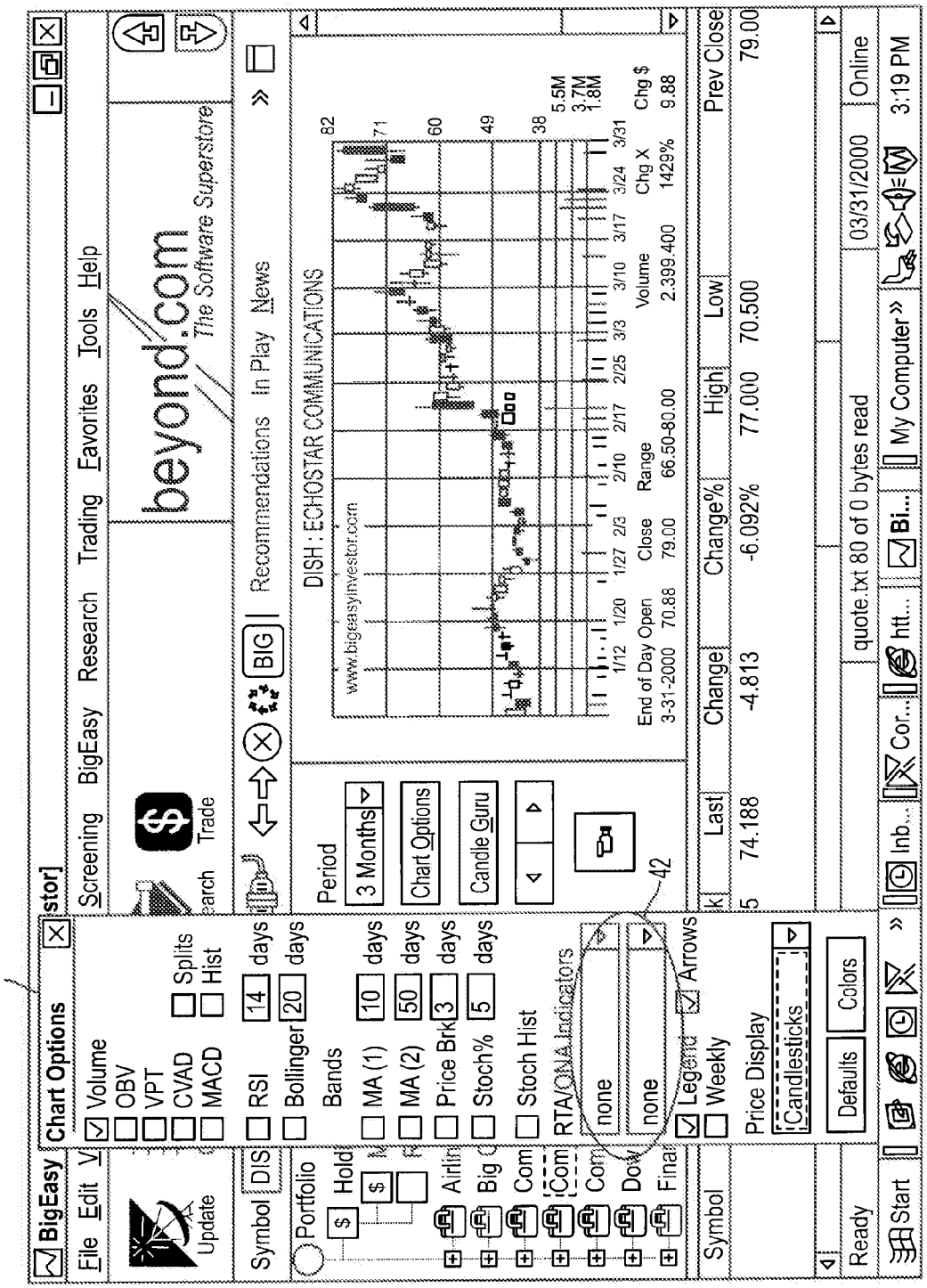
FIG. 30 is a representation of a data entry field for the present invention in which a client may select various market indicators and charting options for a stock selected by the client.
Figure 31:
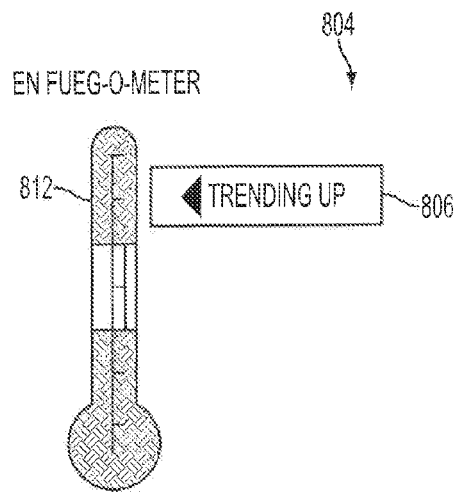
FIG. 31 is a thermometer-looking graphic used by the En-Fueg-o-meter indicating a trending up rating.
Figure 32:
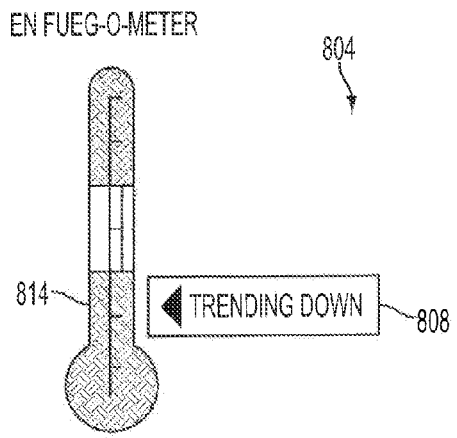
FIG. 32 is a thermometer-looking graphic used by the En-Fueg-o-meter indicating a trending down rating.
Figure 33:
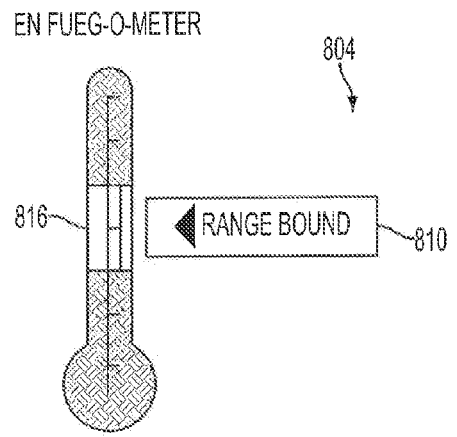
FIG. 33 is a thermometer-looking graphic used by the En-Fueg-o-meter indicating a range-bound rating.

As shown in FIG. 29, the chart 36 for EchoStar Communications is presented in field 14. The chart 36 provides the client with daily pricing information for a stock. The chart 36 may be configured to display varying time periods including 3 month, 6 month, 9 month, 1 year, max, and various other periods. Those skilled in the art realize that the present invention may be suitably modified and/or configured to display a chart for any given time period, as desired. Additionally, by selecting the Chart Options button 38 the chart may be displayed with various options selected. As shown in FIG. 30, the Chart Options Menu 40 provides various performance indicators by which a stock may be analyzed. These include DTA/ONA indicators 42 (which are discussed in detail below), and various methods of displaying prices including candlesticks, line graphs, bar graphs, and mountain graphs.

The charting features of the present invention also allows clients to utilize "candlestick" analysis features which are commonly known in the art (as discussed in greater detail herein).

Figure 12:
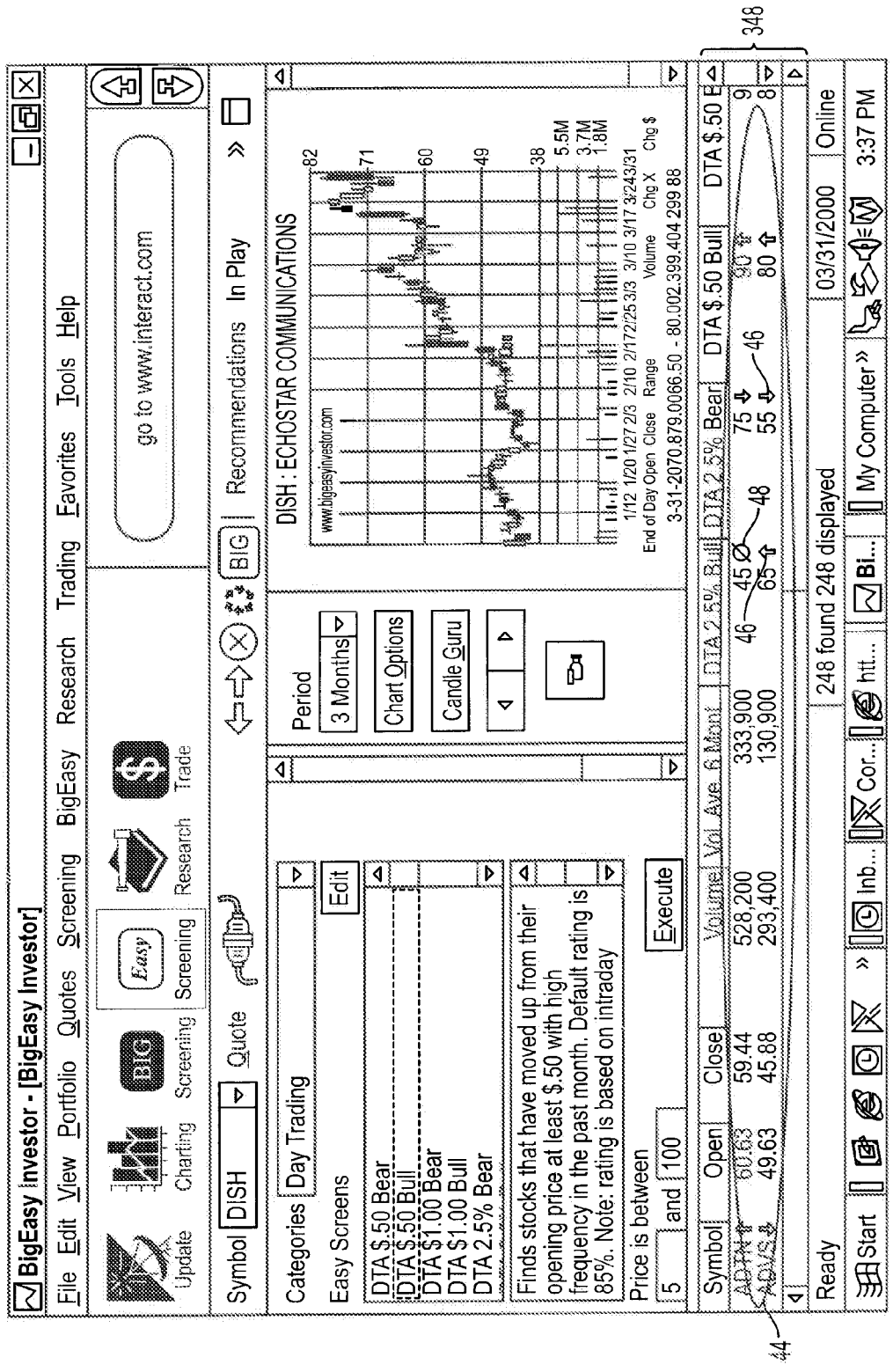
FIG. 12 is an exemplary screen shot of the present invention wherein the results of a DTA screening are displayed.
Figure 13:
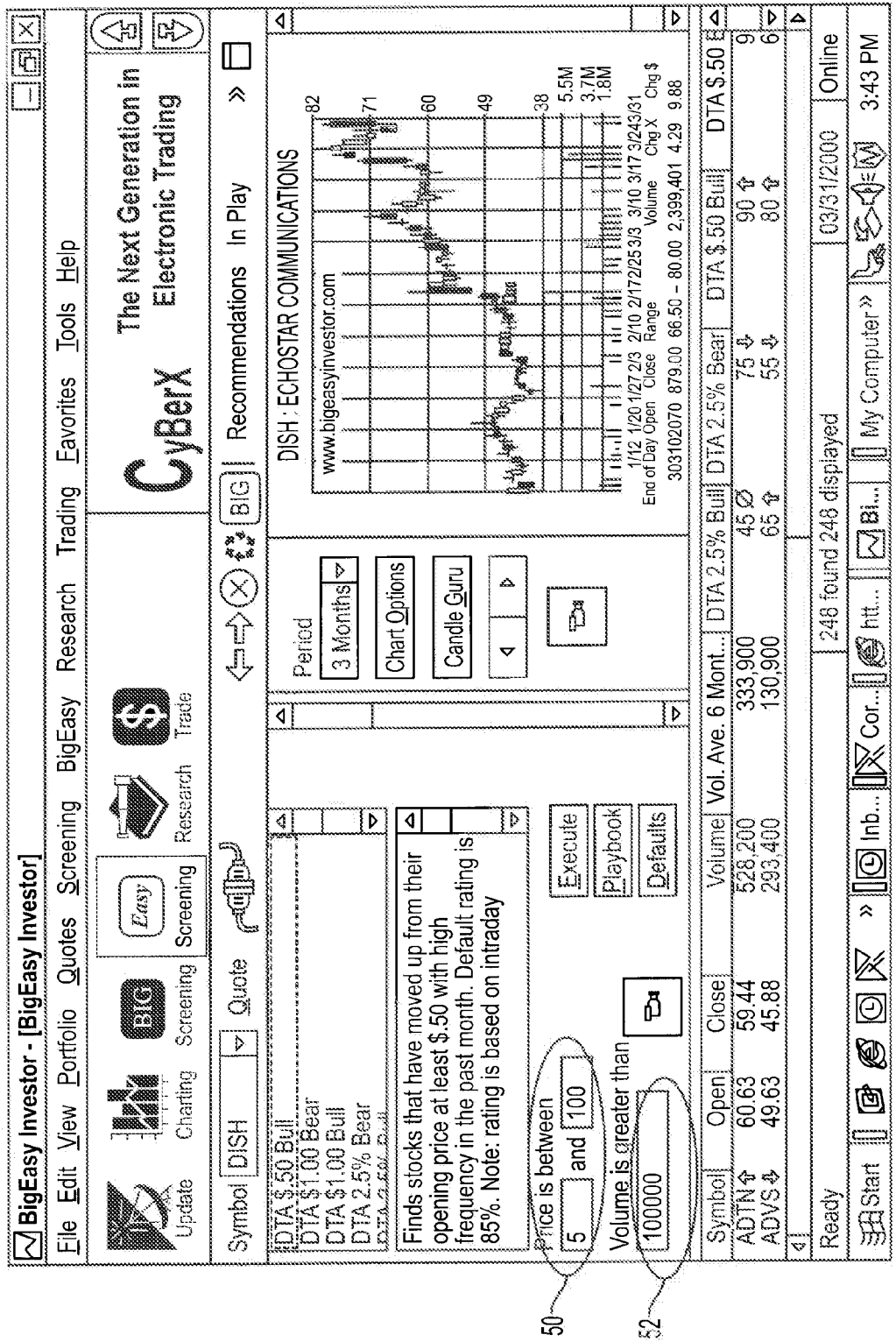
FIG. 13 is an exemplary screen shot of the present invention showing data fields in which a price range for the DTA screening criteria may be entered.

As mentioned previously, through the use of its various screening criteria, the present invention enables personal investors to reap much of the excitement of day trading with relatively low risk by identifying those Stocks which traditionally increase in prices at the beginning of a trading day. As mentioned previously the DTA screening criteria uses the opening price—the most objective data point for a Stock—as a delta to find those Stocks which consistently move in one direction over a twenty day trading period. The DTA screening process finds prospects that habitually move 2.5%, $0.50, or $1 up (bullish plays) or down (bearish plays) from the opening price. By utilizing the DTA screening criteria, even novice user can leverage the historical probability of a stock continuing its pattern and take ½ point or a full point of the market without the risk of trying to pick a stock's intraday tops and bottoms. FIG. 12 provides a screen display of the results of the day trading screening for one day. As shown in field 348, information pertaining to the DTA criteria 44 is presented. This information preferably includes indicators of whether a stock met the criteria 46 or did not meet the criteria 48. The DTA function also allows a client to specify price ranges 50 and the volume 52 of the stocks the client desires to screen, as shown in FIG. 13.

When utilizing the DTA screening criteria, a client preferably adheres by the principal rule of day trading—exit all trades by the end of the trading session regardless of gains or losses. Utilizing this simple rule and the screening capabilities of the present invention, the client may participate in day trading while reducing the risk thereof. When utilizing the DTA function, the client preferably utilizes the Stock screening capabilities of the present invention to identify those stocks which typically rise 2.5%, $0.50, or $1 above their opening price. Clients then buy a Stock identified by the DTA screening process at or shortly after the opening bell. Once the purchase order or sell order is fulfilled (when the client sells the stock on margin), the client then enters an upside limit order (or downside limit order in the case of a short sale) which is typically ⅛ or ¼ profit as their exit price.

Similarly, by utilizing the ONA screening criteria a novice investor may also leverage the patterns associated with the opening price while buttressing the DTA methodology with the patterns associated with the closing price. Those skilled in the investment community realize that at any time Stocks exist which are under accumulation in the market. These desirable Stocks underscore the most basic tenant of business—lack of supply leads to demand and rising prices for those Stocks. As popular Stocks become scarce, their price rises. The scarcity also creates demand, which results in further price increases. The ONA screening criteria allows novice users to locate stocks which they can buy wholesale—during the last few minutes of a trading day, and sell retail—during the first few minutes of trading the following morning. The ONA screening criteria of the present invention finds Stock prospects that habitually move 2.5%, $0.50, or $1 up (bullish plays) or down (bearish plays) from the previous day's closing price. This feature enables even neophyte investors to put strong trends in their favor by following strong trends.

The present invention also allows clients to create custom screens by choosing phrases from pre-defined lists of terms. Preferably these phrases are provided in English, however, the present invention may be suitably configured to support a client in any language. The present invention preferably stores all of the various screens in a hierarchical (or tree) structure of Folders and Screens, as shown in the field 280 of FIG. 14. In this preferred embodiment, folders are designated by an icon which looks like a briefcase while screens are designated by an icon which looks like a magnifying glass. However, any icon may be utilized to designate these folders and screens, as desired. Also, each folder's contents may be viewed by clicking on a folder. Folders containing screens are suitably designated by a "+" sign, which is a standard method in the art for designating that sub-folders and/or files/screens exist. Once a screen is selected, by highlighting the selected screen and selecting the Execute button 282, or by double clicking on the selected screen, those Stocks which meet the criteria specified for the screen are displayed in field 348.

All of the screening criteria for the present invention is preferably based upon end-of-day data. However, the present invention may be configured such that screening criteria is based upon beginning of day data, or any other time period, if so desired. For the preferred embodiment, each day after the respective Stock markets close, price and volume data is processed by the server 100 (FIG. 1) and analyzed. As such, the server analyzes over 8,000 stocks for each day and provides the following parameters: the day's high, the days low, the open price, the closing price, and the trading volume. These parameters are processed and optimized by the server (as mentioned above) such that screens on a client system 104 may be executed near simultaneously. The processed and optimized data is the data which is preferably downloaded during the daily update process.

Figure 15:
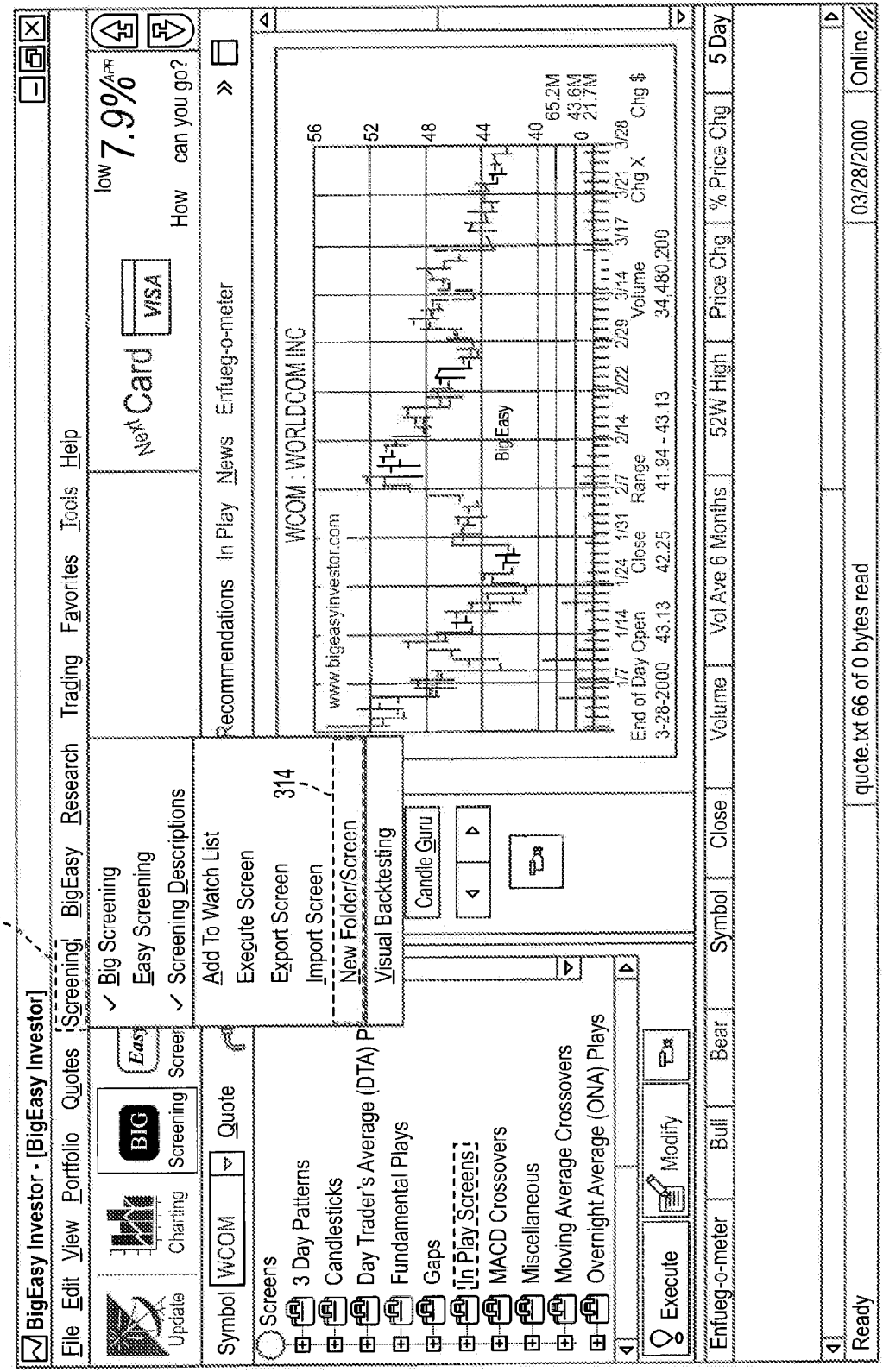
FIG. 15 is an exemplary screen shot of a screening pull down menu which provides the option of creating new folders and/or screens for the present invention.
Figure 16:
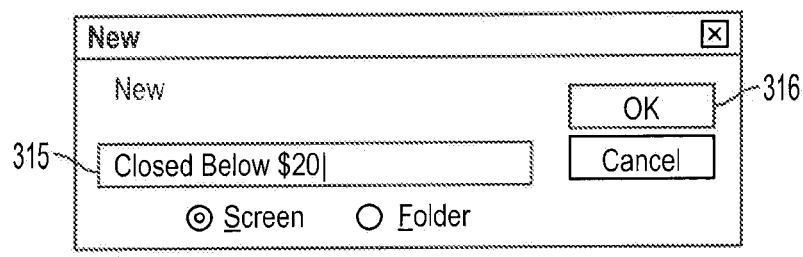
FIG. 16 is a representation of the data entry field in which a name is entered for a new screen for the present invention.
Figure 25:
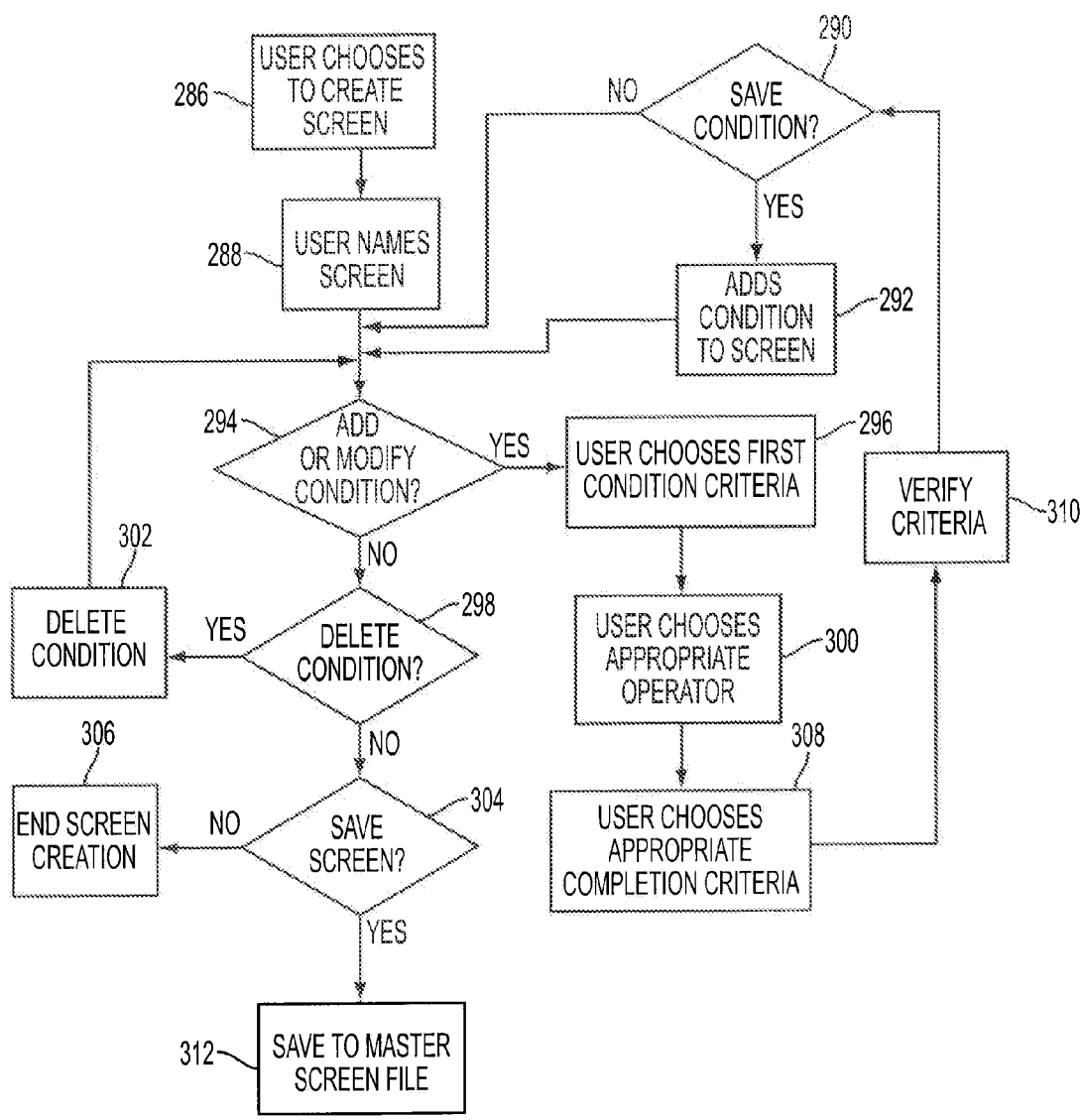
FIG. 25 is a flow diagram of the process by which the present invention creates, adds and/or modifies screening criteria.

The present invention allows a client, on the client system, to modify, edit and add new screens, as desired. When creating or modifying a screen, the present invention preferably allows a client to use English (or another spoken language) phrases instead of SQL statements. The process of creating a screen begins with the client selecting the Screening menu item 284 (FIG. 15 and Block 286 of FIG. 25). As shown, this item 284 allows a client to select from various options, including adding a New Folder/Screen selection 314. When this selection 314 is selected, the client is the provided with a data entry field 315 in which a screen or folder name is entered (Block 288 and see FIG. 16). Upon selecting the "OK" button 316 (Block 294), the process continues with choosing a first condition criteria (Block 296).

Figure 17:
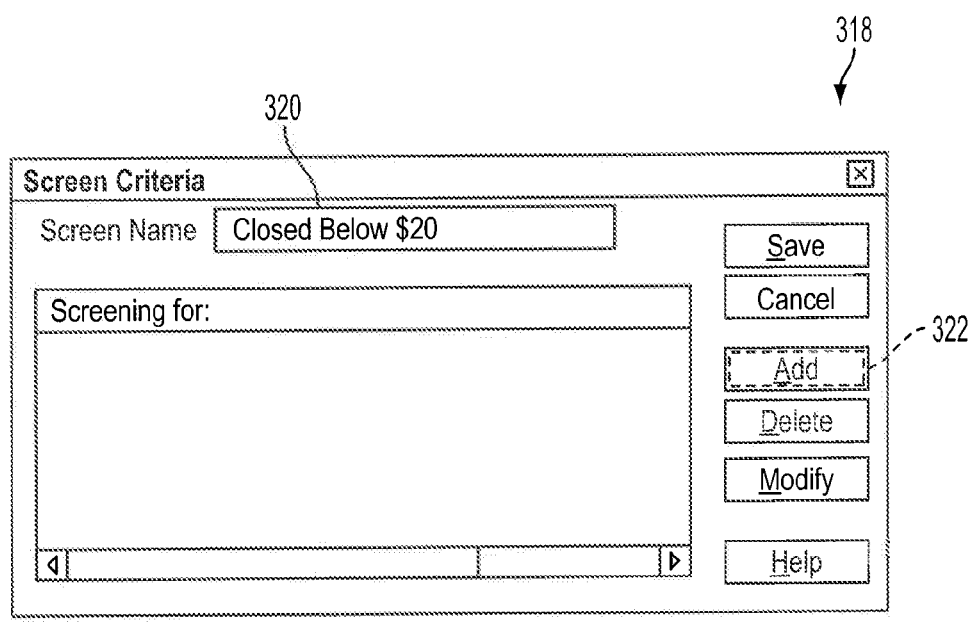
FIG. 17 is a representation of a data entry field in which screening criteria may be entered and/or modified for the present invention.
Figure 18:
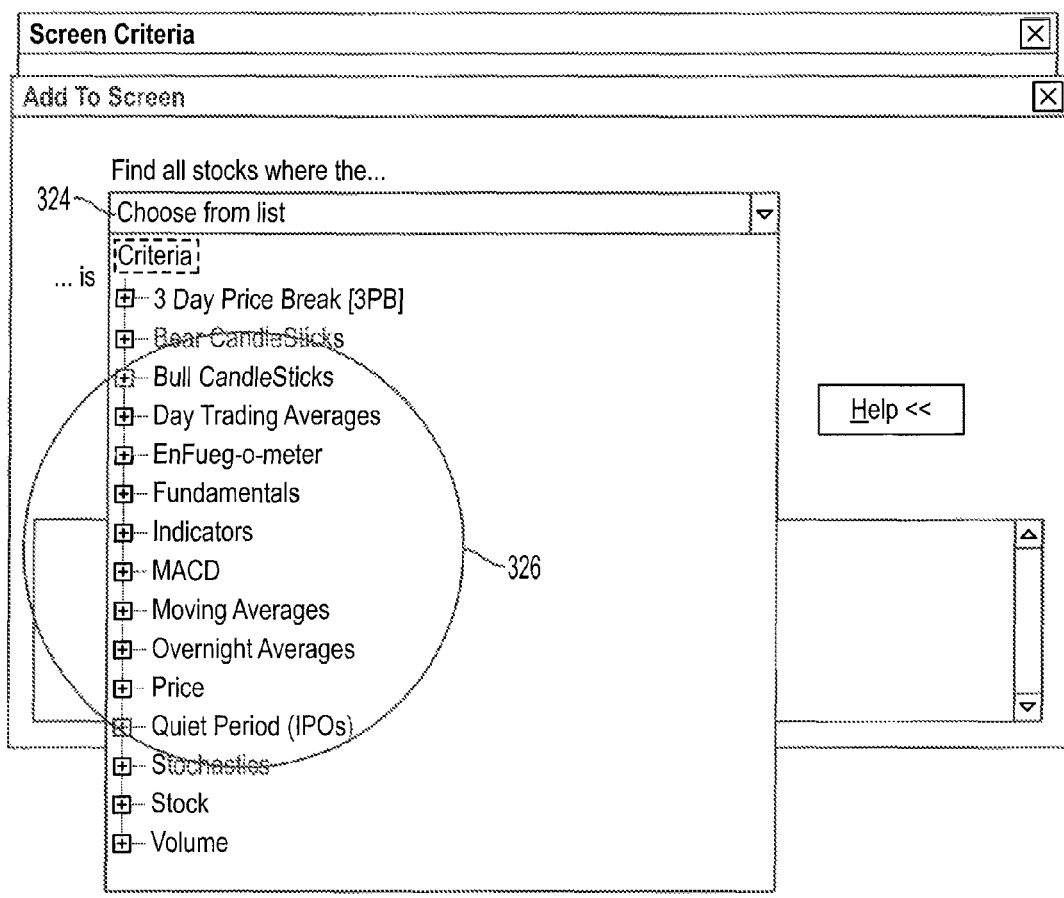
FIG. 18 is a representation of a drop down list of screening options provided by the present invention.
Figure 19:
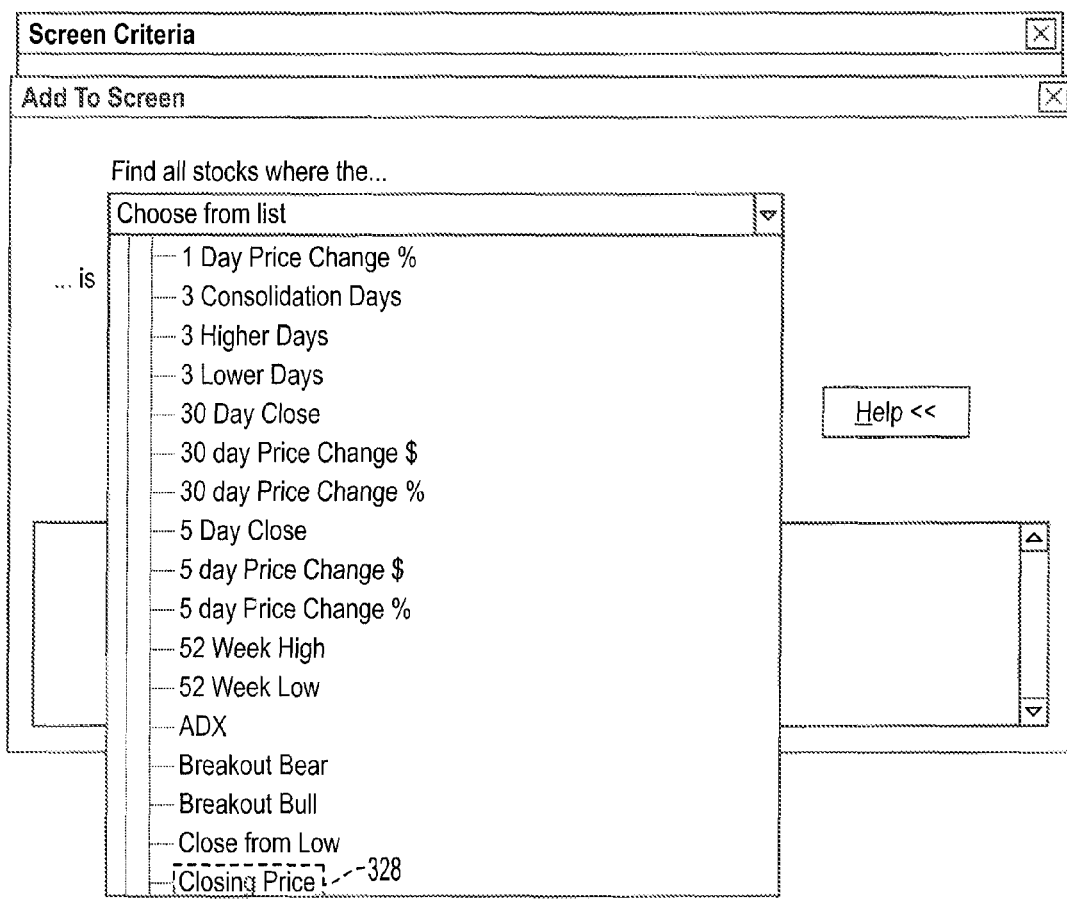
FIG. 19 is a representation of a the drop drown list of FIG. 18 which has been expanded to include various sub-categories related to the Price option for the present invention.

As shown in FIG. 17, the present invention suitably displays the Screen Criteria screen 318 which provides the screen name field 320, and various buttons including the "Add" button 322. Upon selecting the "Add" button 322, the present invention proceeds with the client selecting their first criteria from a drop down list 324, as shown in FIG. 18. The drop down list 324 includes various indicators 326, each of which may be suitably expanded into sub-categories, such as the price. FIG. 19 shows some of the numerous sub-categories which the present invention provides for the price indicator. In this example, the sub-category "Closing Price" 328 has been selected as the first condition criteria.

Figure 20:
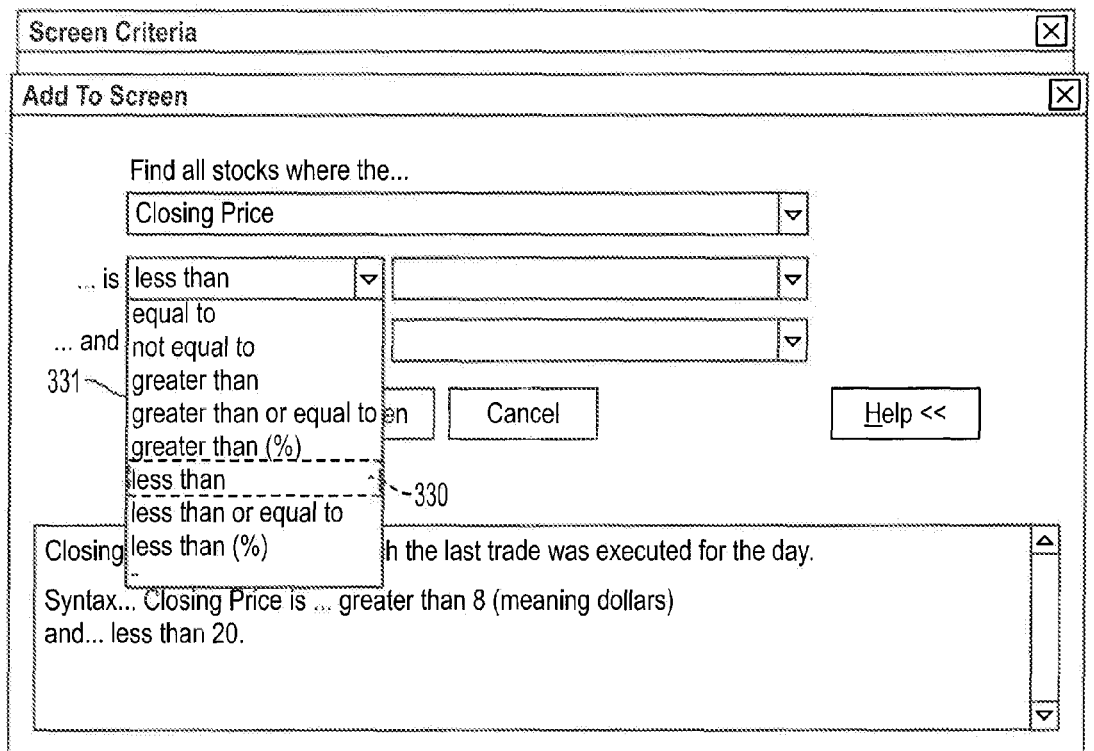
FIG. 20 is a representation of a data entry field for the screening criteria in which a client selects the operator associated with a chosen criteria for the present invention.
Figure 26:
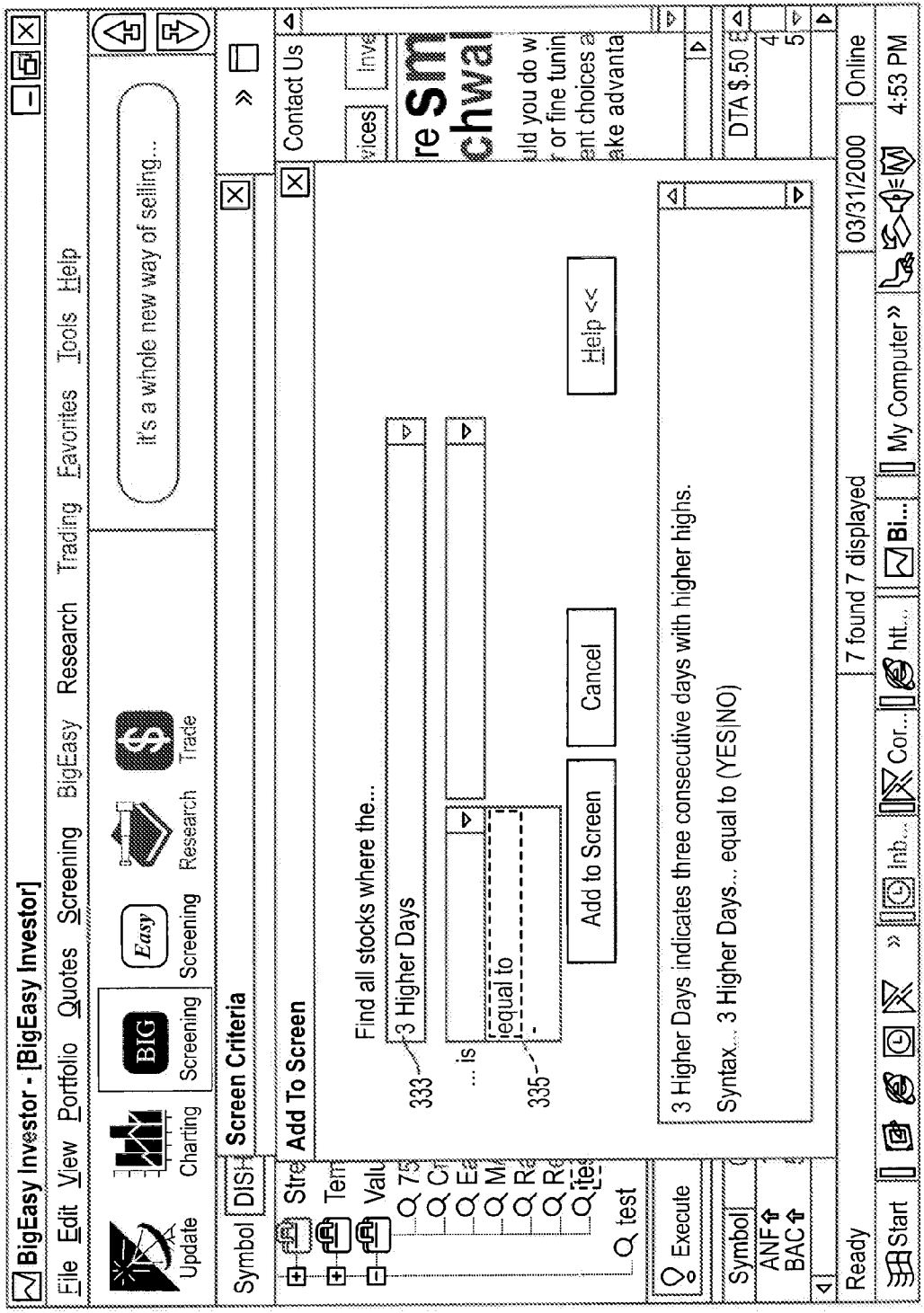
FIG. 26 is a representation of a data entry field for the screening criteria in which a client selects an operator associated with a chosen criteria for the present invention.

Once the first condition criteria has been selected, the process of creating a custom screen preferably continues with the client choosing an operator (Block 300). As shown in FIG. 20, one such operator might be the mathematical expression "less than" 330. The present invention provides in the drop down list 331 operators which are specifically tailored to each criteria. In the case of the closing price, operators such as "equal to", "less than", and so forth are provided. In contrast, for a criteria such as "3 Higher Days" 333 (as shown in FIG. 26), the only operator available is "equal to" 335. Those skilled in the art appreciate that the present invention may be configured such that various operators may be selected, as appropriate, including, but not limited to, mathematical operators, logical operators, and relational operators depending upon the criteria selected.

Figure 21:
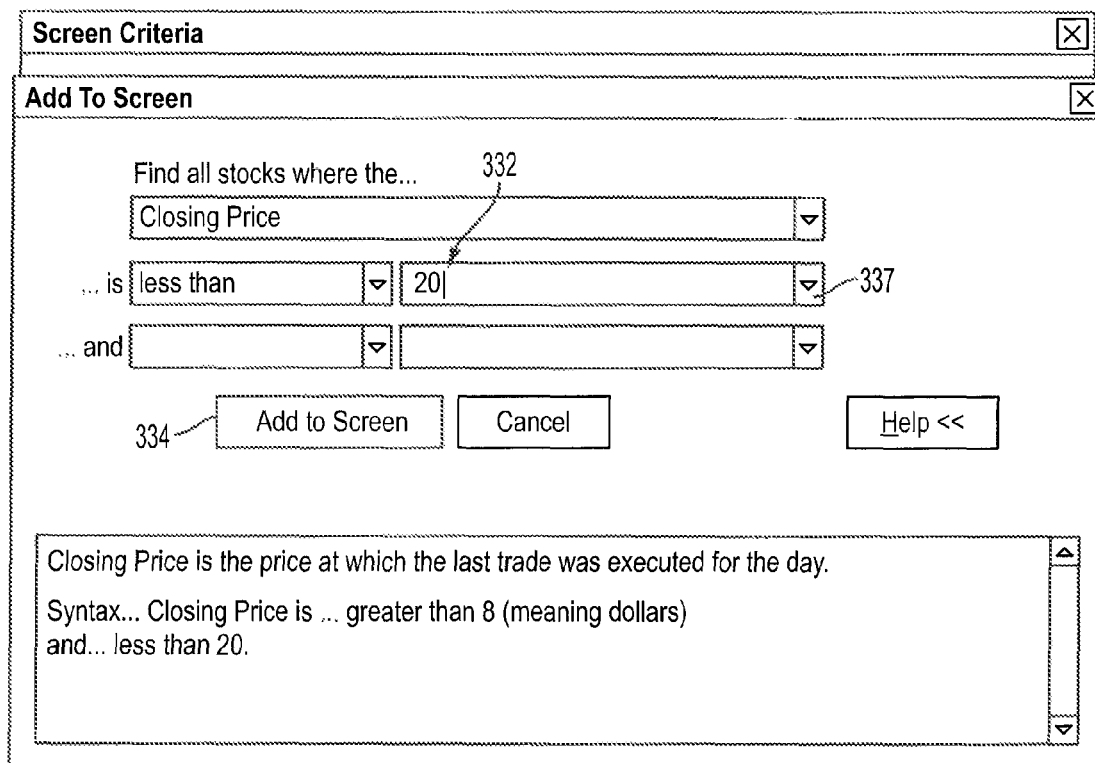
FIG. 21 is a representation of a data entry field for the screening criteria in which a client selects a completion criteria for the present invention.
Figure 27:
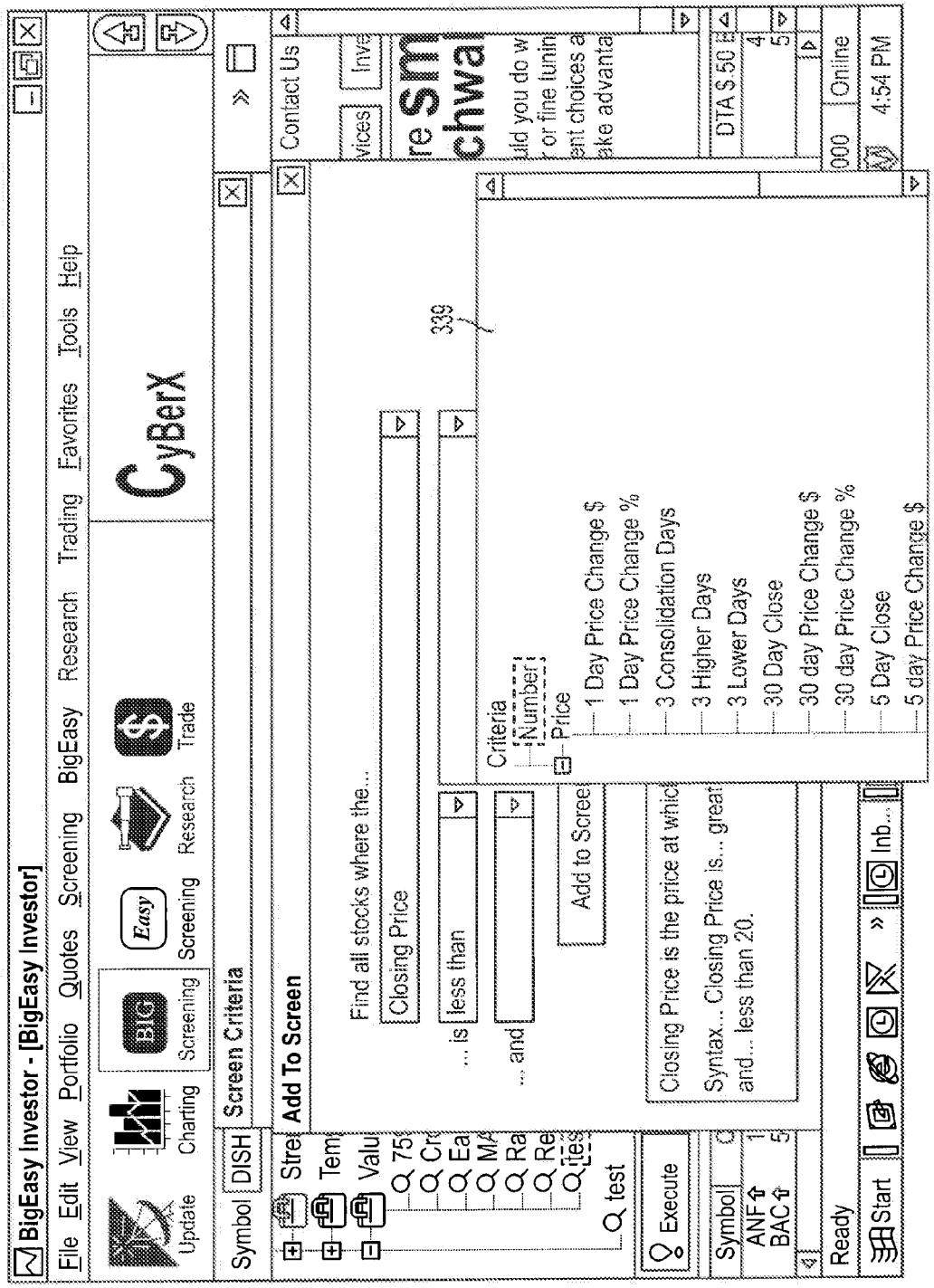
FIG. 27 is a representation of a data entry field for the screening criteria in which a client selects the operator associate with a chosen criteria from a drop down menu for the present invention.

After selecting the desired operator, the process continues with the client selecting the appropriate completion criteria (Block 308). FIG. 21 provides one example of a completion criteria of the number "20" which has been entered by a client into the completion data entry field 332. FIG. 27, shows the various options 339 available when the client selects the drop down menu button 337 (FIG. 21). As shown, the client may select a "number" or a price from the options 339 provided. Depending upon the criteria selected, various options may be selected and/or entered by the client into the data entry field 332. Once the completion criteria is selected, the client completes the screen criteria completion for the first criteria by selecting the "Add to Screen" button 334.

Figure 22:
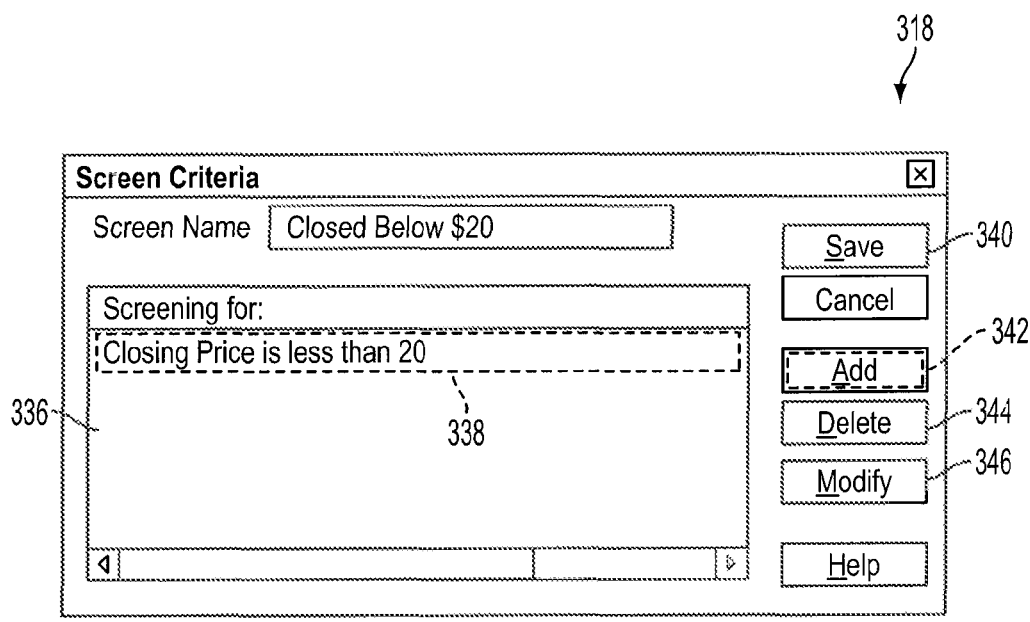
FIG. 22 is a representation of a data entry field for the screening criteria in which a screening is displayed for the present invention.

At this point, the client is then requested to verify the criteria is correct (Block 310). As shown in FIG. 22, the present invention suitably displays the Screen Criteria screen 318 which now displays in the "Screening for:" field 336 the just entered criteria "Closing Price is less than 20" 338. Upon selecting the Save button 340, the process saves the new criteria for the selected screen name in the client system (Blocks 290 and 292) and exits the screening process.

Should the client, however, desire to input additional criteria, the present invention suitably accommodates such desires via the Criteria screen 318 by allowing a client to add additional criteria, by selecting the Add button 342, prior to selecting the Save button 340, and repeating the above process steps. Similarly, a client may delete a criteria (Blocks 298 and 302) by highlighting the criteria and selecting the Delete button 344. Similarly, the Modify button 346 enables a client to modify an already established criteria, for example, changing the "20" entered previously to "30".

Figure 23:
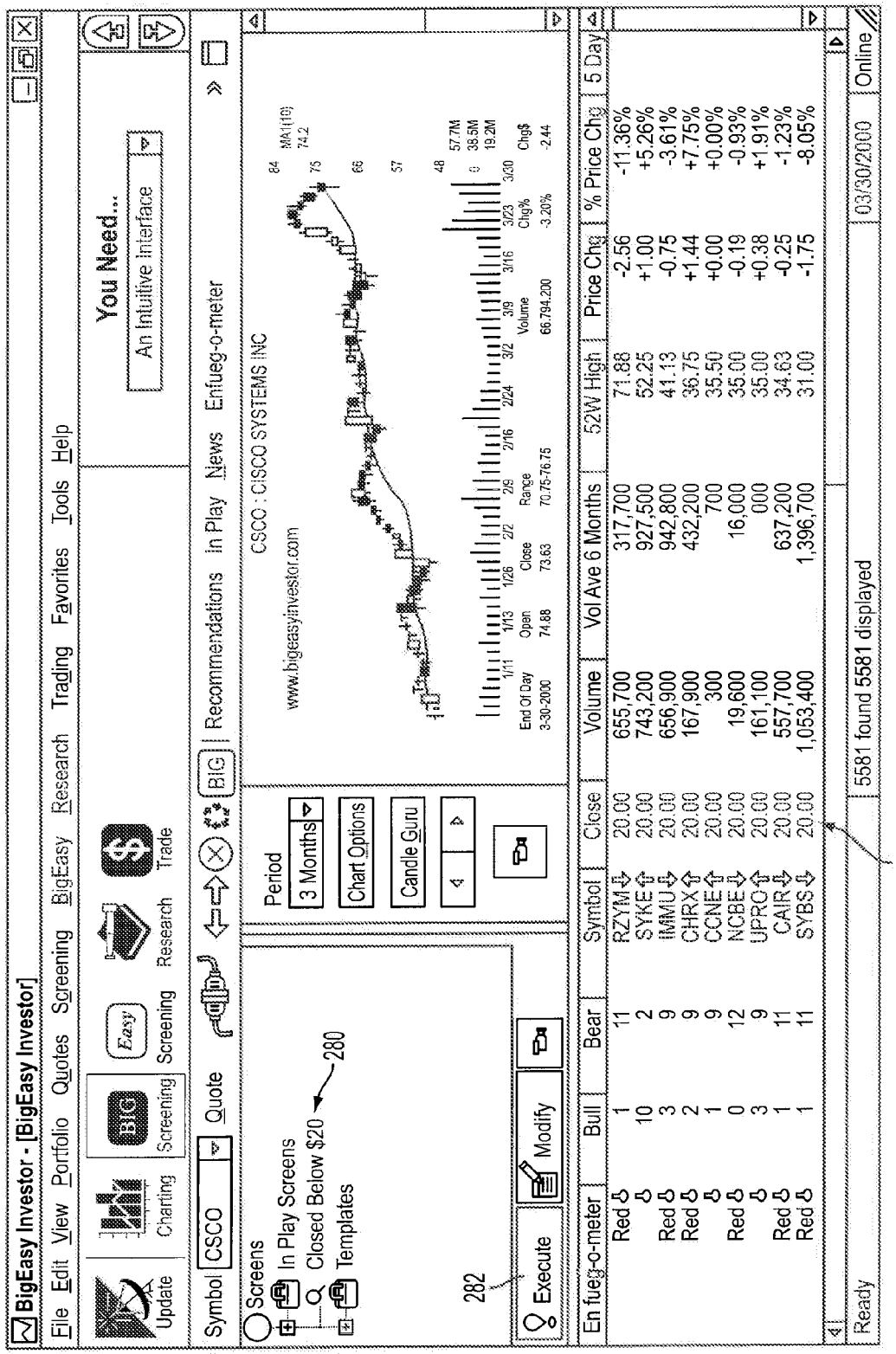
FIG. 23 is an exemplary screen shot showing the addition of the screening criteria "Closed Below $20" to the menu tree of screening options for the present invention.

Once all the screen criteria desired have been entered, deleted, or modified, the process continues with the client either saving the screen criteria to a master screen file or ending the screen creation function (Blocks 304, 306 and 312). FIG. 23 shows the above created criteria of "Closed Below $20" in field 280. When this criteria is selected and the Execute button 282 depressed, the client system suitably display in the results field 348 all Stocks which met the criteria of closing below $20.

FIG. 24 provides one example of the multiple criteria which may be utilized by a client to more precisely screen Stocks. As shown, the "Screening for:" field may be configured with numerous criteria. When selected for execution the "Pullback Buying Opportunities" screen would screen Stocks based upon the six different criteria shown. Thus, the present invention provides each client with the capabilities of identifying from out of 8,000 stocks, those which meet certain, client specific criteria without requiring extensive download times or multiple searches while using common English phrases to provide such screening capabilities.

More specifically, the present invention provides the before mentioned custom screening capabilities by using computer codes to identify screen criteria. For example, prch stands for price change, prchper stands for price change percentage, greater than stands for the symbol ">". The indicators.txt and candlesticks.txt files preferably contain all the screening criteria information. The present invention suitably assigns seven attributes to each criteria. These attributes include: name (the English name the user sees when creating a screen); code (the screening code that the screening engine uses to retrieve the correct information); group (the grouping that an indicator belongs too); oper (the operand associated with the criteria); description (the English description of the indicator); belong (signals when it is appropriate for the indicator to be shown when options for the condition criteria are shown); and pos (the indicator ID). For example, the information used in screening for an indicator such as the 52 Week High, which is preferably found in the candlesticks.txt file, would include the following:

<Name>52 Week High</Name>
    <Code>52wh</Code>
    <Group>8</Group>
    <oper>3</oper>
    <Description> indicates a stock's closing price made a 52 week high.
    Syntax . . . 52 week High is . . . equal to [YES I NO]
    </Description>
    <Belong>1</Belong><Pos>1</Pos>

When a screen is selected by the client, for example, "Find all stocks where the . . . 52 Week High is . . . equal to Yes." The "52 Week High" portion of the screen is preferably mapped to the code name 52wh. The oper field is equal to 3, signaling that only the operator options (equal to and not equal to) can be applied to this indicator. The belong field equals 1, signaling the valid options for the completion condition criteria are Yes and No.

Additionally, the present invention limits the scope of options available in the completion condition criteria drop down list box to only those which are sensible and semantically correct options. For example, the screening code for "Find all stocks where the . . . 52 Week High is . . . equal to Yes" preferably appears in the present system as: "52wh=Yes." By utilizing this syntax, the client system can suitably read the code, retrieve the proper information from the EOD screening file and process the query without requiring a current Internet connection with the server 100. Those skilled in the art appreciate that the process used by the present invention to designate and process screen criteria is similar to that used in a compiler works to convert computer code into machine language code. As such, the present invention simplifies the client entries needed to screen Stock information by utilizing English phrases which are converted by the present invention into machine interpretable code.

En Fueg-o-Meter

Referring principally to FIGS. 31-44, a unique composite indicator (termed herein the "En Fueg-o-meter") comprising part of the present invention is described next. Mathematicians and traders have concocted more than 300 financial indicators—specific ways to interpret whether a stock will move up or down in the future. It is nearly impossible for the average personal investor to learn how to interpret that many indicators. These hundreds of subjective theories, however, are all based on the same five objective data points: a stock's opening price, closing price, low price, high price, and volume in a given day of trading. The En Fueg-o-meter's unique automated analysis helps novice investors gain perspective on how to interpret basic technical analysis indicators.

"En Fuego" is a Spanish phrase meaning "on fire," and the En Fueg-o-meter helps a personal investor quickly assess how "hot" a given stock is by generating automated analysis and understandable English commentary. The analysis is based on the most popular and commonly used indicators such as price, volume, moving averages, relative strength index (RSI), and Moving Average Convergence Divergence (MACD). As discussed further below, the En Fueg-o-meter presents each indicator along with added narrative commentary based upon the status of the indicator. Thus, the particular commentary presented for an indicator varies depending upon the determined status of that indicator. The commentary is not presented as "tradable" information but for consideration and as an invaluable learning tool for the investor. The En Fueg-o-meter thus displays a technical analysis-based snap shot of a stock's current state.

Figure 14:
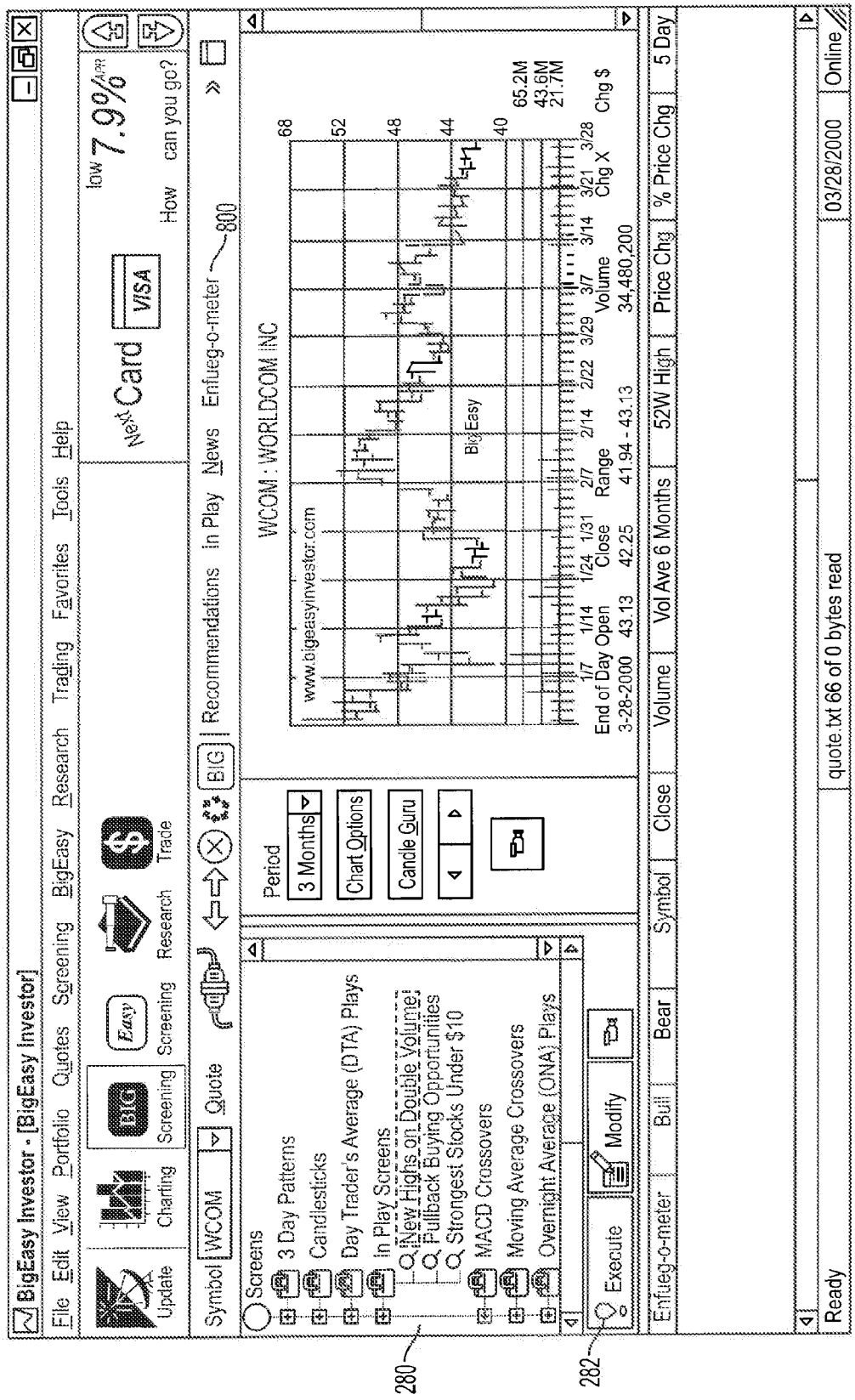
FIG. 14 is an exemplary screen shot of a Big Screening options display by which a screen is selected for execution by the process of the present invention.
Figure 34:
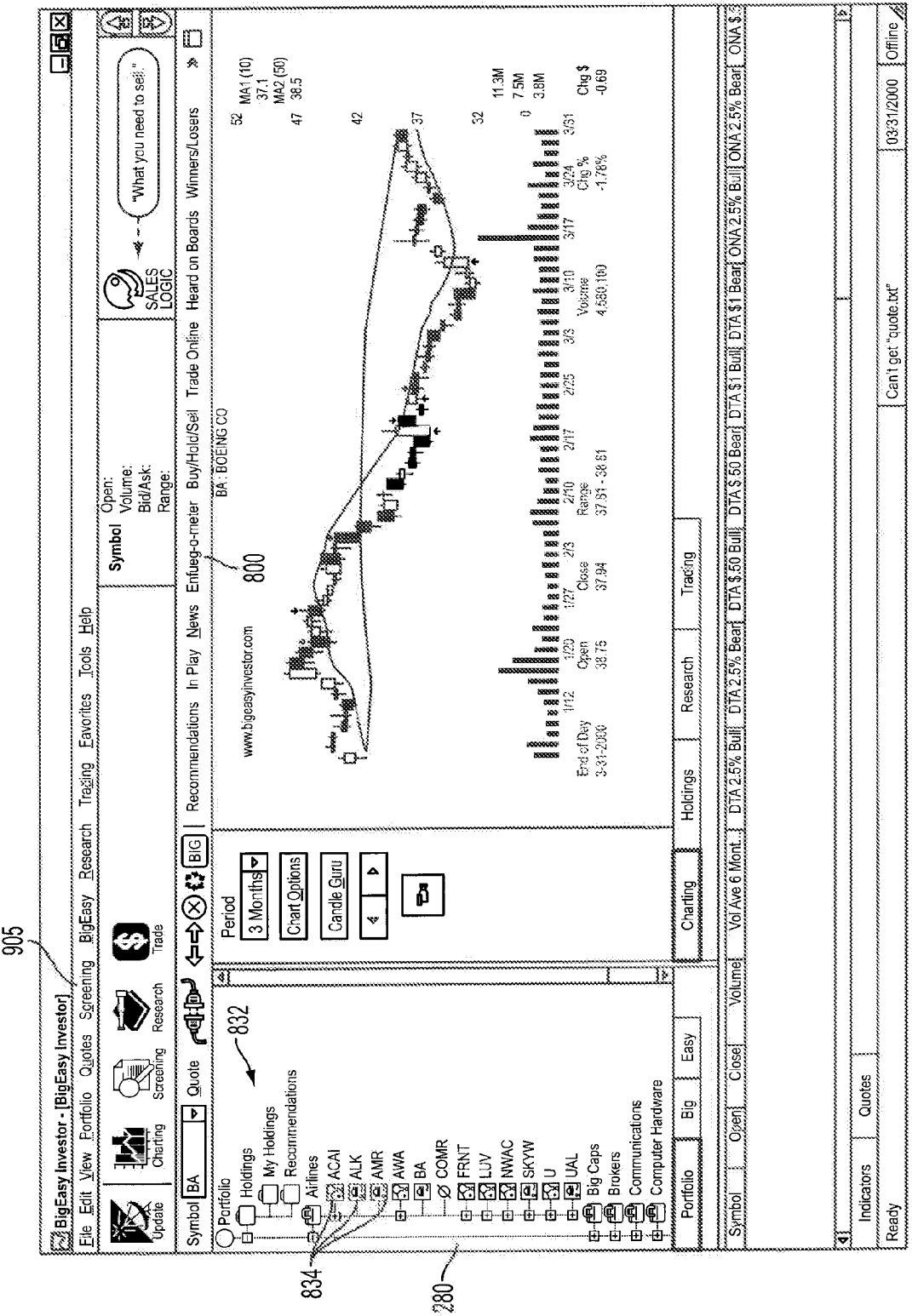
FIG. 34 is a screen shot showing the watch list pane and a chart.

To initiate the En Fueg-o-meter, the investor clicks on "Enfueg-o-meter" 800, which appears in the charting and screening views (see, e.g., FIGS. 14, and 34). As shown to best advantage in FIG. EN11, in the preferred embodiment, upon clicking on Enfueg-o-meter 800, the displayed graph 802 is slightly reduced in size, making room for the En Fueg-o-meter's thermometer-looking graphic 804 (shown enlarged in FIGS. 31-33) to the right of the displayed graph 802. The foundation of the En Fueg-o-meter is derived from a stock's three-week trend. Stocks moving up 10% or more in the period are given the Trending Up rating 806 depicted in FIG. 31. Stocks moving down 10% or more during the period are given the Trending Down rating 808 depicted in FIG. 32. Stocks moving less than 9% during the period are given the Range Bound rating 810 depicted in FIG. 33. In the preferred embodiment, for stocks moving up 10% or more during the period, the portion 812 of the thermometer-looking graphic 804 to which the trending indicator 806 points (FIG. 31) is green; for stocks moving down 10% or more during the period, the portion 814 of the thermometer-looking graphic 804 to which the trending indicator 808 points (FIG. 32) is red; and for stocks moving less than 9% during the period, the portion 816 of the thermometer-looking graphic 804 to which the trending indicator 810 points (FIG. 33) is yellow.

As previously mentioned, in addition to providing the thermometer-looking graphic shown in FIGS. 31-33 and 42, the En Fueg-o-meter also offers summary analysis on six other major indicators, including Big Picture, MACD, Moving Average, RSI, Price, and Volume, to give an investor a quick grasp of the technical picture for any stock. When the En Fueg-o-meter is initiated by user request, the commentary for each of the six indicators is automatically generated. The commentary is based on threshold requirements. For example, if a stock is well below its six-month average trading volume on today's market action, commentary will be generated that attempts to explain what the unusual trading volume means (in conjunction with other indicators such as a move up or down in price). See FIG. 40 item 828. The En Fueg-o-meter uses a text decision tree 818 depicted in FIG. 40 to assign commentary to these five major stock indicators. The process reads the stock's information from the End of Day (EOD) screening file discussed above and creates an HTML inserting the proper numbers (e.g., dollars and percentages) and commentary for the above indicators. In this way, the En Fueg-o-meter tailors its commentary to be specifically relevant to the stock's current state according to the corresponding indication value.

Figure 42:
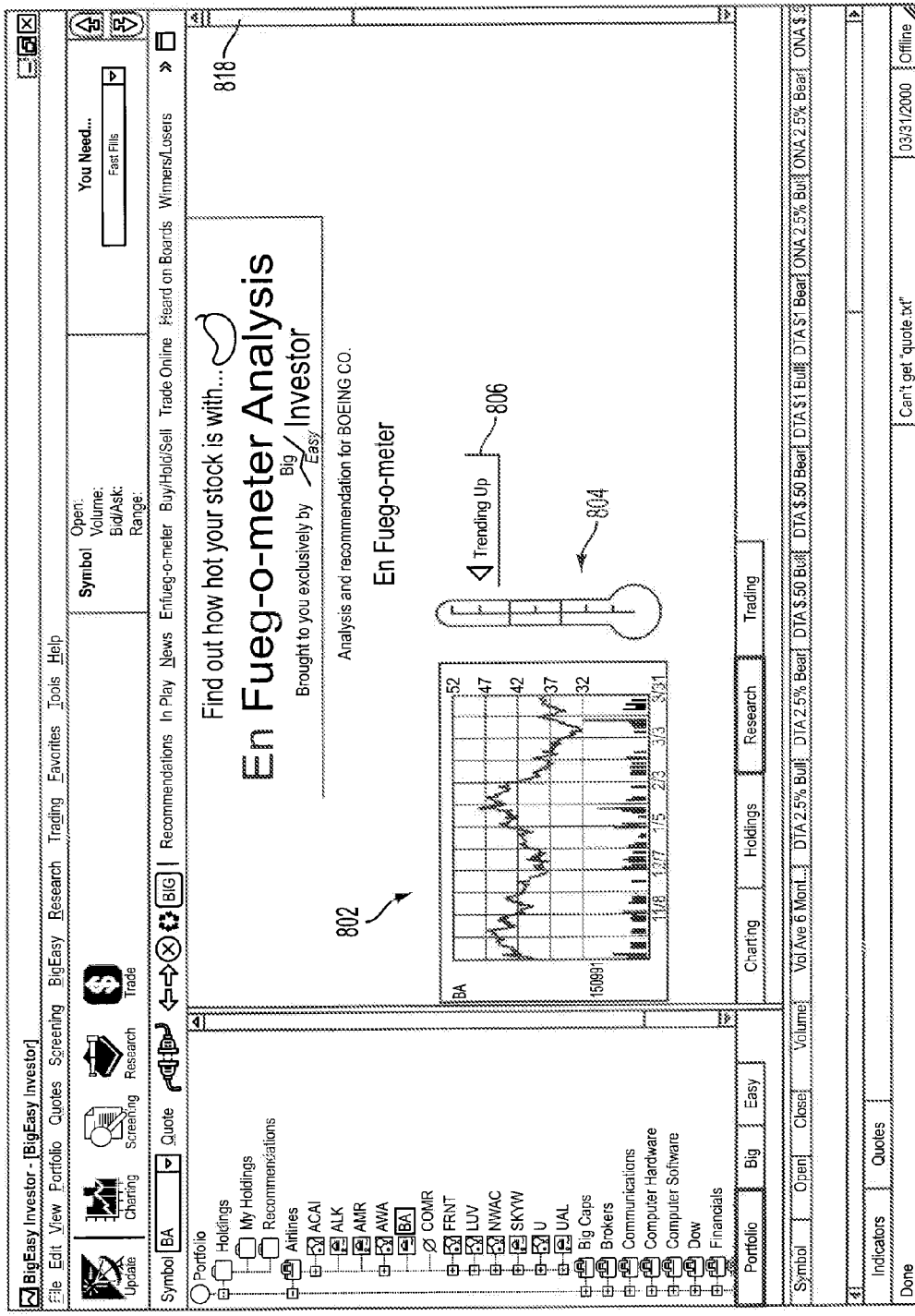
FIG. 42 is a sample screen shot depicting the En-Fueg-o-meter thermometer graphic next to a chart.
Figure 43:
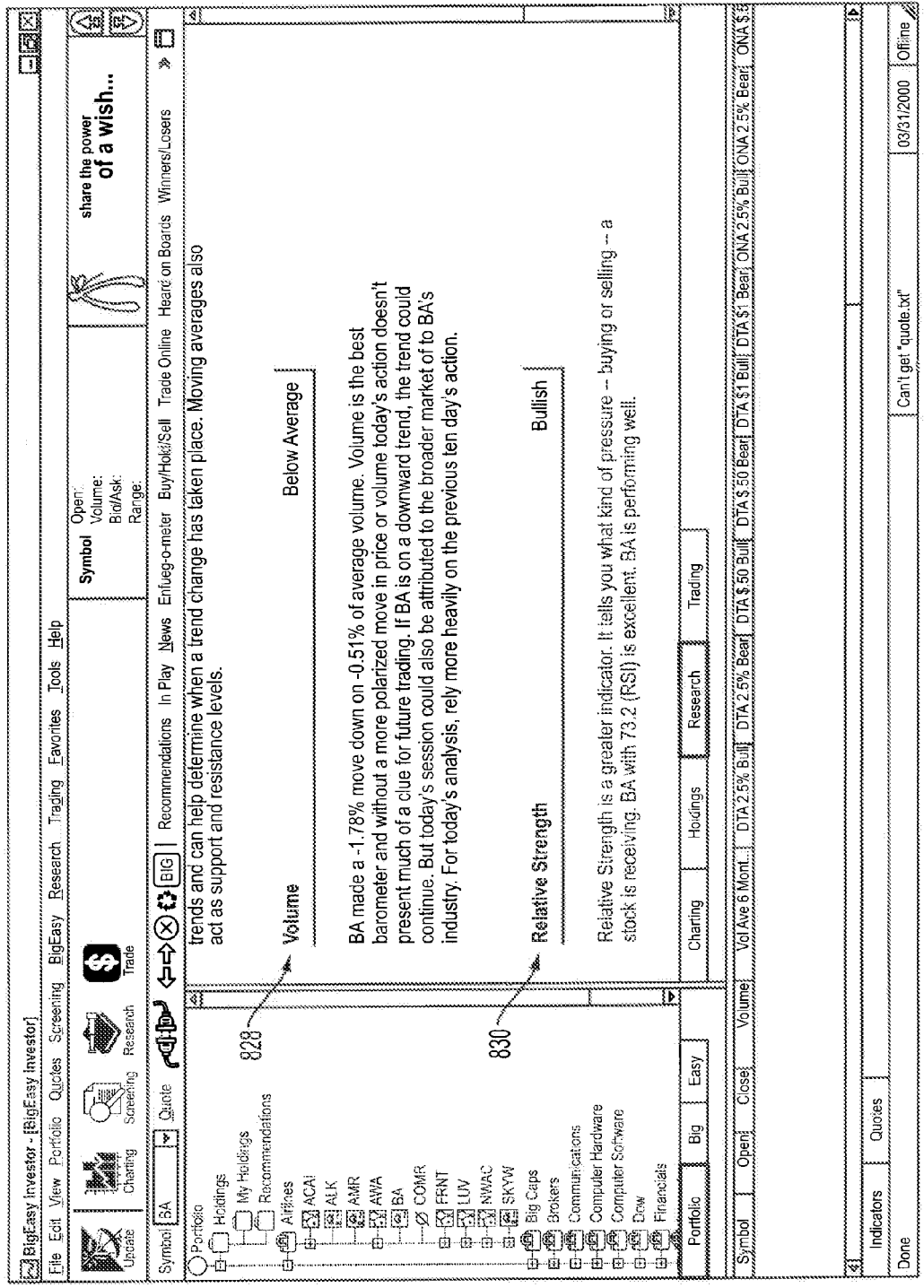
FIG. 43 is a screen shot depicting the Big Picture header and corresponding data displayed after invoking the En-Fueg-o-meter when viewing a chart for a selected stock.
Figure 44:
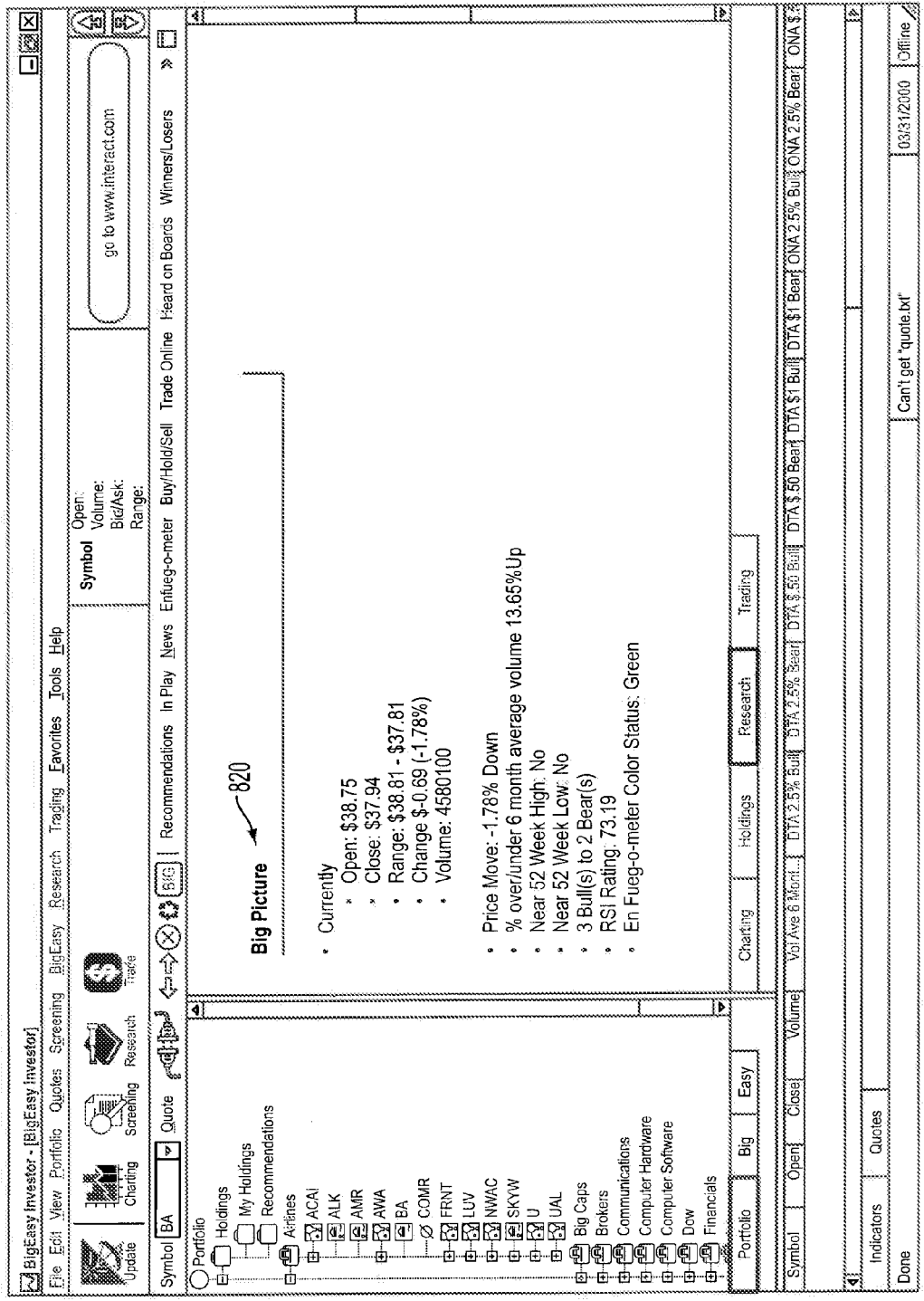
FIG. 44 is a screen shot depicting the Big Picture header and a summary of the data points.

A user who selects the En Fueg-o-meter for Boeing (stock symbol BA), for example, will see the following information (specific to that day) below the En Fueg-o-meter thermometer graphic 804 and displayed graph 802 by sliding an elevator 818 like device that is depicted in FIG. 42 downwardly, in this order:

1. An image of the price chart 802 for the selected stock with the En Fueg-o-meter thermometer graphic 804 to its right (see FIG. 42).
2. Big Picture—this section includes a quick look at the basic data points (open, high, low, close, and volume).

Also included in this section is a quick summary of these data points. An example for Boeing would result in the information under a "Big Picture" heading 820 like that shown in FIG. 44:

3. Price Movement—In the En Fueg-o-meter's price movement section, the software calculates average up and down price cycles for the last year. It starts the algorithm by taking the closing price one year ago. This is the initial pivot point. It then traces from that pivot point to the most current trading day and records peaks and troughs, which represent the price cycles. A peak is established when the closing price drops more than 10% from the pivot point. Once the peak is established, the pivot point is adjusted to the day it surpassed the 10% down mark. A trough is recorded when the price rises more than 10% from the pivot point. The software takes all of the peaks and troughs and calculates the average up and down cycle statistics, number of average up days and down days, and average price movement. It then gives the current status of the stock, whether it is in an up or down cycle and how long it has been there. The actual algorithm is in code/newstock/enfextra.cpp, which was filed with the provisional application that has been incorporated herein by reference.

The following table demonstrates what the recorded peaks and troughs are for AMTD,:

| Date Confirmed | Peak | Trough | Initial Pivot |
|---|---|---|---|
| Mar. 17, 1999 | | | 14.40 |
| Apr. 14, 1999 | 57.69 | | |
| Apr. 20, 1999 | | 29.26 | |
| May 4, 1999 | 46.99 | | |
| May 10, 1999 | | 36.30 | |
| May 14, 1999 | 40.13 | | |
| Jun. 16, 1999 | | 21.56 | |
| Jul. 12, 1999 | 41.25 | | |
| Aug. 5, 1999 | | 20.13 | |
| Aug. 9, 1999 | 23.44 | | |
| Aug. 13, 1999 | | 20.33 | |
| Aug. 19, 1999 | 25.5 | | |
| Sep. 22, 1999 | | 16.13 | |
| Oct. 12, 1999 | 20.81 | | |
| Nov. 4, 1999 | | 16.25 | |
| Nov. 22, 1999 | 30.75 | | |
| Dec. 10, 1999 | | 22.69 | |
| Dec. 15, 1999 | 28 | | |
| Feb. 29, 2000 | | 15.13 | |

An example of what an investor might see under the "Price Movement" header 822 (see FIG. 39; compare FIG. 43) in the En Fueg-o-meter's section for Boeing is as follows:

"Price Movement—UP
"BA closed at $38.63 trading 3,266,100 shares.
". The average up cycle is 18.9% lasting 35.5 days.
"The average peak-to-base down cycle is 42.2% lasting 22.8 days.
"This means when going up, BA will go 18.9% up, and when going down, BA will go 42.2% down.
"BA is breaking out from the current base as follows:
". 19.5% above the base of $32.312.
". 20 day(s) into its average base-to-peak 36-day cycle.
"Based on probability and historical performance, BA has exceeded its typical upside move."

4. MACD—MACD is a technical analysis oscillator that measures overbought and oversold conditions for a stock. For Boeing, an investor might see the following commentary under the "MACD" header 824 (shown in FIG. 36; compare FIG. 43) in the En Fueg-o-meter's section.

"MACD—Bullish"
"The MACD indicator requires trending stocks—the longer and stronger the trend the more reliable the MACD indicator will be. BA is a good candidate for bullish plays being rated Trending Up and Bullish."

5. Moving Averages—moving averages may be thought of as moving trendlines. They help measure the direction of existing trends and can help determine when a trend change has taken place. Moving averages also act as support and resistance levels. An investor might see the following commentary under the "Moving Averages" header 826 (see FIG. 37; compare FIG. EN12) in the En Fueg-o-meter's section "Moving Averages—Mixed"
"BA is mixed. With its 10 and 50 Day Averages diverging BA is very likely range bound. If the stock shows good consistency between support and resistance levels, you may want to consider and Channeling play while it's near its lower range."

6. Volume—This section indicates whether a stock is above or below its daily volume average based on the past 30 days. When a stock exhibits great volume fluctuation, the volume section of the En Fueg-o-meter offers unique analysis. A good example of a stock that exhibits greater volume fluctuation and shows the En Fueg-o-meter's unique volume analysis is Circuit Research (symbol CRLI). An investor looking at CRLI might see the following commentary dynamically generated under the "Volume" header 828 (see FIG. 40; compare FIG. 43) in the En Fueg-o-meter's section:

"ALERT: Strap on your chaps! Put on your spurs and buckle up! CRLI is in the second day of an enormous volume surge. We believe this kind of activity is the best indicator of a strong, short-term move.
"CRLI just experienced a Price/Volume tandem explosion (160.9% move on 1142.9% of average volume). If you had a position in CRLI today, you'll likely be out kicking Euro tires this weekend. This dramatic type of move is an indicator that further upward movement may be in store tomorrow. But CRLI has moved up over 20% in one day which may be too much, too fast. So if you didn't have a position in CRLI today, look for news in the next 48 hours as a confirmation before jumping in. No news could be even better than good news-ride the rumor. A small profit taking pull back often follows after such a violent move up. If you have impeccable timing you may be able to make some by shorting a pull back. However, CRLI also experienced tremendous volume today, supporting the large move. This underscores the demand for CRLI, so there could be a lot of upward climbing left."

7. Relative Strength—this indicator tells you what kind of pressure—buying or selling—a stock is receiving. An investor looking at Boeing might see the following commentary dynamically generated under the "Relative Strength" header 830 (see FIGS. 38 and 43) in the En Fueg-o-meter's section:

"Relative Strength—Bullish"
"Relative Strength is a great indicator. It tells you what kind of pressure—buying or selling—a stock is receiving. BA with 78.9 (RSI) is excellent. BA is performing well."

Figure 35:
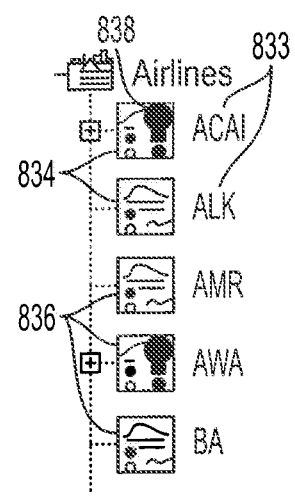
FIG. 35 is an enlarged view of a portion of a watch list pane similar to that depicted in FIG. 34.
Figure 36:
FIG. 36 depicts a header for presentation of the Moving Average Convergence Divergence (MACD) data presented by the En-Fueg-o-meter.
Figure 37:
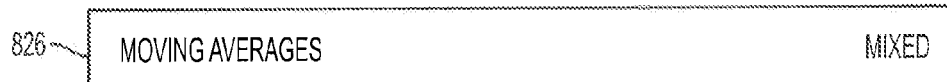
FIG. 37 depicts a header for Moving Averages data.
Figure 38:
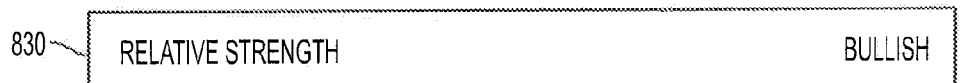
FIG. 38 depicts a header for the Relative Strength data.
Figure 39:
FIG. 39 depicts a header for the Price Movement data.
Figure 40:
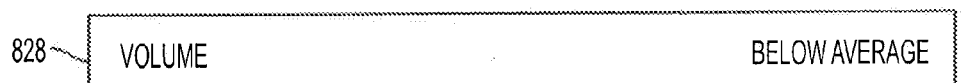
FIG. 40 depicts a header for Volume data.
Figure 41:
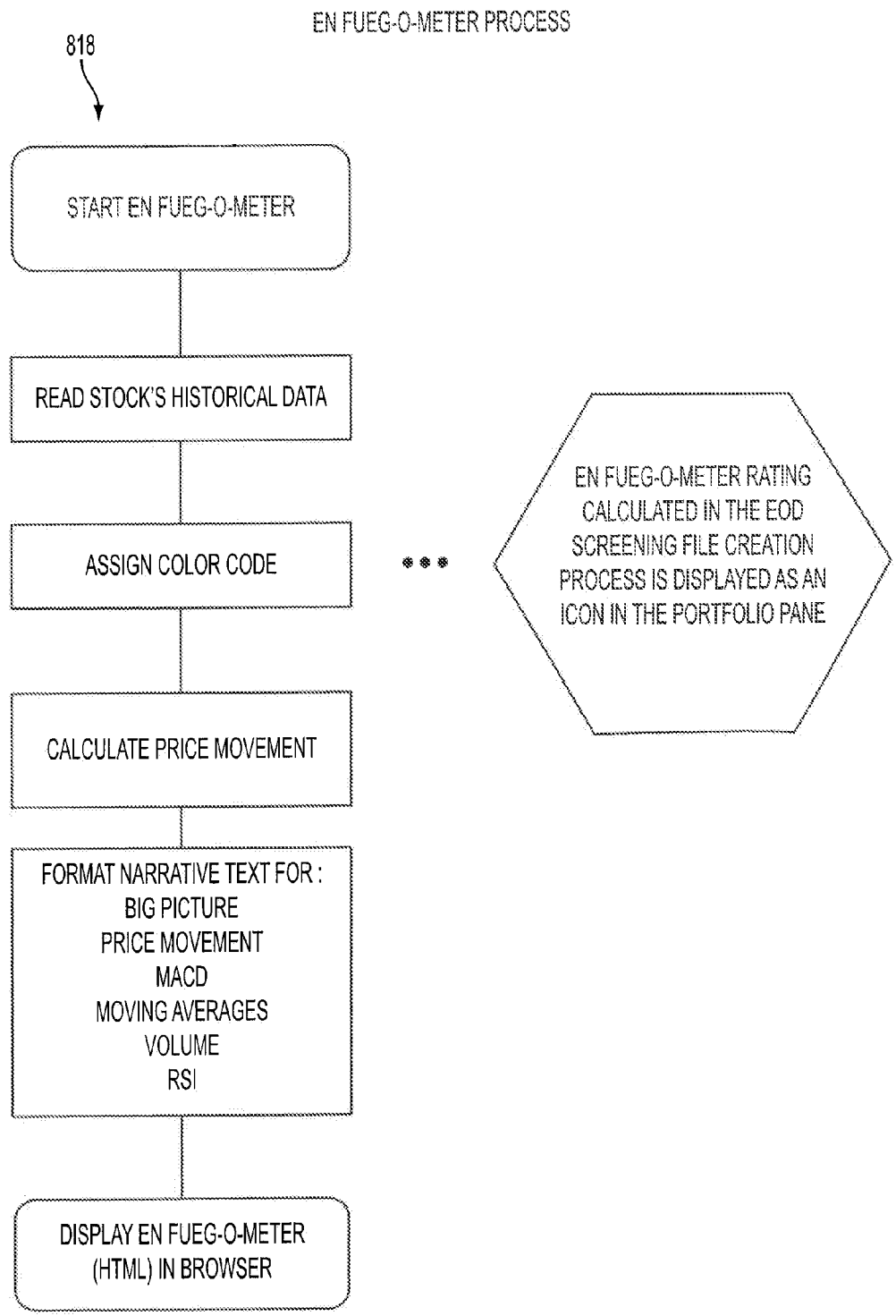
FIG. 41 depicts the text decision tree used by the En-Fueg-o-meter.

The En Fueg-o-meter also provides investors an at-a-glance view of an entire watch list of stocks and offers insight into the stocks' performance without even seeing chart or price data. FIG. 34 is a screen shot depicting, on its lefthand side, a hierarchical list 832 of folders and files in an investor's portfolio. The portfolio includes "holdings" and "watch lists." As the name implies, "holdings" are stocks that the investor currently owns. "Watch lists," on the other hand, are hierarchical folders that house stock symbols an investor wants to follow. When a stock symbol 833 is added to a watch list, an icon 834 comprising a mini stock certificate is generated and placed next to the stock's symbol. FIG. 35 is an enlarged view of a portion of a watch list that is similar to the one depicted in FIG. 34 and more clearly depicts these mini stock certificate icons 834. Each mini stock certificate icon includes a ribbon 836. The analysis that determines whether the En Fueg-o-meter thermometer graphic 804 will indicate "Trending Up" (FIG. 31), "Trending Down" (FIG. 32), or "Range Bound" (FIG. 33) is also used to determine the color of the ribbon 836. Thus, the color of the ribbon changes to reflect the status of the En Fueg-o-meter indicator.

In the preferred embodiment, if a stock is trending down, it has a red ribbon; if a stock is range bound, it has a yellow ribbon; and if a stock is trending up, it has a green ribbon. This provides a quick and easy way to view En Fueg-o-meter analysis at-a-glance from the charting and screening views (e.g., FIG. 34) to help an investor gauge at-a-glance how a stock is trending.

Rather than being processed on an investor's personal computer, the En Fueg-o-meter rating is processed on remote server 100 (FIG. 1) and becomes part of the screen results file. This enables the watch list pane 280 (e.g., FIG. 34) to always have the En Fueg-o-meter rating icon without any wait or processor intensive activity.

The mini stock certificate icon 834 also may include an alert indicator 838. For example, the mini stock certificate next to the ACA symbol in FIGS. 34 and 35 has a large exclamation point adjacent to its right edge. In the preferred embodiment, this exclamation point is the alert indicator 838 and is shown in red to catch an investor's attention.

Candlestick Screening and Explanation System

In another aspect, the present invention includes a candlestick screening and explanation system. Japanese Candlestick charting has been around for more than 300 years. It was first used in the Japanese feudal system to predict the price of rice. However, only in the past five years have candlestick charts become popular in the United States. In his book "Candlestick Charting Explained," which is hereby incorporated by reference as though fully disclosed herein, Greg Morris asserts there are about seventy statistically significant candlestick patterns. The candlestick screening and explanation system of the present invention recognizes the sixty-four candlestick patterns listed above.

Figure 50:
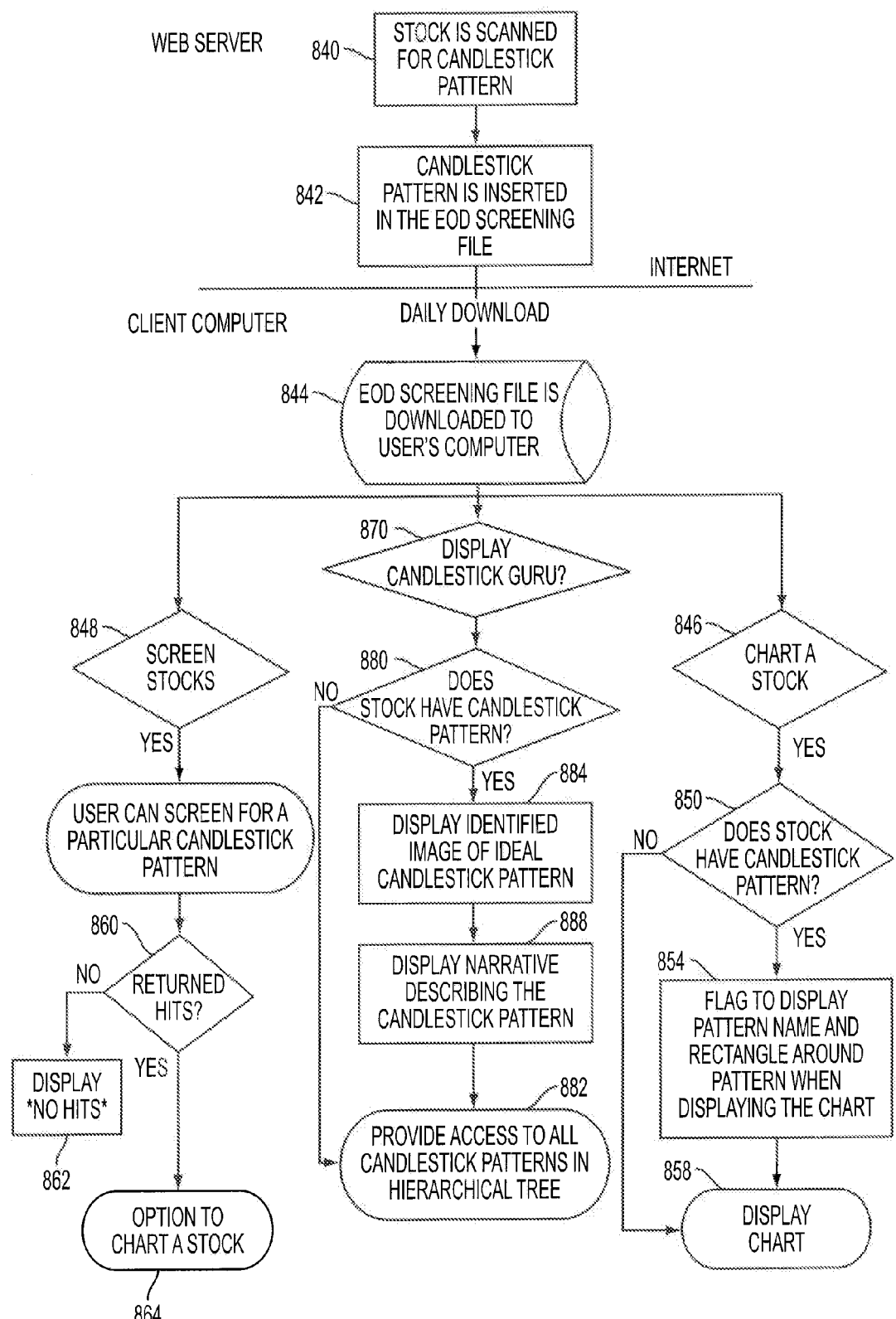
FIG. 50 is a flow chart of the candlestick screening system according to the present invention including invocation of the Candlestick Guru.

FIG. 50 is an overall flowchart of the candlestick screening system of the present invention. In block 840, all of the stocks are screened on the remote server 100 (FIG. 1) for recognized candlestick patterns during the data conditioning process, discussed above, to fully optimize end user screens. During this screening, the pattern recognition process reads the last five trading days for each stock and tries to match the read five-day pattern to one of the ideal candlestick patterns. The identification of a candlestick pattern is difficult. The ideal pattern is up to interpretation instead of rigid rules and values. Candlestick pattern recognition is a fuzzy logic pattern search, so finding 100% pattern matches is rarely achieved. Each of the patterns has its own fuzzy logic matching routine. For example, the source code for recognizing the Two Crows Bearish candlestick pattern is the following:

```
int     TwoCrowsBearish(HIST_DATA_LK_T     *p,int trend)
{
/*
1. The market is in an uptrend supported by the first day white candle.
2. The second day is gapped up from the first day and is a black candle.
3. The last day is a black candle that opens in the prior day's body and closes inside the first days white body.
*/
HIST_DATA_LK_T *p3,*p2,*p1;
if (p && p->prev && p->prev->prev)
{
    p3=p;
    p2=p->prev;
    p1=p->prev->prev;
    if(trend==1 && IsLongWhite(p1) && IsOpenGapUp(p2,
        p1) && IsBlack(p2) && IsBlack(p3) && IsOpenWithinBody(p3,p2) && IsCloseWithinBody(p3,p1))
        return 1;
}
return 0;
}
```

In block 842 of FIG. 50, the candlestick patterns are inserted into the EOD screening file that is made available for downloading by investors during the daily update process as previously discussed. Once the EOD screening filed is downloaded 844, and processed as described above in the data conditioning section, an investor may either chart a stock 846 as usual, screen for a particular candlestick pattern 848, or invoke the Candlestick Guru by itself 870.

Figure 46:
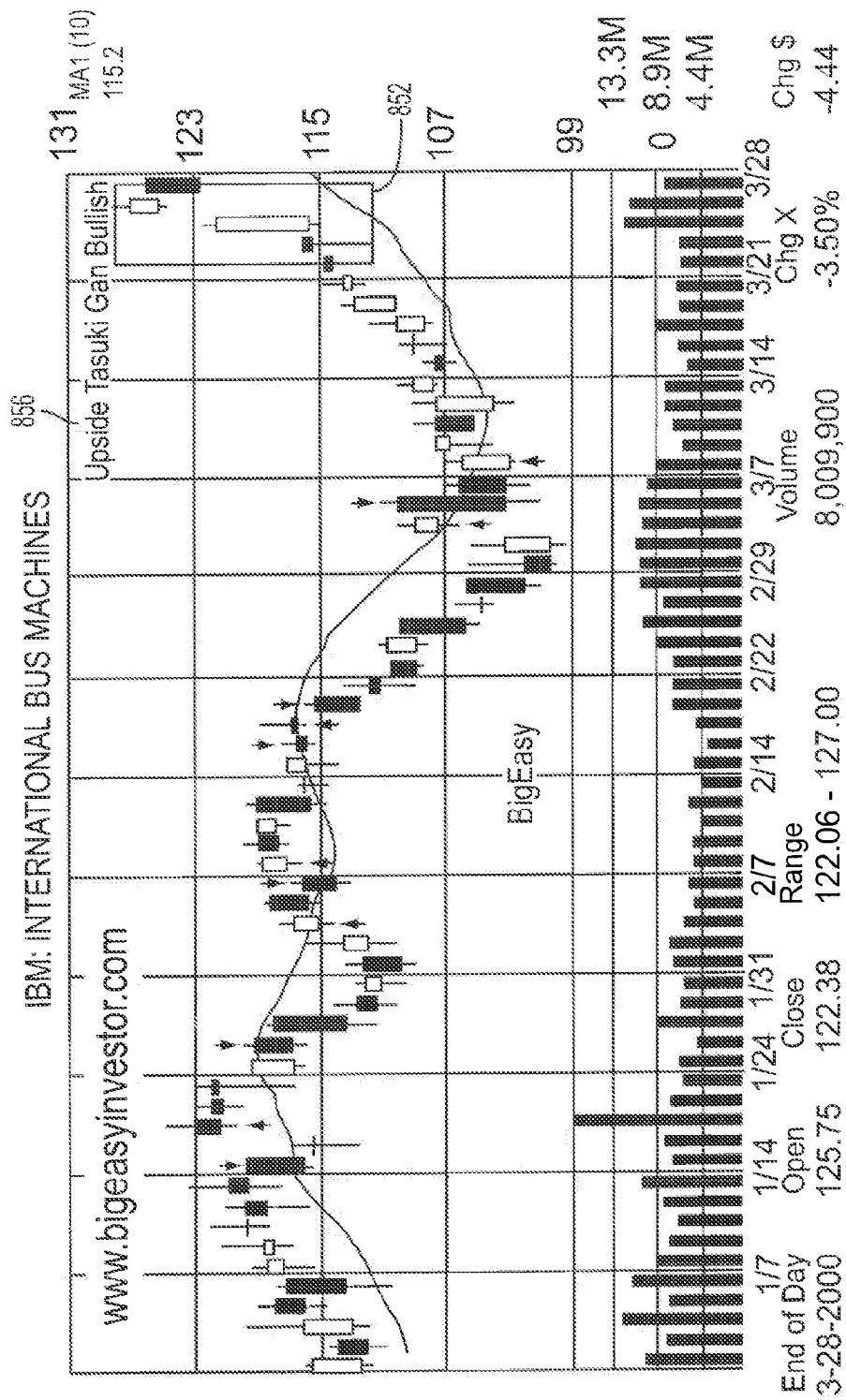
FIG. 46 is a sample screen shot depicting a chart for IBM data and showing a matched candlestick pattern within a box.

If an investor charts a stock, the candlestick screening system of the present invention checks the EOD screening file to see whether the stock has a candlestick pattern 850. If it does, at block 854, the system flags the data to display a rectangular box 852 (see, e.g., FIGS. 46-48) around the pattern on the chart and to display the name of the pattern 856 near the box 852. The stock is then charted as usual (block 858), but the chart will display the box 852 and pattern name 856 because of the flag set at block 854. For example, in FIG. 46 presents a sample chart for IBM stock where the "Upside Tasuki Gap Bullish" pattern has been identified. In the preferred embodiment, the box 852 is red. If the stock does not have a candlestick pattern, the stock is charted at block 858 as usual with no boxed sections.

If an investor screens for a particular candlestick pattern (block 848), and such a pattern is not located (block 860), the investor is so notified 862. If, on the other hand, the screening is successful, the stocks having that pattern are identified and made available for charting. When the investor subsequently selects one of the identified stocks for charting, block 864 invokes the portion of the flow chart commencing at block 846 as just described. The system displays the chart with a rectangular box 852 (see, e.g., FIGS. 46-48) around the pattern on the chart and displays the name of the pattern 856 near the box 852.

Figure 47:
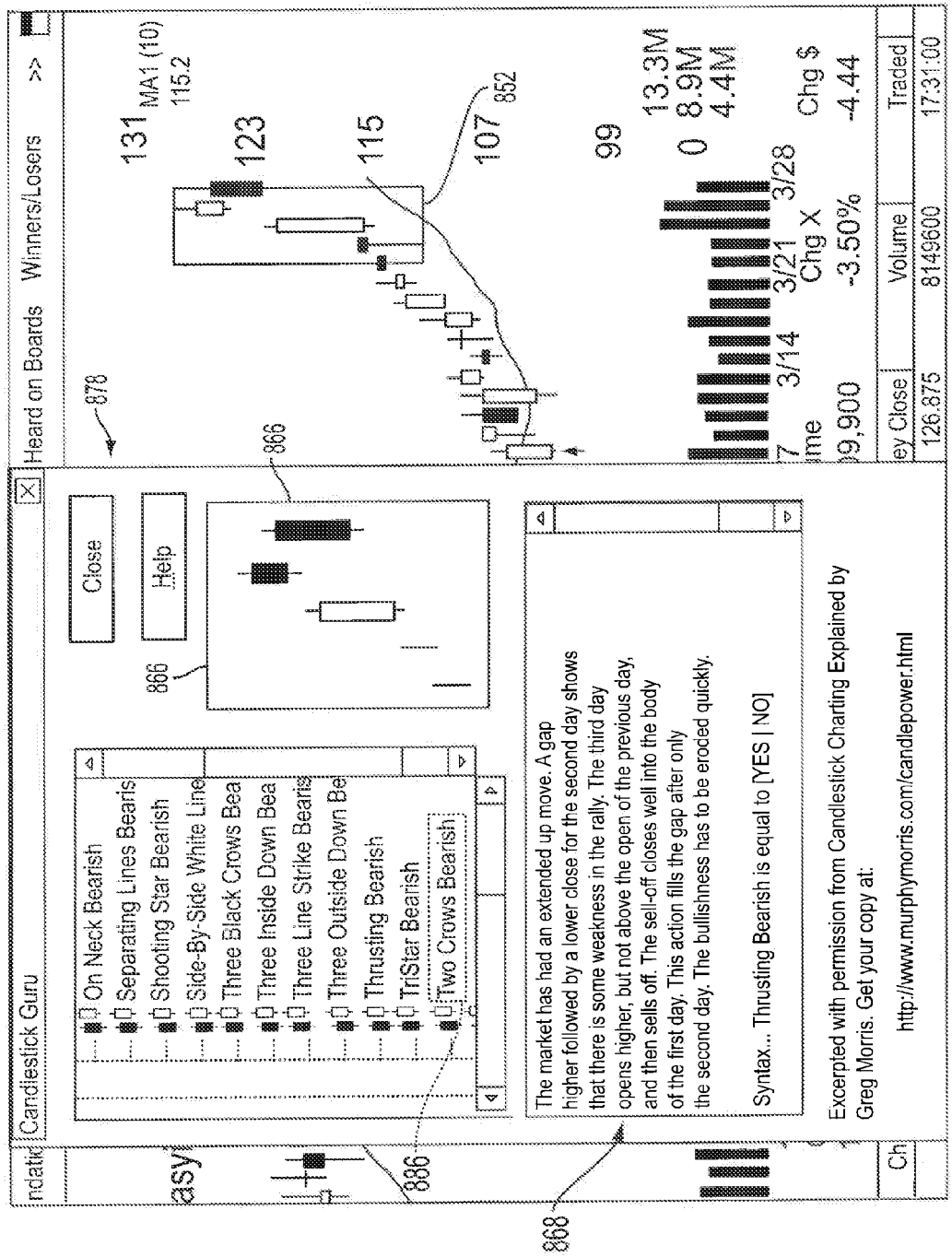
FIG. 47 is a screen shot depicting the Candlestick Guru window open on top of a chart having a recognized candlestick pattern within a box.
Figure 48:
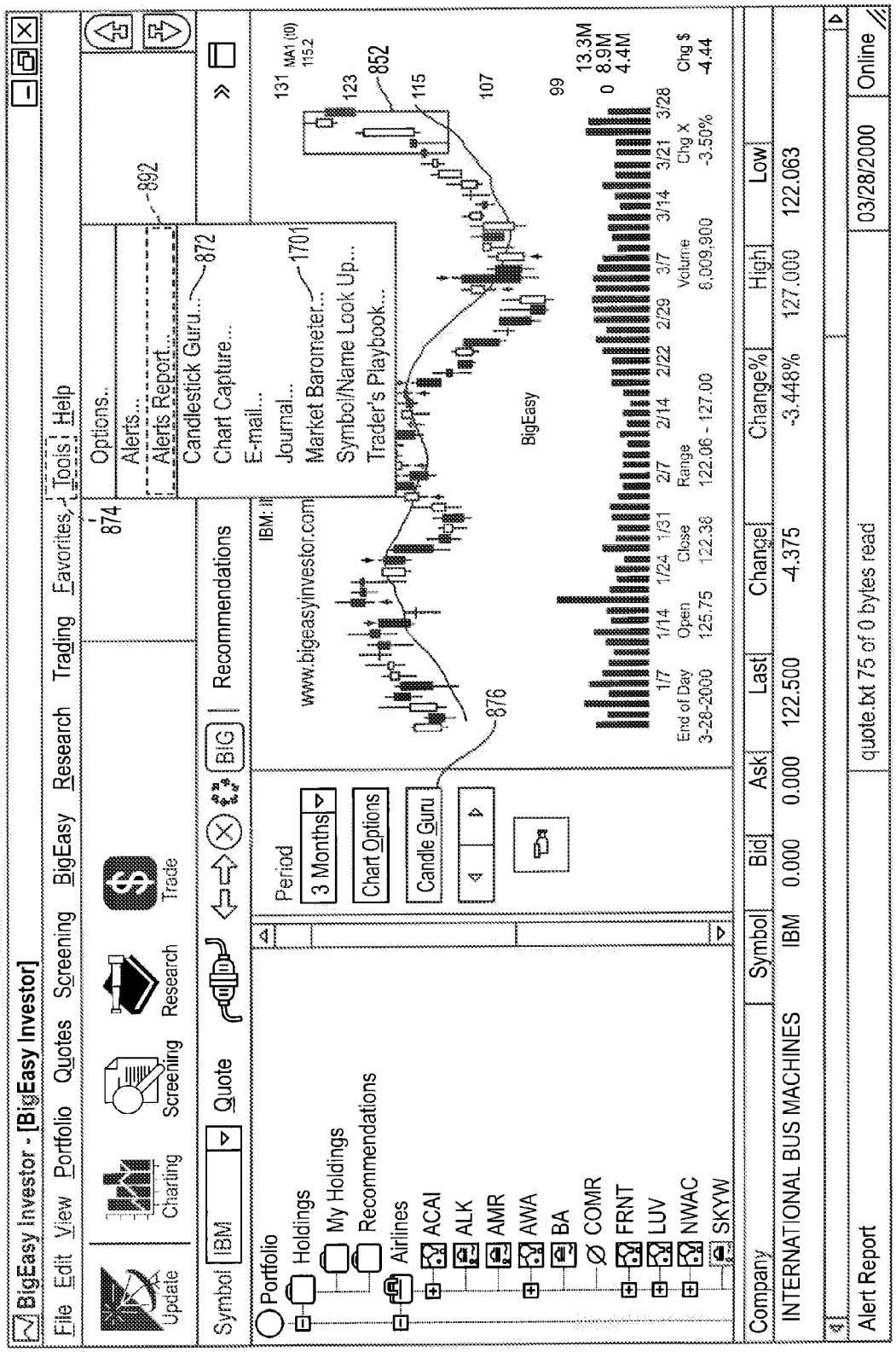
FIG. 48 is a screen shot depicting alternative ways to invoke the Candlestick Guru.

The candlestick screening and explanation system of the present invention also includes a Candlestick Guru. Since candlestick pattern recognition is a fuzzy logic pattern search, it is critical to have a device such as the Candlestick Guru that will allow investors to compare a recognized candlestick pattern with the corresponding ideal pattern and to read expert interpretation of the pattern and the psychology of the traders playing the underlying stock. The Candlestick Guru serves at least three valuable functions: (1) it automatically calls out the candlestick pattern by drawing a box 852 around the pattern on the chart (see, e.g., FIGS. 46-48); (2) it displays an example of an ideal form of the candlestick pattern 866 allowing users to compare how closely the identified pattern matches the ideal pattern (see, e.g., FIG. 47); and (3) it offers an explanation 868 of the pattern and the short-term psychology behind the traders playing the underlying stock (FIG. 47).

Figure 45:
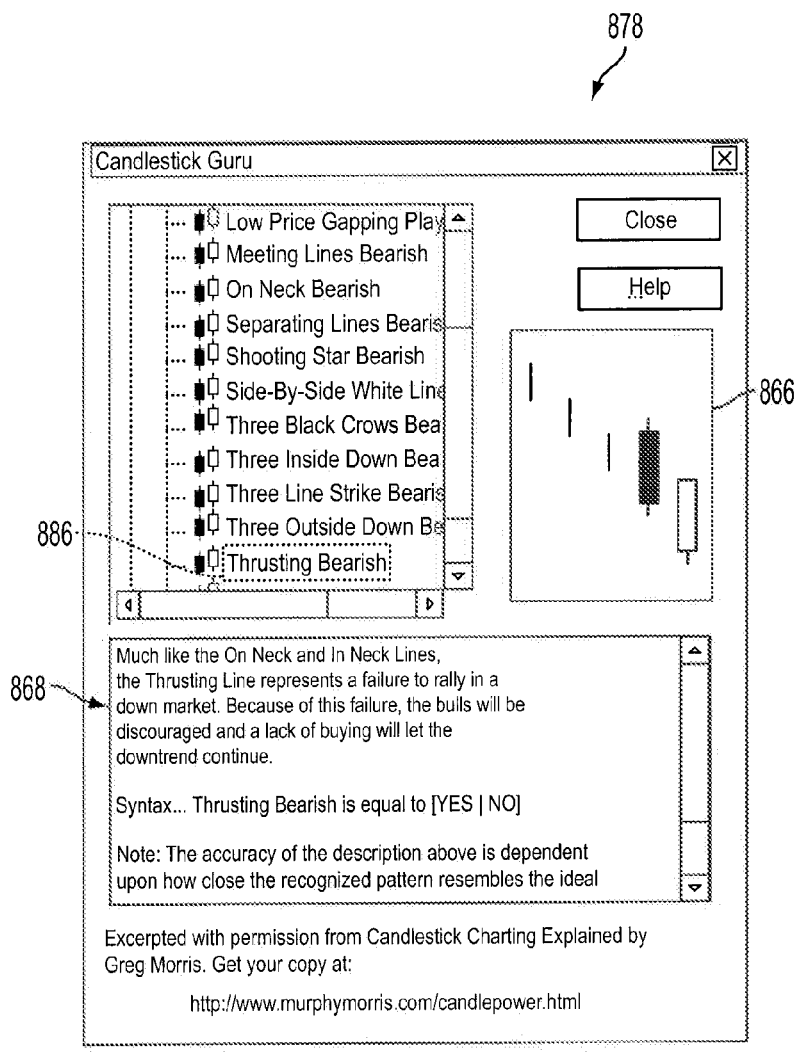
FIG. 45 depicts a sample Candlestick Guru window.

Referring again to FIG. 50, the Candlestick Guru may be invoked 870 by an investor from the charting pane (for example, by selecting "Candlestick Guru" 872 from the "Tools" drop-down menu 874 (FIG. 48) or choosing the "Candle Guru" button 876 (FIG. 48) in the left margin of the chart). This opens the Candlestick Guru window 878 (see, e.g., FIGS. 45 and 47). After being initiated, the Candlestick Guru checks whether the charted stock includes a candlestick pattern (block 880). When users activate the Candlestick Guru without a recognized pattern displayed, they are able to browse all of the previously-noted bearish and bullish candlestick patterns at block 882. If an investor wants to view a list of recognized candlestick patterns based upon the most current data, the investor takes the following steps:

Step 1: Choose "Alerts Report" 892 from the Tools drop-down menu 874 in the charting view (FIG. 48), which opens the "Alerts Report" window 894 shown in FIG. 49.

Figure 49:
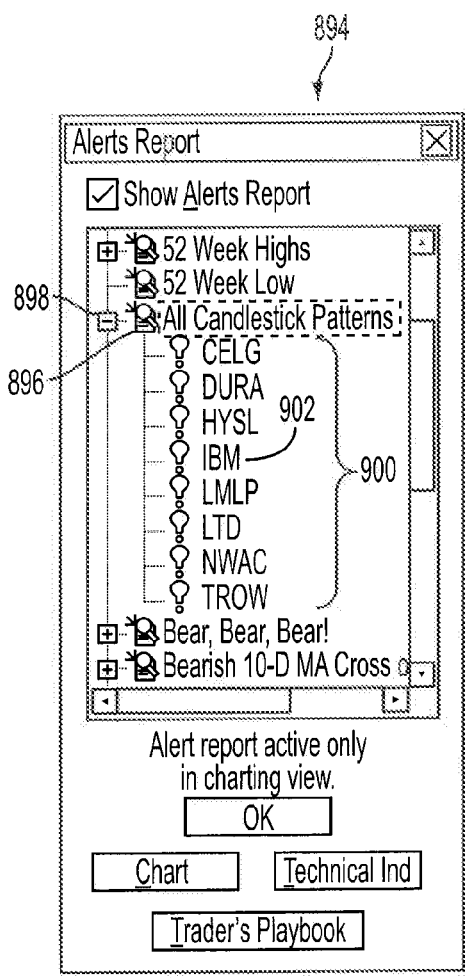
FIG. 49 depicts a sample Alerts Report window;'

Step 2: Scroll down to the "All Candlesticks Patterns" icon 896 and expand the "+" sign (which then turns into the "−" sign 898) to view all stocks with recognized candlestick patterns 900 (FIG. 49).

Then, to chart a stock containing a recognized candlestick pattern, the investor clicks on a selected stock symbol from the expanded list of stocks with recognized candlestick patterns 900. For example, clicking on the "IBM" symbol 902 in FIG. 49 might produce a chart similar to that depicted in FIG. 46.

If the charted stock includes a candlestick pattern, at block 884 the Candlestick Guru is initiated with the stock's recognized candlestick pattern. In particular, the Candlestick Guru window 878 (see, e.g., FIGS. 45 and 47) highlights the name of the recognized candlestick pattern 886, displays an image of an ideal form for the pattern 866, and displays a narrative describing the pattern 868 (block 888 of FIG. 50). In the preferred embodiment, the narrative describing the candlestick-pattern 868 (e.g., FIGS. 45 and 47) includes commentary, rules of recognition, scenarios and psychology behind the pattern, pattern flexibility, and related patterns, and is excerpted from the above-referenced book by Greg Morris. The closer the recognized pattern resembles an ideal pattern, the more accurate the narrative. The software has all of the ideal candlestick patterns stored as images, and it has a description of each candlestick pattern stored in the "candlesticks.txt" file.

The present invention watches for candlestick patterns automatically. Since the pattern recognition data is included in the EOD data update, when a candlestick pattern has been recognized for a stock in a users Watch Lists, an Alert 838 (FIG. 35) will be displayed with the stock icon 834 (FIGS. 35 and 34) and in the Alerts Report window 894 (FIG. 49) just discussed.

Visual Backtesting

Investors want to be able to go back in time and verify trading strategies (i.e., to compare how a current screen has performed at different periods in the past). A process known as backtesting permits this analysis. "Backtesting" is a general investing term used to describe the process of testing or verifying the validity of investing strategies or investment decision-making tactics on historical data. In essence, the strategy is applied to past data, and the results are examined. Most backtesting is quantitative and cannot be represented visually. Traditionally, backtesting is very complicated; it requires knowledge of programming languages and scripting logic. The present invention uses a process called "Visual Backtesting," which is a much easier way of doing backtesting that neither requires programming nor scripting skills.

Figure 51:
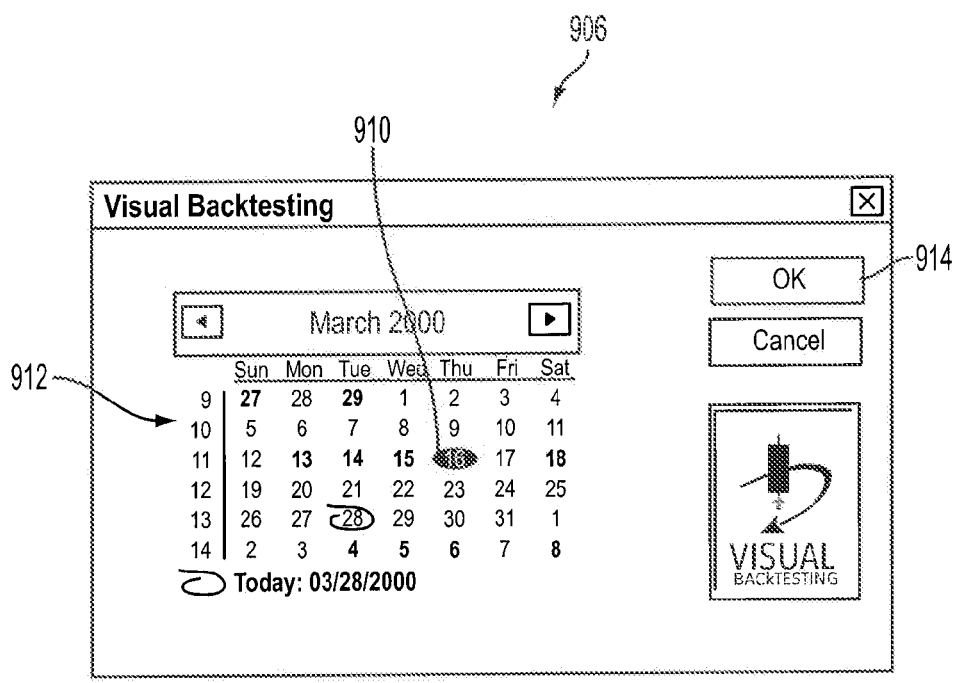
FIG. 51 is an enlarged view of the Virtual Backtesting window.
Figure 52:
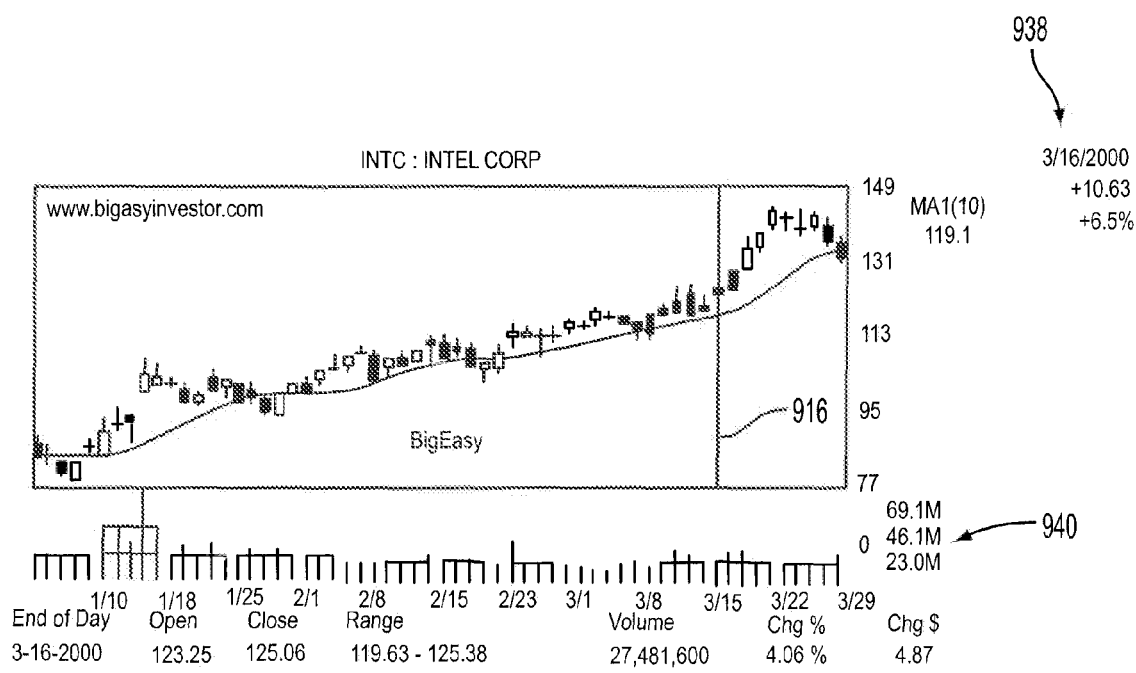
FIG. 52 depicts a chart with a vertical line at the backtesting data date.
Figure 53:
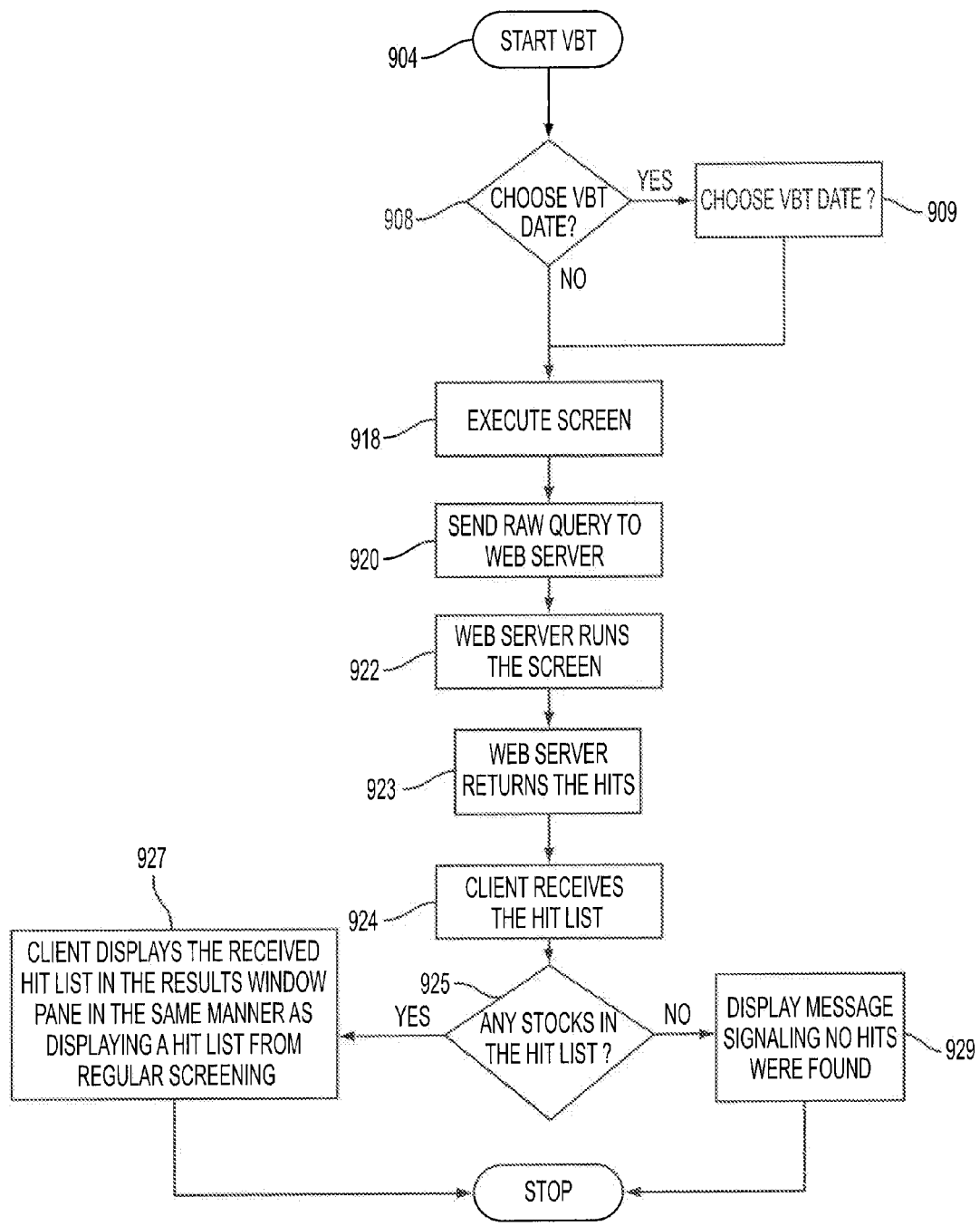
FIG. 53 is a flow chart depicting the overall flow of the Virtual Backtesting process through return of hits to the client computer.

FIG. 53 presents an overall flowchart for screening using the Visual Backtesting (VBT) process of the present invention. The investor starts Visual Backtesting at block 904 by selecting "Visual Backtesting" (not shown) in the Screening drop-down menu 905 (FIG. 34). This opens the VBT window 906 depicted in FIG. 51. In block 908 of FIG. 53, the investor is asked whether the investor wants to select a VBT date. If no new date is selected, the last date selected is re-used. If, on the other hand, the investor wants to choose a VGT date, in block 909 the investor chooses a VBT date by clicking on a selected date 910 on the calendar 912 displayed in the VBT window (FIG. 51) and then clicking the "OK" button 914. The software then enters the VBT mode. While in this mode, all subsequent screens (queries) are executed on the Web server rather than on the investor's local computer. Additionally, when charts are displayed they will be shown with a vertical line 916 drawn at the backtesting data date, as shown in, for example, FIG. 52.

The investor next selects a screen to execute (block 918). The selected screen may be a custom screen created by choosing English phrases from drop-down lists using the process described in detail above. When the investor executes the screen (block 918 of FIG. 53), that generates a query, which is then sent to the Web server for execution (block 920 in FIG. 53). The software running on the investor's computer packages the request for information or screen as a Hypertext Transfer Protocol (HTTP) request and sends it to the Web server. The request consists of the script that will handle the VBT query, the actual query that is to be executed, and the date on which to execute the query. The following is an example query that would sent over the Internet to the Web server in block 920:

http://www.bigeasyinvestor.com/
  vb.pl?query=three_lower_days=Yes|vol_ave3>=100000&
  date=03012000

Because the screens executed in the VBT mode are actually executed on the Web server (block 922) to prevent hard drive bloat for the end user, the investor must have an active Internet connection to the Web server. The Web server hosts the historical end-of-day (EOD) screening files for previous trading days. In the preferred embodiment, one file containing several gigabytes of data is maintained on the server for each trading day; and up to eighteen months of backtesting data files are maintained on the Web server. The Web server thus receives the HTTP request (see above sample), retrieves the proper EOD screening file for the date that the screen is requesting, processes the screen, and returns the results (block 923 of FIG. 53). Each stock that meets the screen criteria on the given date is counted as a "hit." In the preferred embodiment of the invention; the maximum number of hits returned from the screen is four hundred with a maximum date transfer size of 88 Kb, which is a data transfer load that is bearable for modem users. Data returned from a VBT query is in a raw, binary format, without formatting tags and Hypertext Markup Language (HTML) codes, which are present in Web pages.

Returning data in this raw format allows much more information to be relayed across the Internet.

The data is then parsed and displayed in a rich and visually appealing format on the investor's computer. The investor receives the hit list from the Web server (block 924). From the displayed hit list, the investor next selects a stock for charting (block 928). The system checks to see whether there are any hits in the hit list (block 925). If there are hits, the investor can display the hit list (927) and then chart any stocks on the hit list as usual. On the displayed chart in Visual Backtesting mode, the software draws a vertical line 916 (see, e.g., FIG. 52) at the VBT "data date". The "data date" is the date on which the backtesting screen's criteria were met. The trader can quickly and intuitively see how a stock has performed since the data date (i.e., the vertical line 916) displayed on the chart. After displaying the line 916 the software calculates the amount, if any, that the stock has risen or declined in price (raw dollars and in percentage points) from the VBT date to the most current date) and displays that information in a legend 938 (FIG. 52). In the preferred embodiment, the legend 938 appears near the upper right-hand corner of the chart (see, e.g., FIG. 52). Also in the preferred embodiment, investors are presented with all the price and volume bars 940 for the days following the day on which they are testing, and they can easily see how their stock has been performing, giving way to the name Visual Backtesting. If on the other hand, there are no hits, the software communicates that to the user (block 927).

Figure 54:
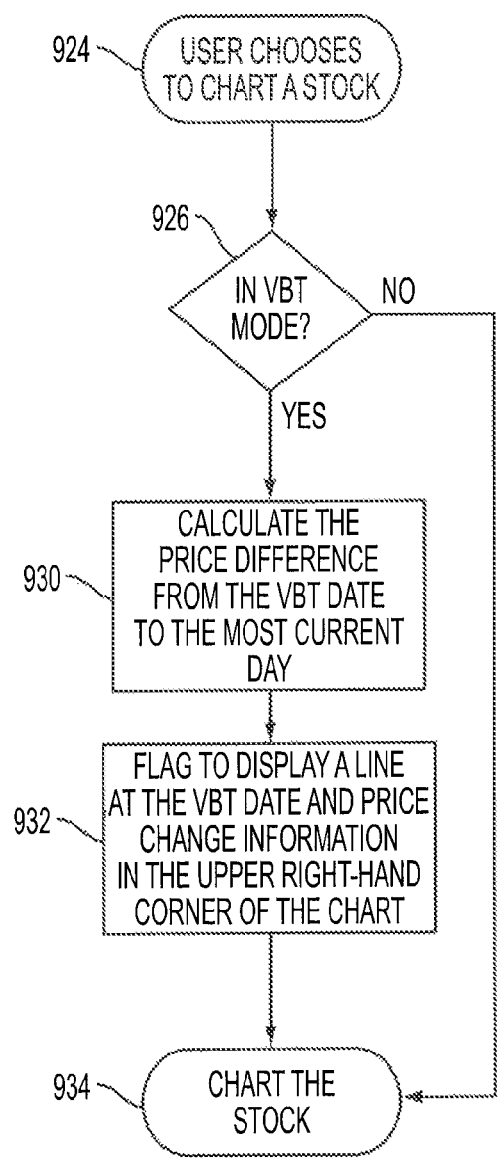
FIG. 54 is a flow chart depicting how Virtual Backtesting hit information is graphically displayed for review by an FIG. 55 and 56 are flow charts for the process of e-mailing charts.

The Visual Backtesting methodology may also be used to indicate how a stock has performed from a selected data date to the present without otherwise screening. Referring next to FIG. 54, the flow chart for using the Visual Backtesting on a chart is described next. At block 924, the user chooses to chart a stock. At block 926, the software checks to see if the Visual Backtesting mode is active. If the Visual Backtesting mode is not active, the stock is charted as usual at block 934. If, on the other hand, the Visual Backtesting mode is active, at block 930 the software calculates the price difference from the Visual Backtesting date to the most current date. Then, at block 932, the data is flagged to display a line 916 at the Visual Backtesting date and to display price change information 938 in the upper right-hand corner of the chart. The stock is otherwise charted as usual (block 934).

E-mailing Charts, Screens, and Watch Lists

In another aspect, the present invention offers information sharing functionality that goes beyond existing investment analysis tools. Many investors who discover valuable information that helps them make better investment decisions want to share this information with others. They share their favorite stock picks, stock evaluation techniques, and trading procedures with family and friends. They may even join an investment club so they can learn from others what they have to share and share what they have learned. With the present invention, investors are able to e-mail text, charts, screens, and watch lists directly from within the software without opening a separate e-mail application. By right-clicking on a screen, watch list, or chart, investors can quickly e-mail these items to others. The item (screen, watch list, or chart) is automatically attached to an e-mail and sent.

Figure 57:
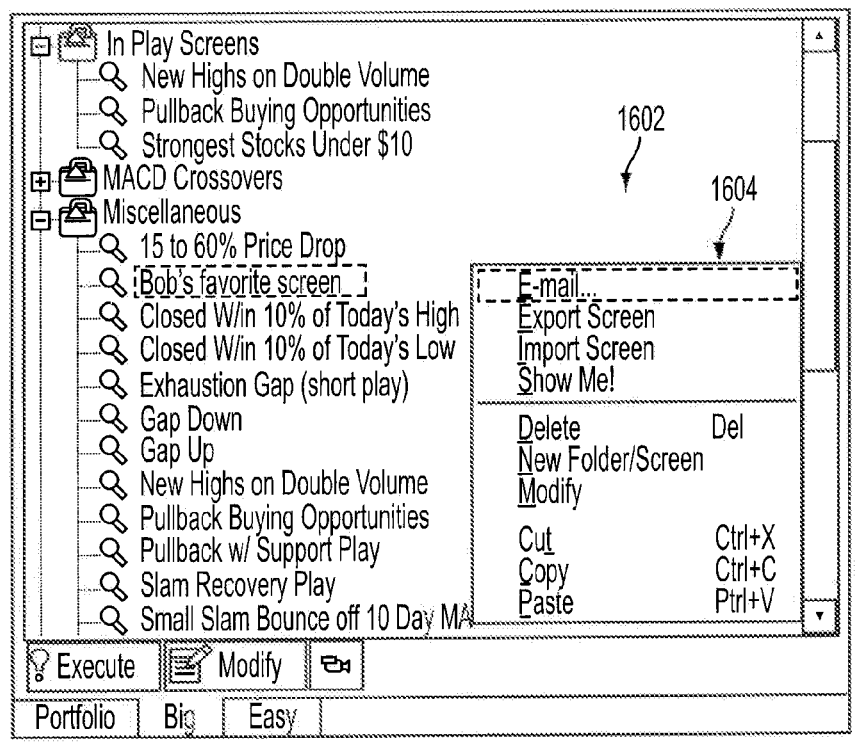
FIG. 57 shows a pop-up window open in the files pane.
Figure 58:
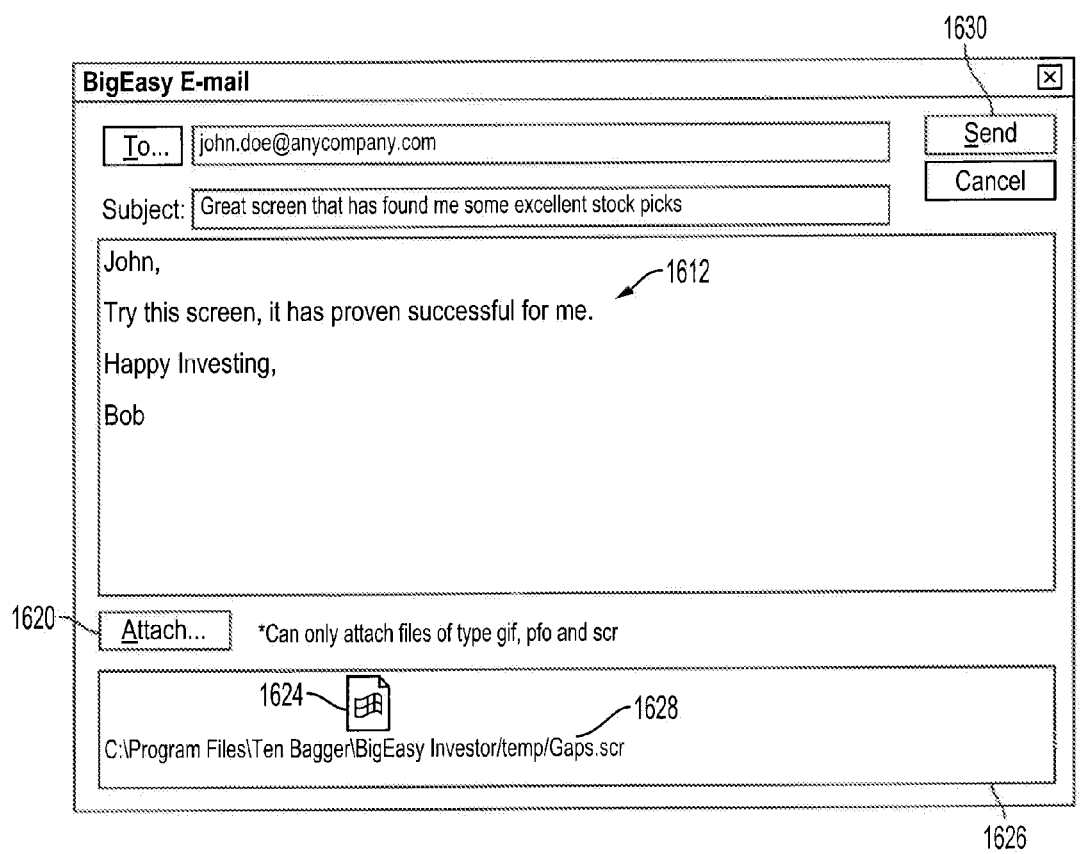
FIGS. 58 and 60 are sample-mail windows.

Referring most specifically to FIGS. 55 and 56, the process of e-mailing charts, screens, and watch lists is described next. In block 1600 of FIG. 55, the investor invokes e-mail by, for example, right-clicking on a selected chart, screen, or watch list. As shown to best advantage in FIG. 57, this opens a functions window 1602 from which the investor may elect to send an e-mail by left clicking on "E-mail" 1604. Next, in block 1606 of FIG. 55, the e-mail window is displayed. Sample e-mail windows are shown in, for example, FIGS. 58 and 60. At this point, the investor is given the option to configure or look up one or more e-mail addresses (block 1608). If desired, the investor may create, modify, delete, or look up one or more e-mail addresses (block 1610). Once the recipients' addresses have been inserted into the e-mail, the investor enters the narrative portion 1612 (e.g., FIG. 58) of the e-mail (block 1614). The investor may then attach one or more items (block 1616).

If the investor decides not to attach any files, the investor is then given the option of sending or discarding the e-mail (block 1618. If, on the other hand, the investor decides in block 1616 to attach a file by clicking on the "Attach" button 1620 (e.g., FIGS. 58 and 60), the investor is required to select the screen, watch list, or chart to attach (block 1622). To attach additional files, the investor again clicks on the "Attach" button 1620 and selects each additional file to be attached. For each selected file, an icon 1624 is displayed in the bottom window 1626 of the e-mail window along with the file's path 1628 (e.g., FIGS. 58 and 60). After attaching one or more files to the e-mail, the investor is again given the option of sending or discarding the e-mail (block 1618).

Figure 62:
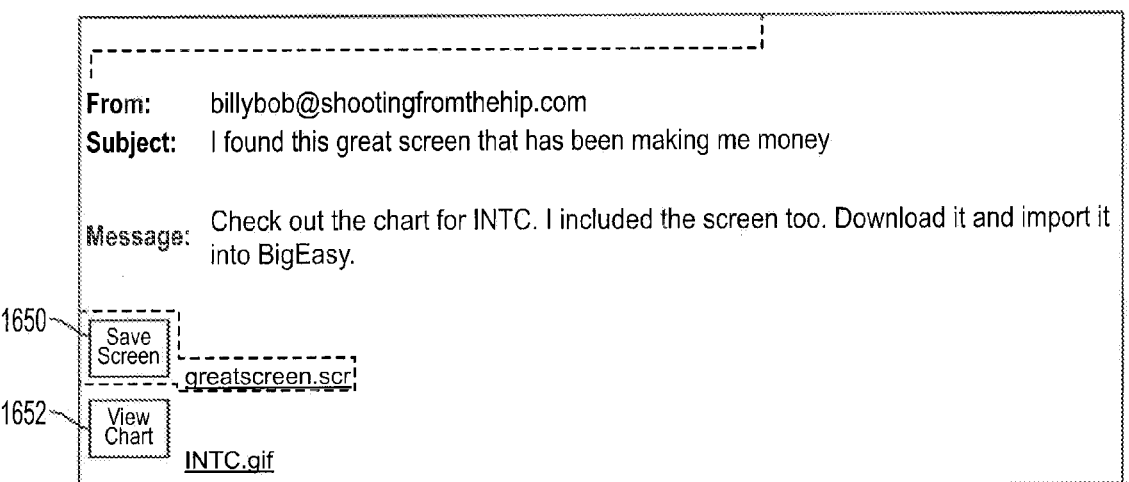
FIG. 62 is a sample message that an addressee will see on the Web server.

When the investor clicks on the "Send" button 1630 (e.g., FIGS. 58 and 62), a notification e-mail signaling there is a message for the recipient at the Web server is sent by transferring the message to the Web server and then using Sendmail, a Unix mail utility, to deliver the message to the recipient (block 1630 of FIG. 55) without any attachments. In particular, the software on the investor's computer initially sends a message to the server containing "to information," "from information," "subject information," and a unique file identifying constructed from a combination of the sender's username and the date on which the user sent the message, in time_t format (time_t is a C language structure for date and time), which is explained further below. At block 1638, the sender receives a signal that the e-mail was sent as requested. Then, the investor's computer constructs an HTML file, which consists of the main e-mail message, without attachments, and transfers it to the Web server (block 1634). A sample of such a message is shown in FIG. 62. Any attachments are then send to the Web server (block 1636) where they are stored to avoid clogging the recipients' e-mail boxes with potentially large files and messages they may not want.

Each e-mail message and attachments are uniquely identified to properly organize the e-mail infrastructure and to provide a secure environment for e-mail transmissions. The attachments are stored in a different directory than the one in which the e-mail messages are stored. The main HTTP e-mail message is assigned the sending investor's username and the date in which they sent the message, in time_t format). Likewise, any attachments are assigned the name of the attachment plus the date appended to the end. Only the recipient has this e-mail link and this link only resides in the recipient's e-mail client. By appending the time field, the name is made unique creating a secure e-mail environment.

Figure 60:
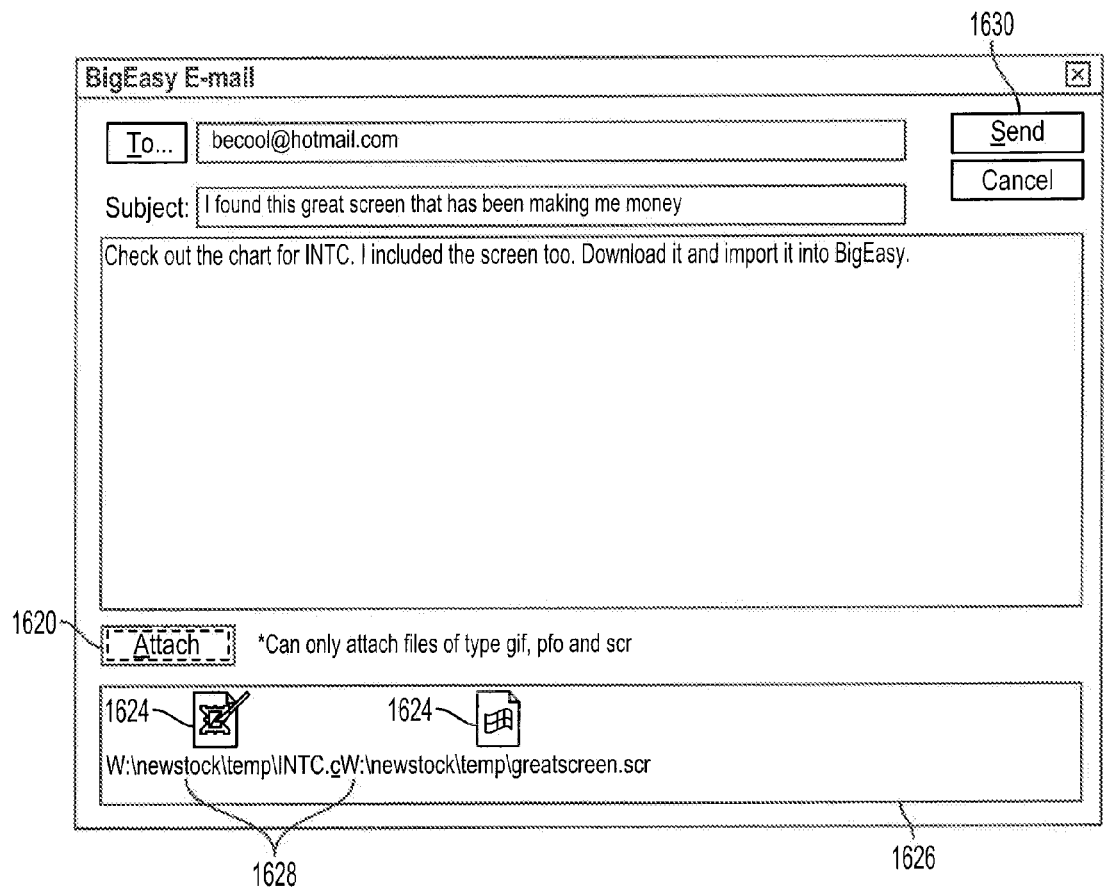

For example, assume an investor ("billybob@shootingfromthehip.com") sends an e-mail to another investor ("becool@hotmail.com") containing a main message, an attached chart and an attached screen (see FIG. 60). This e-mail will be sent to the Web server as three files and one notification e-mail. An example name of the HTML file as stored on the Web server, with the date in time_t format, is "billybob__954527922.htm." The attached chart would be saved on the Web server as "INTC__954527922.gif," and the attached screen would be saved on the Web server as "greatscreen_954527922.scr." A corresponding sample notification e-mail may appear to becool@hotmail.com at shown in FIG. 61 containing the shown HTTP link 1642.

Figure 59:
FIGS. 59 and 61 are sample notification e-mails.
Figure 61:
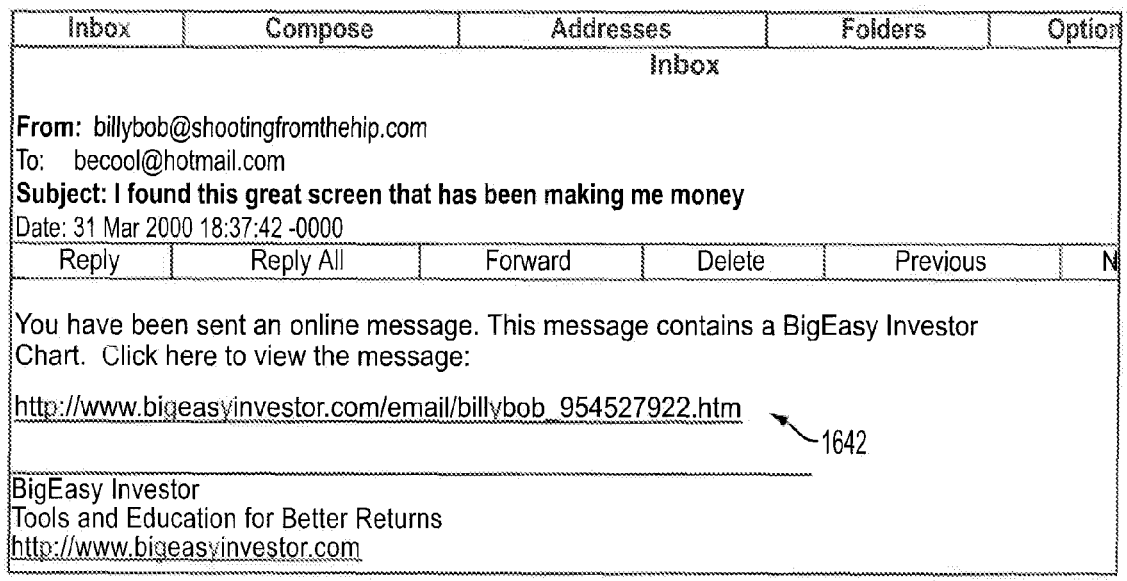

Referring to FIG. 56, the recipient receives an e-mail message (block 1640) with a HTTP link 1642 (FIG. 59) to the Web server where any attachments are posted via TCP/IP or FTP. The HTTP link 1642 may be easily posted at a chat room, message board, or community Web site. Sample notification e-mails are shown in FIGS. 59 and 61.

At block 1644, the addressee opens the notification e-mail. As shown in the sample notification e-mails (FIGS. 59 and 61), a HTTP link 1642 to the content of the e-mail is provided in the notification e-mail. At block 1646, the recipient may choose not to click on the HTTP link and exit the e-mail. If, on the other hand, the recipient clicks on a HTTP link, the addressee is transported the to the Web server to view the message (block 1648). At the Web server, the addressee will see a message similar to the sample message shown in FIG. 62. As shown in FIG. 62, the address may save a screen attached to the e-mail by clicking on the "Save Screen" button 1650 or the addressee may view an attached chart by clicking on the "View Chart" button 1652. If the sender had attached a watch list, a similar button would have appeared in the e-mail providing the addressee the opportunity to save the watch list.

An additional advantage provided by the process of the present invention, in addition to the storing of e-mails and attachments on the Web server, is that e-mail recipients are directed to the Web server and frequently wander through the Web site after reviewing the e-mail message and attachments originally sent to them (see block 1654 and 1656).

Market Barometers

Another feature of the present invention is termed the "Market Barometer." The Market Barometer permits an investor to get a quick and complete understanding of the performance of the overall market on a given day. The Market Barometer feature gives a combined view of various data points and indicators for the three popular indexes (Dow, Nasdaq, and S&P 500). This allows users to quickly assess market conditions without having to sort through multiple indicators on multiple indexes.

Figure 63:
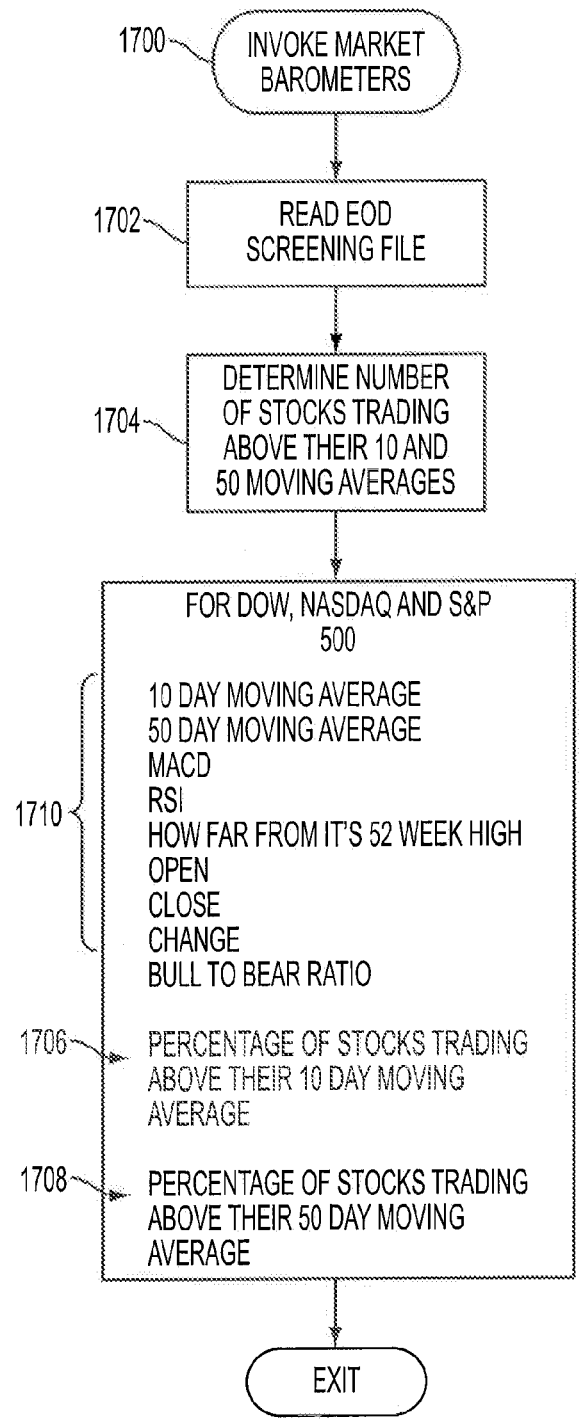
FIG. 63 is an overall flow chart depicting how the overall market barometers are calculated.
Figure 64:
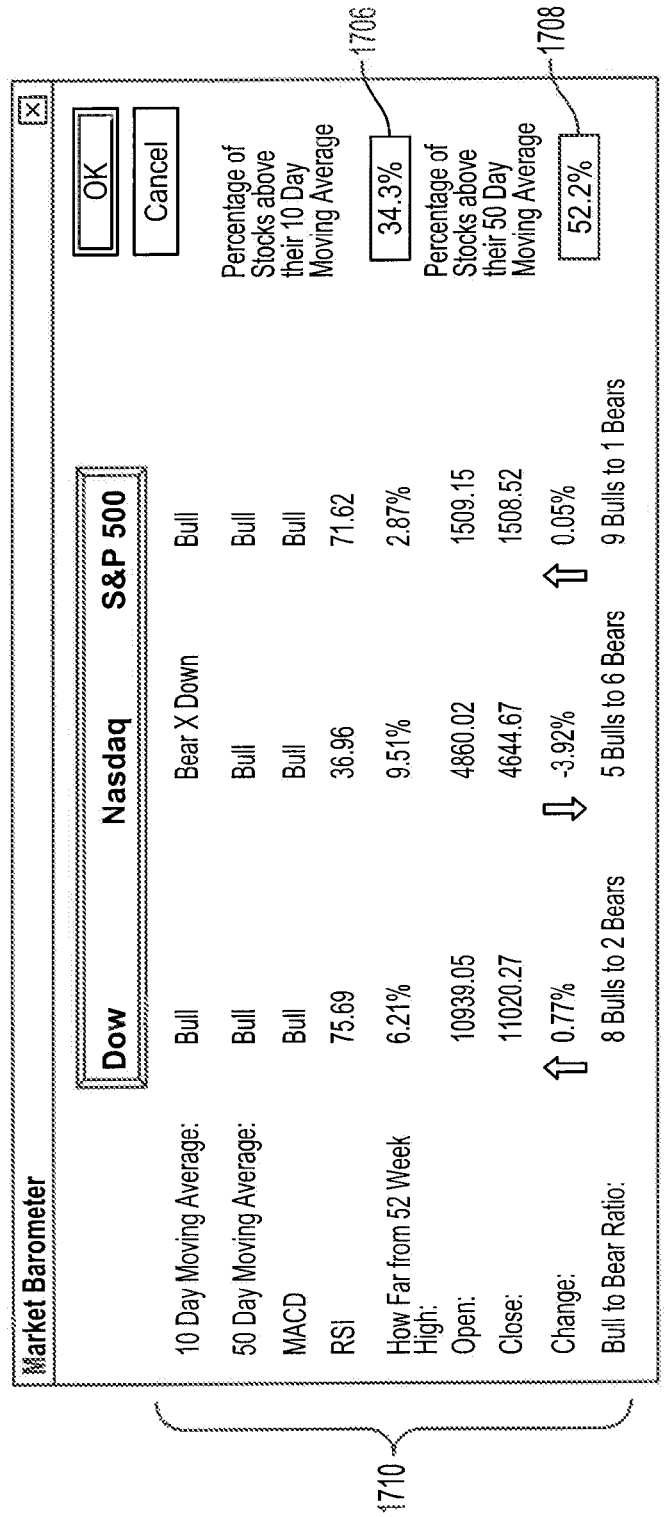
FIG. 64 is a sample screen shot depicting presentation of the market barometers.

FIG. 63 is a flowchart of the Market Barometer process. In block 1700 the trader invokes the Market Barometer by, for example, selecting "Market Barometer" 1701 under the pull-down "Tools" menu 874 in a charting and screening view (see, e.g., FIG. 48). When Market Barometer is selected, the software reads the end-of-day (EOD) screening file (block 1702 in FIG. 63). From the EOD screening file, the software determines the number of stocks trading above their 10 and 50 day moving averages (block 1704). From this determination, the percentage of stocks on all three major exchanges above their 10 day moving average 1706 and the percentage of stocks above their 50 day moving average 1708 are displayed as shown in FIG. 64. This feature of the Market Barometer is similar to the Advance-Decline measurement mentioned above, which is simply a cumulative total of the number of advancing issues minus the number of declining issues only on the NYSE.

The Dow Industrial Average, Nasdaq Composite, and the S&P 500 indexes each has the same data points as an individual stock (open, close, high, low, and volume). Thus, the software can display common indicators and data points for the indexes the same way it would for a stock. Using the same processes that are used to display indicators and data points for individual stocks, the Market Barometer feature processes and displays the metrics on popular indicators and data points for the Dow Industrial Average, Nasdaq Composite, and the S&P 500 indexes. As shown in FIG. 64, the following indicators are displayed in a single and easy to understand format:

10 Day Moving Average: whether or not the Dow Industrial Average, Nasdaq Composite, and S&P 500 indexes are above their 10-day moving average; below their 10-day moving average; making a bullish cross up through their 10-day moving average; making a bearish cross down through their 10-day moving average.

50 Day Moving Average: whether or not the Dow Industrial Average, Nasdaq Composite, or S&P 500 indexes are above their 50-day moving average; below their 50-day moving average; making a bullish cross up through their 50-day moving average; making a bearish cross down through their 50-day moving average.

MACD (Moving Average Convergence Divergence): whether or not the Dow Industrial Average, Nasdaq Composite, or S&P 500 indexes are bullish or above their MACD centerline; bearish or below their MACD centerline; making a bullish cross up through their MACD centerline; making a bearish cross down through their MACD centerline.

RSI (Relative Strength Index): The RSI rating for each of the Dow Industrial Average, Nasdaq Composite, or S&P 500 indexes.

How Far from 52 Week High: How far the closing price for each of the Dow Industrial Average, Nasdaq Composite, or S&P 500 indexes are from their 52 week highs.

Open: Opening price for each of the Dow Industrial Average, Nasdaq Composite, or S&P 500 indexes.

Change: The percentage change for each of the Dow Industrial Average, Nasdaq Composite, or S&P 500 indexes based on the closing price from the previous trading day.

Close: Closing price for each of the Dow Industrial Average, Nasdaq Composite, or S&P 500 indexes.

Bull to Bear Ratio: Ratio of bullish indicators compared to bearish indicators for each of the Dow Industrial Average, NASDAQ Composite, or S&P 500 indexes.

The Market Barometer thus provides (1) automated processing, gathering, and summation of nine key technical analysis metrics for the NASDAQ Composite, Dow Jones Industrial Average, and S&P 500 indexes 1710; and (2) a non-weighted, non-index-related, technical analysis perspective of all stocks trading on the NASDAQ, NYSE, and AMEX embodied in the percentage of all stocks on all three of the exchanges whose closing prices were above their 10-day and 50-day moving averages 1706, 1708, respectively.

Updating and User Usage Tracking

In another aspect of the present invention, usage tracking and user activity tracking is performed. This tracking is performed in two separate locations and then coordinated during the daily update process. The first location is on the users' computers (i.e., client-side tracking). The second location is on the web/update server when the users receives their daily data update (i.e., server-side tracking).

During client-side tracking, the user's total minutes spent using the application is tracked. This value is saved to the Windows registry each time a user exits the program and is added to each time the user starts the application and begins using it. The effect is that a total, cumulative amount of usage is tracked while the user is using the software of the present invention. Time spent while the application is running, but not the active Windows application, is excluded from the usage tracking time. The number of advertisements shown to the user is also tracked on the client side. Each ad banner is displayed for about twenty seconds. Each time the ad is displayed, a counter is incremented for that particular ad.

Figure 65:
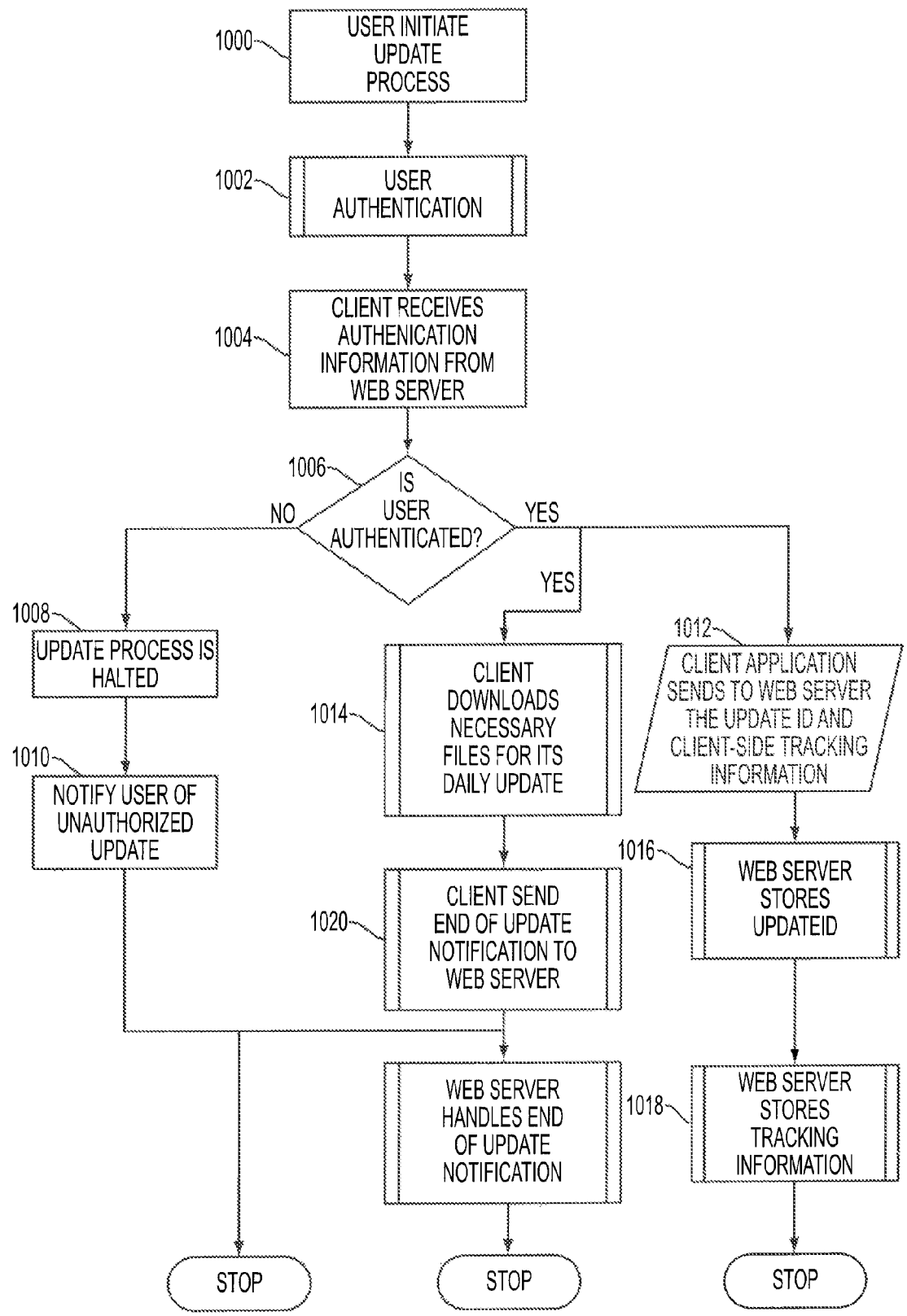
FIG. 65 is a flowchart of the overall update process.

Sever-side tracking occurs when users perform their data update (via their TCP-IP/Internet connection), and several things happen during service-side tracking. The overall update process in is shown in the flowchart of FIG. 65. In block 1000, the user initiates the update process, which commences with user authentication (block 1002). The user authentication process is shown to best advantage in FIG. 66.

Figure 66:
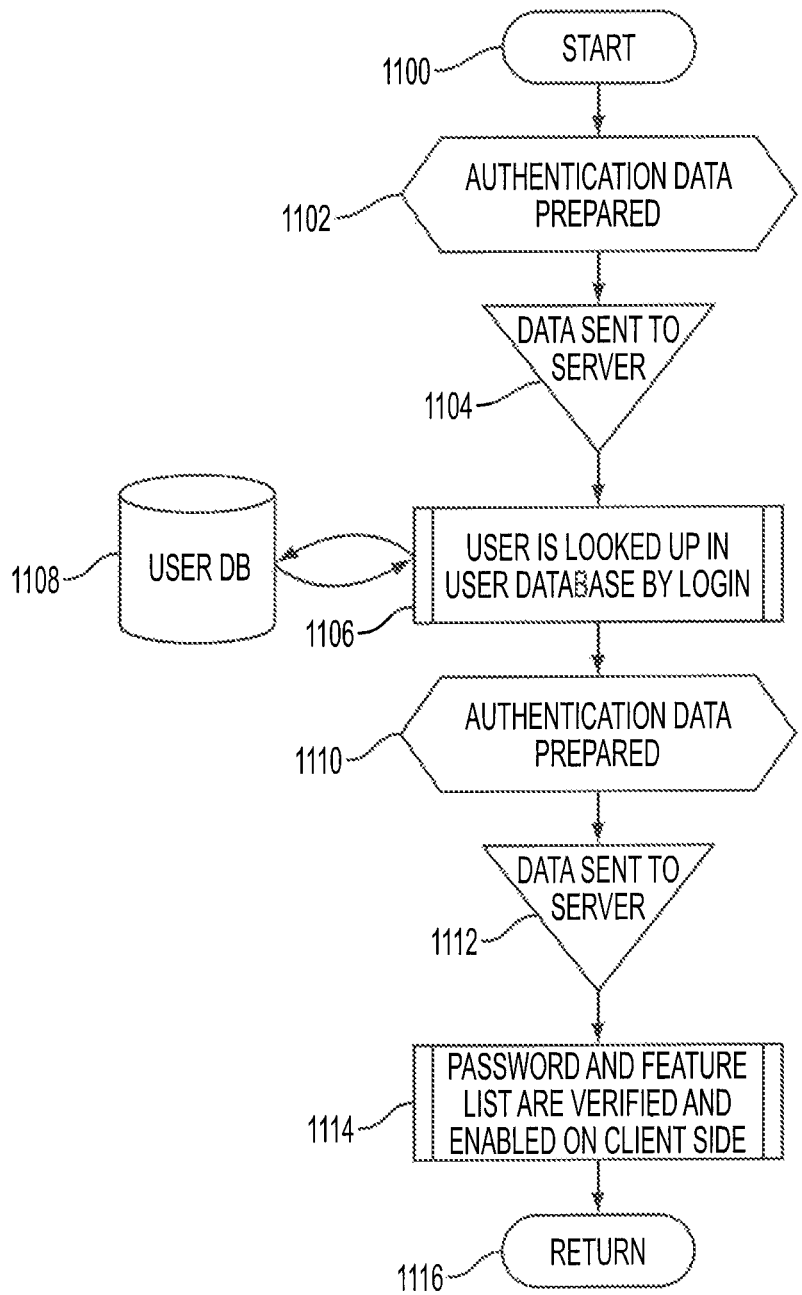
FIG. 66 is a flowchart of the user authentication process.

Referring to FIG. 66, when a user initiates an update process or requests any type of information that requires data from the Web server (such as a delayed quote or a stock chart), the user must first be authenticated before they are allowed to continue. The user authentication process starts at block 1100 and involves a communication between the client application and the update/data server. The user authentication process proceeds as follows. The client side application prepares an HTTP request (block 1102) to a specified script, located on the update/data server. This request comprises authentication data that includes the user's username (login name), which they created when they registered as a product user, and their password. The request is then submitted to the Web server via an HTTP request (block 1104). On the server, the script reads the user's login name and searches the user database 1108 to find a match (block 1106). If a matching account is found, and the passwords match, then several data items are retrieved from the user's account and used as authentication data. The authentication data is prepared (block 1110) and sent back as the response to the HTTP request submitted by the client application (block 1112). The authentication data sent back to the client application includes the username, password, security/machine identifiers, and the feature set identifier. When the client application receives this authentication data, it again verifies the password sent back as well as the security/machine identifier (block 1114). At block 1116, the process returns to block 1004 (FIG. 65). If everything matches, the application is now authorized to perform online operations at block 1008.

Security/machine identifiers are numbers that are generated by the client application on the users' computers. These identifiers are used to track the machines from which the user is running the application. Initially, users are allowed two different security/machine identifiers (see FIG. 73, item 1450). This allows users to install. the software on two different computers and use the same username/password information on both.

The feature set identifier 1452 (FIG. 73) is used to allow or restrict access to certain features of the client application. There are some features in the application, which allow users to e-mail items directly from the client program. Because there is potential for abuse of this feature (such as sending spam), there is an ability to disable this feature for select users. If a user abuses the e-mail feature, their e-mail feature will be disabled on the server-side.

Figure 67:
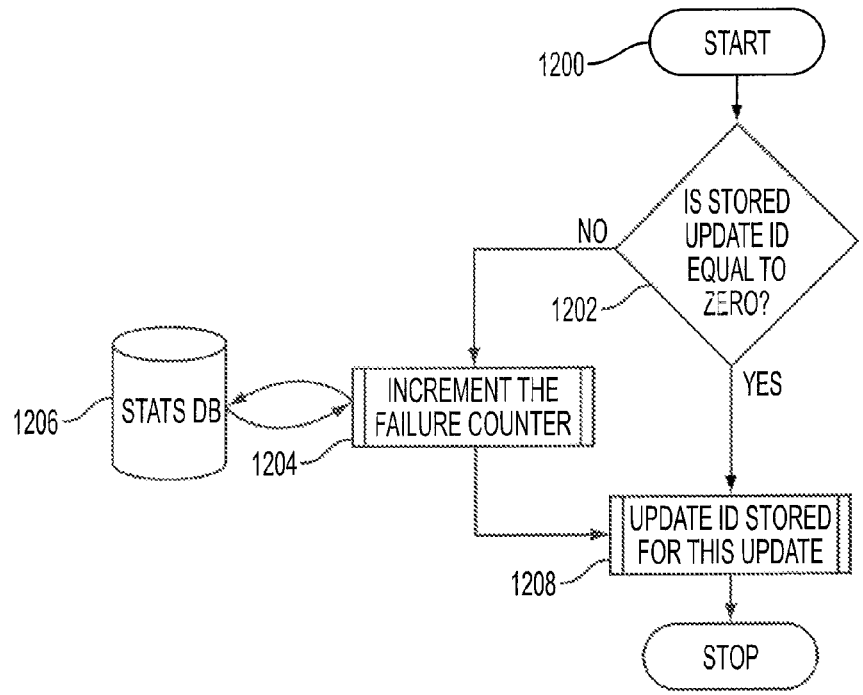
FIG. 67 is a flowchart of the update identifier process.

Returning to FIG. 65, at block 1004, the client received authentication information from the web server. Then, if the user cannot be authenticated at block 1006, the update process is halted (block 1010), and the user is notified of the attempted unauthorized update (block 1008). If, on the other hand, the user is authenticated at block 1006, the update process continues at block 1012 on the Web server and at block 1014 on the client application. At block 1012, the application software generates a unique update identifier number, which is assigned to the user's account on the update data server (1016). If the previous update process ended successfully, the stored update identifier is set to zero. Next, as also shown in block 1012 of FIG. 65, the Web server stores update identifier as shown in detail in FIG. 67, the application software prepares client-side tracking data to be transmitted to the Web update data server. This client-side tracking data includes (1) the number of minutes the application software has been used; (2) the number of advertisements shown to the user and how many times each advertisement was shown; (3) application software version information; (4) screen resolution information; and (5) a client-side time/date stamp. At block 1016, the update identifier number and the client-side tracking data is stored to the Web server.

Figure 69:
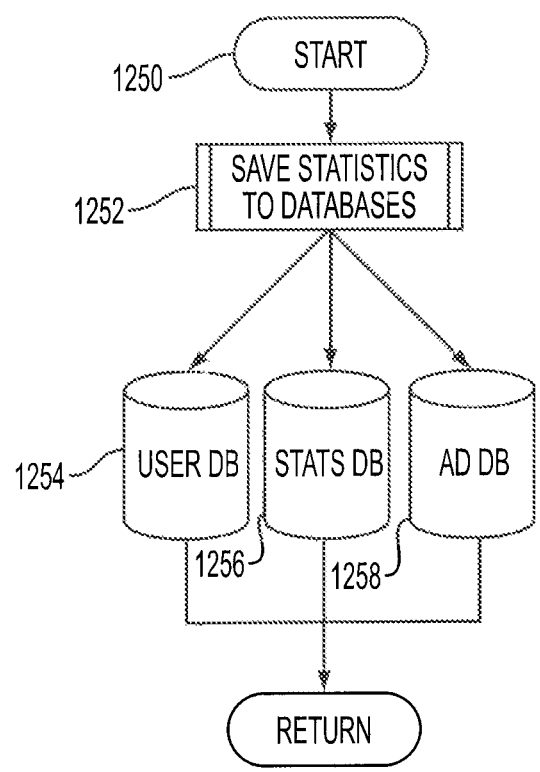
FIG. 69 is a flowchart of the user-specific statistics tracking process.

Next, at block 1018, user-specific statistics are stored on the Web server. FIG. 69 is the flowchart for storing client-side tracking data (user-specific statistics) to various databases at the Web update data server. As shown in FIG. UT04, the various client-side tracking data is saved to various databases at block 1252. For example, information such as last update date/time, total usage time, and average usage time is stored on a user database 1254 (see FIG. 73). Information such as application version and user screen resolution, which is useful when determining users' needs and requirements, is stored on a statistics database 1256 (see FIG. 72); and information related to impression counting (i.e., the number of times an ad banner is displayed to a user) is stored on an advertisements database 1258. The server also records the date and time of the update and increments the update counter for that user.

Figure 68:
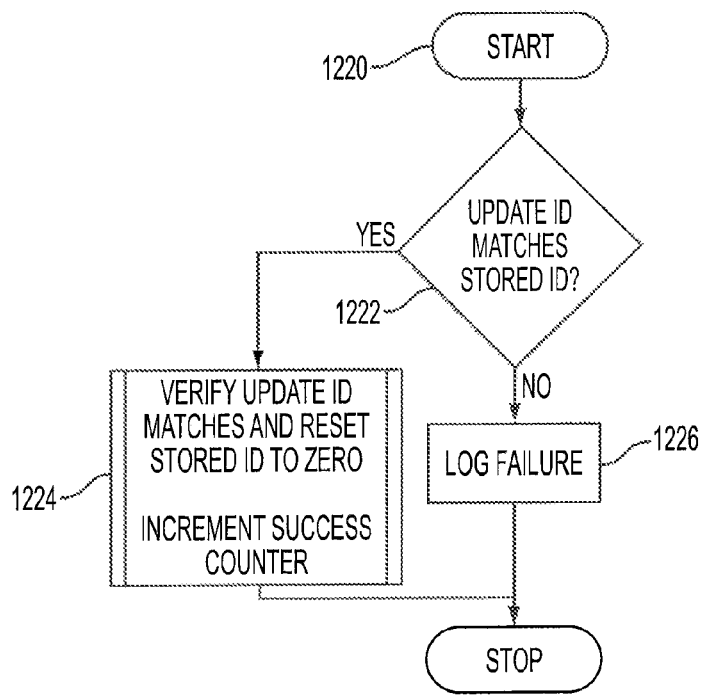
FIG. 68 is a flowchart of the update success/failure tracking process.

Returning to FIG. 65, at block 1014, the client downloads necessary files for its daily updates. Then, at block 1020, the client sends and end of update notification to the Web server. At this point, update success/failure tracking is initiated. FIG. 68 illustrates details about how the update identifier number is used to track whether an update is successful or unsuccessful. A tally of successful attempts 1400 (FIG. 72) and failed attempts 1402 (FIG. 72) is derived from this information and stored in the user statistics portion of the user database as shown in FIG. 72.

Returning again to FIG. 65, at the conclusion of the update process (after all update data has been successfully downloaded), the unique update identifier number is sent again to the update data server. This number is checked against the number stored at the beginning of the process if they match, the update was successful and the server-side unique update identifier is reset to zero. Upon initiating the next data update process, if the stored update identifier is zero, then it is apparent that the previous update was successful; if it is not zero, the previous update process never completed and the failure counter is incremented. FIG. 68 illustrates the flow of this operation.

Figure 70:
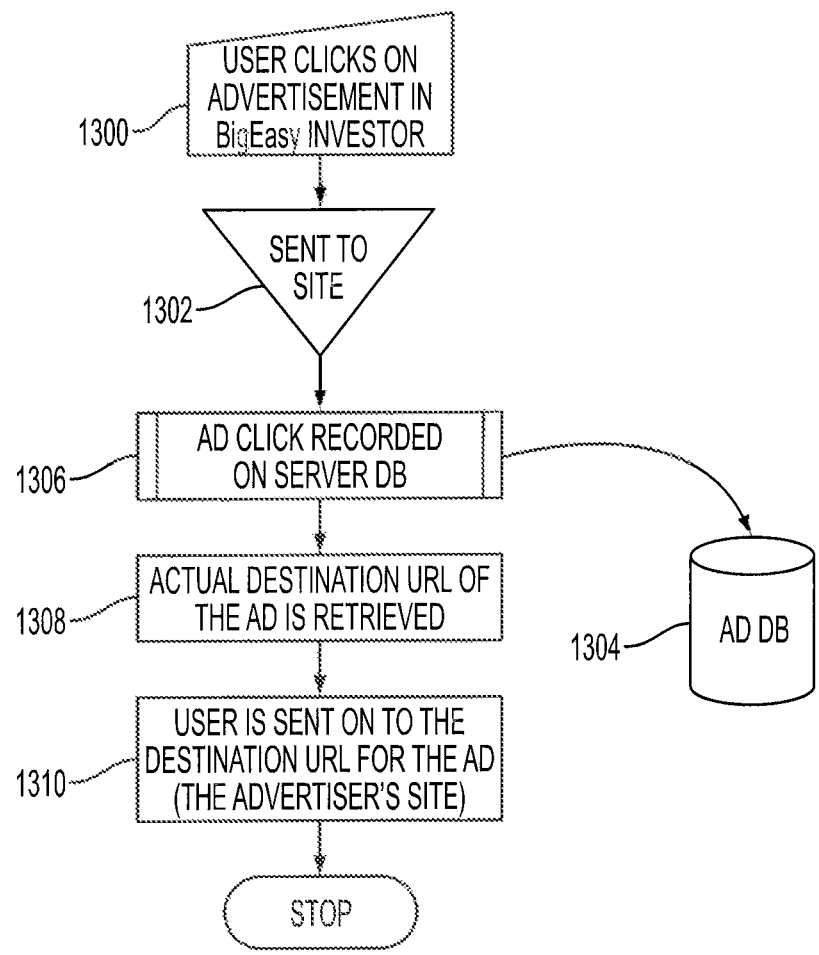
FIG. 70 is a flowchart of the advertisement click tracking process.

As shown in FIG. 70, another type of data is sent from the client to the server each time a user clicks on an advertisement in the client application. In particular, at block 1300, the user clicks on an advertisement being displayed by the application software running on the user's computer. Since users are "logged in" or authenticated when using the application, when advertisements are clicked the information is recorded about who clicked the advertisement, not just that some individual clicked the advertisement. Consequently, data uniquely describing the user (i.e., their username or login) is sent to the Web server at block 1302 along with state information about which panes were visible in the application when the advertisement was clicked. In particular, the advertisement click data recorded on the Web server advertisement database 1304 at block 1306 includes the username of the user who clicked the advertisement, the date and time the user clicked on it, the panes that were visible in the application when the user clicked the advertisement, and the total number of clicks the advertisement has received. FIGS. 71 and 74 are report printouts illustrating how this information may later be presented for a particular advertiser or advertisement, respectively. As shown on FIG. 71, advertising impression count 1350 is also tracked. After the advertisement click data is recorded at block 1306, the actual destination URL of the advertisement is retrieved (block 1308), and the user is sent to the destination URL (block 1310).

As shown in FIG. 73, other information that is tracked about each user includes the status of the user's e-mail address on record, i.e., whether is it valid. If the server sends an e-mail messages to the user and subsequently receives an "unreachable" or "undeliverable" messages back from the destination address, the bad e-mail flag ("flag_bade-mail) 1454 (FIG. 73) is set to "yes." Users whose bad e-mail flags have been set to "yes" are not sent e-mail. The tracking mechanism used by the software is a two-stage process and is coordinated between the client application and the data update servers.

Another unique tracking item is the users' screen resolution 1404 (FIG. 72). This is extremely important when trying to assess users' needs and requirements with regard to the client application. Understanding the resolution that people are using helps to determine what features and what layout/organization is used in the client application. For example, if most users are using the product at a low resolution, then features that would take up extra (valuable) screen space might not be included in future versions.

We claim:

1. A method of processing and analyzing investment information, comprising:
   receiving, at one or more investment data conditioning servers, investment information from a plurality of exchanges;
   processing said investment information into a first file including end of day investment information for a current day and a second file including fundamental investment information; and
   when a client desires an update of the investment information,
   a) sending a list file to the client, the list file identifying the first and second files;
   b) receiving a request from the client for a needed file that the client has not yet received, the needed file being among files identified on the list file and explicitly identified by the client in the request;
   c) receiving, at the one or more servers, a date from the client indicating a most recent update of the needed file at the client; and
   d) providing information from said needed file over a communications network to a storage medium at the client only when the information from said needed file has been updated at the one or more servers since the date received from the client, wherein said client queries said storage medium for information from said needed file upon execution of a request at said client for investment information related to at least one investment vehicle.

2. The method according to claim 1, wherein said processing comprises:
   processing at least one of historical price information, historical volume information, industry information, and option information to produce said end of day investment information.

3. The method according to claim 1, wherein said providing comprises:
   including in said needed file at least one of company name information and split information.

4. The method according to claim 1, wherein said providing comprises:
   comparing said needed file with an existing version of said needed file located at said client; and
   determining the segments of said existing version that require updating in response to said comparing, whereby the segments requiring updating are included in said needed file provided to said client.

5. The method according to claim 4, wherein said determining comprises:
   providing a segment of said needed file to said client in response to determining said segment of said needed file to outdate a corresponding segment of said existing version by more than a predefined time period; and
   providing a segment of said needed file to said client in response to determining said segment of said needed file having no corresponding segment in said existing version.

6. The method according to claim 1, further comprising:
   merging said needed file into an investment data screening file located at said client, wherein said client reads said investment data screening file upon execution of said request for investment information.

7. The method according to claim 6, further comprising:
   analyzing said investment data screening file to interpret a performance indicator for said at least one investment vehicle over a predefined time period, wherein said performance indicator includes at least one of price, volume, moving averages, relative strength index, and moving average convergence divergence;
   assigning a first color if said performance indicator satisfies or exceeds an upper threshold;
   assigning a second color if said performance indicator satisfies or exceeds a lower threshold;
   assigning a third color if said performance indicator fails to satisfy or exceed said upper threshold or said lower threshold; and
   displaying a graphical representation of said performance indicator, said graphical representation having said first color, said second color, or said third color to indicate the performance of said at least one investment vehicle.

8. The method according to claim 6, further comprising:
   analyzing said investment information from said plurality of exchanges to detect one or more candlestick patterns; and
   including said one or more candlestick patterns in a candlestick information file, said candlestick information file being merged with said needed file into said investment data screening file.

9. The method according to claim 8, further comprising:
   displaying a candlestick pattern associated with said at least one investment vehicle upon execution of said request for investment information.

10. The method according to claim 9, further comprising:
    identifying one or more investment vehicles matching a designated candlestick pattern; and
    displaying said designated candlestick pattern with said one or more investment vehicles.

11. The method according to claim 6, further comprising:
    accessing a backtest request for visual backtest data for one or more investment vehicles, wherein said backtest request includes a visual backtest date;
    analyzing said investment information from said plurality of exchanges to assemble investment information related to said one or more investment vehicles, wherein the date of the assembled investment information is identical to, or more current than, said visual backtest date; and merging the assembled investment information file with said needed file into said investment data screening file.

12. The method according to claim 1, further comprising:
providing at least one screen selectable by said client to enable at least one of said request for investment information and a display of information from said needed file.

13. The method according to claim 12, further comprising:
executing one or more commands associated with said at least one screen to select an investment vehicle moving consistently in one direction, over a predefined trading period, with respect to an opening price for said investment vehicle, wherein said request for investment information or said display of information includes requesting or displaying, respectively, information related to the selected investment vehicle.

14. The method according to claim 12, further comprising:
executing one or more commands associated with said at least one screen to select an investment vehicle moving consistently in one direction, over a predefined trading period, with respect to a closing price for said investment vehicle, wherein said request for investment information or said display of information includes requesting or displaying, respectively, information related to the selected investment vehicle.

15. The method according to claim 12, further comprising:
storing said at least one screen at said client to enable re-execution of said request for investment information or said display of information.

16. The method according to claim 15, further comprising:
exporting the stored screen to a second client to enable execution of a request for investment information or a display of information at said second client.

17. The method according to claim 12, further comprising:
importing the displayed information into a software application.

18. The method according to claim 1, further comprising:
reading investment information from said needed file to identify one or more investment vehicles exceeding a corresponding moving average;
determining a quantity of investment vehicles trading on said plurality of exchanges that exceed said corresponding moving average; and
displaying performance indicators for said plurality of exchanges, wherein said performance indicators include at least one of a 10-day moving average, 50-day moving average, moving average convergence divergence, relative strength index, opening volume, closing volume, percentage change in volume from a preceding day, and a bull-to-bear ratio.

19. The method according to claim 4, further comprising:
analyzing investment information from said needed file to detect bullish or bearish performance indicators for an investment vehicle or an exchange from said plurality of exchanges; and
displaying said bullish or bearish indicators for said investment vehicle or said exchange.

20. A system for processing and analyzing investment information, comprising:
one or more investment data conditioning servers configured to access investment information from a plurality of exchanges;
a first investment management analyzer configured to produce a first file including end of day investment information for a current day, wherein said first investment management analyzer is coupled to said one or more investment data conditioning servers;
a second investment management analyzer configured to produce a second file including fundamental investment information, wherein said second investment management analyzer is coupled to said one or more investment data conditioning servers; and
an investment management aggregator configured to produce a binary output file including at least one of said first file and said second file, wherein said investment management aggregator is coupled to said one or more investment data conditioning servers, configured to send a list file to the client, the list file identifying the first and second files, configured to receive a request from the client for a needed file that the client has not yet received, the needed file being among files identified on the list file and explicitly identified by the client in the request, configured to receive a date from the client indicating a most recent update of the needed file at the client, and configured to provide information from said needed file to the client only when said information from said needed file has been updated at said one or more servers since the date received from the client,
wherein the client is in communications with said investment management aggregator over a communications network, is configured to receive the information from said needed file and query said information upon execution of a request at said client for said information.

21. A system of claim 20, wherein said plurality of exchanges include at least one of the NASDAQ exchange, the AMEX exchange, the NYSE exchange, a rating house, and a brokerage.

* * * * *